United States Patent [19]

Hagerman et al.

[11] Patent Number: 4,618,810

[45] Date of Patent: Oct. 21, 1986

[54] VARIABLE SPEED AC MOTOR CONTROL SYSTEM

[75] Inventors: James E. Hagerman, Rancho Cucamonga; William D. Mathewes, Costa Mesa, both of Calif.; Fenton L. Rees, Rockford, Ill.; Albert J. Flack, Santa Ana, Calif.

[73] Assignee: Emerson Electric Company, St. Louis, Mo.

[21] Appl. No.: 464,114

[22] Filed: Feb. 4, 1983

[51] Int. Cl.[4] .................... H02P 5/40

[52] U.S. Cl. .................... 318/803; 318/798; 318/807

[58] Field of Search .................... 318/807-811, 318/803; 363/57, 58; 340/645, 653, 635; 361/30, 31, 93

[56] References Cited

U.S. PATENT DOCUMENTS

| | | | |
|---|---|---|---|
| 3,437,911 | 4/1969 | Gutzwiller | 318/806 |
| 3,497,796 | 2/1970 | Konrad | 318/807 |
| 3,750,004 | 7/1973 | Wacker | 363/58 |
| 4,201,936 | 5/1980 | Roumanis | 318/318 |
| 4,267,570 | 5/1981 | Braun | 363/138 |
| 4,325,099 | 4/1982 | Morehouse | 340/653 |

OTHER PUBLICATIONS

Sen et al. "Induction Motor Drives with Microcomputer Control System", IAS Annual Meeting, 1980, Cincinnati, OH, USA, (28 Sep.-3 Oct. 1980).

Athani et al., "Microprocessor Control of a Three--Phase Inverter in Induction Motor Speed Control System", IEEE Transactions on Industrial Electronics and Control Instrumentation, vol. IEC 1-27, No. 4, Nov. 1980, pp. 291-298.

*Primary Examiner*—David Smith, Jr.

*Attorney, Agent, or Firm*—Lyon & Lyon

[57] ABSTRACT

AC mains voltage input is directed to a bridge rectifier and converted to a DC voltage output. This DC power supplies an inverter which reconverts it to variable frequency AC output, used to drive a variable-speed AC motor.

A microprocessor-based control unit generates firing pulses for SCR's in both the rectifier and inverter. It maximizes the efficiency of the rectifier by generating phase delay and sequencing data in advance of each line-to-netural zero-crossover of the AC mains voltage input; it makes the voltage and frequency of the inverter AC output both proportional to the value of the DC voltage output, enabling the system to maintain a constant volts/Hertz ratio between the AC output voltage and the AC output frequency.

Appropriate fault protection circuits are included with the control unit to prevent fault conditions from damaging the system.

10 Claims, 47 Drawing Figures

TO CLOCK INPUT OF MAIN LATCH 194 IN PHASE CONTROL LOGIC MODULE 146

FIG.8E
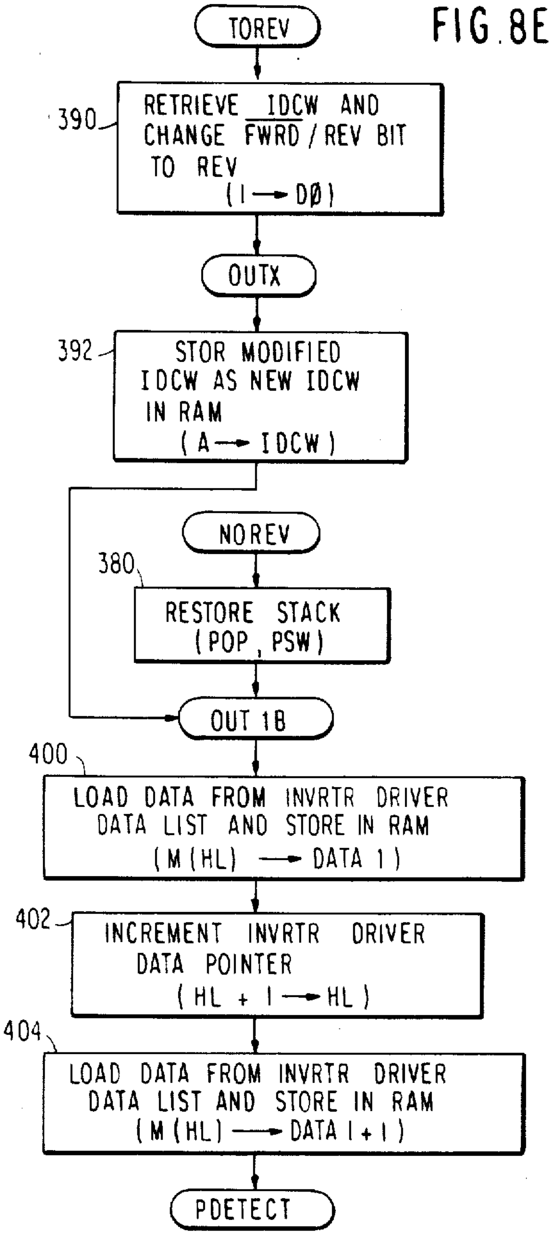
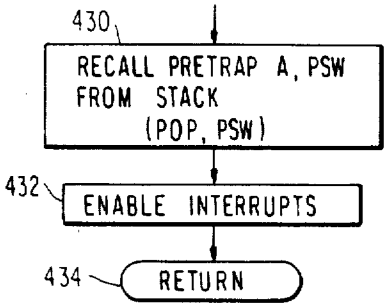
FIG.8G
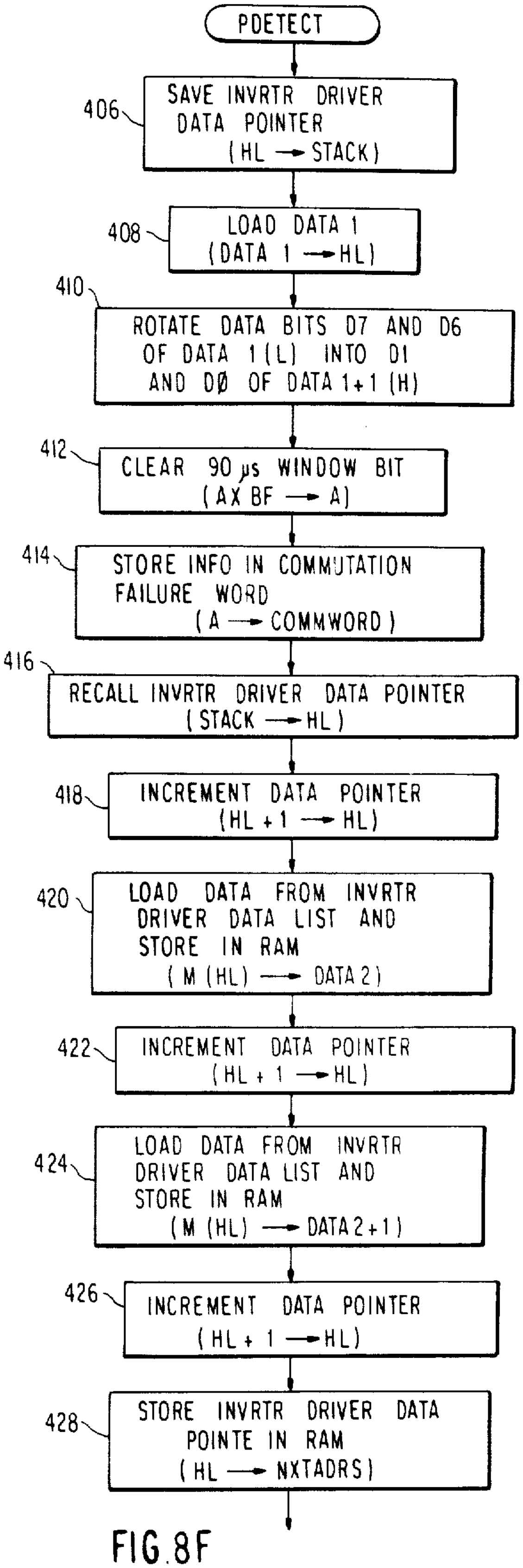
FIG.8F

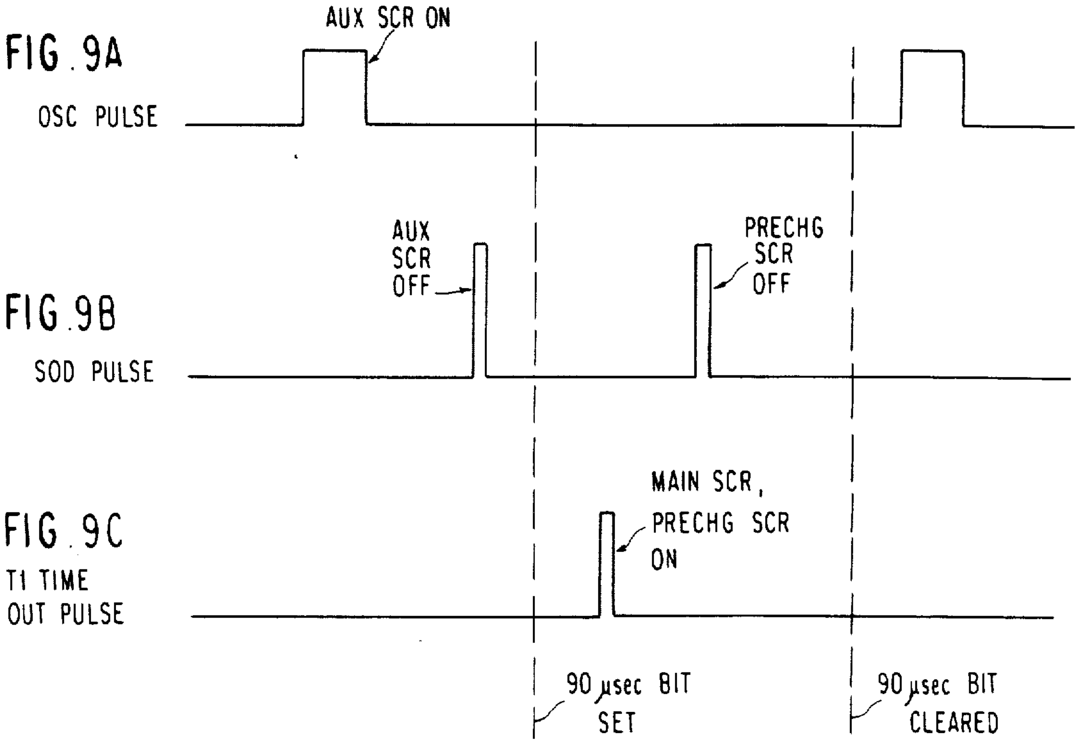
FIG. 9A
OSC PULSE
AUX SCR ON
FIG. 9B
SOD PULSE
AUX SCR OFF
PRECHG SCR OFF
FIG. 9C
T1 TIME OUT PULSE
MAIN SCR, PRECHG SCR ON
90 μsec BIT SET
90 μsec BIT CLEARED
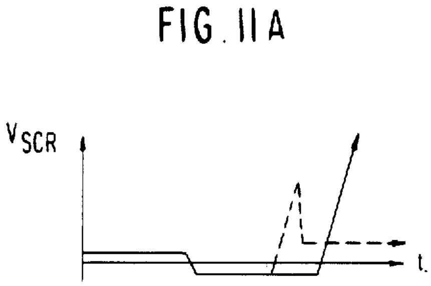
FIG. 11A
VSCR
t
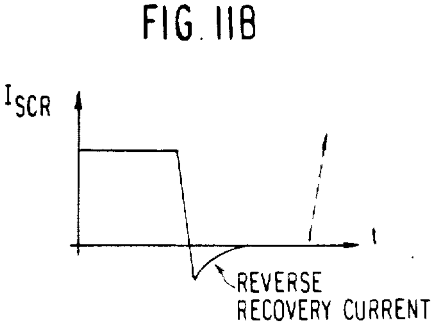
FIG. 11B
ISCR
t
REVERSE RECOVERY CURRENT
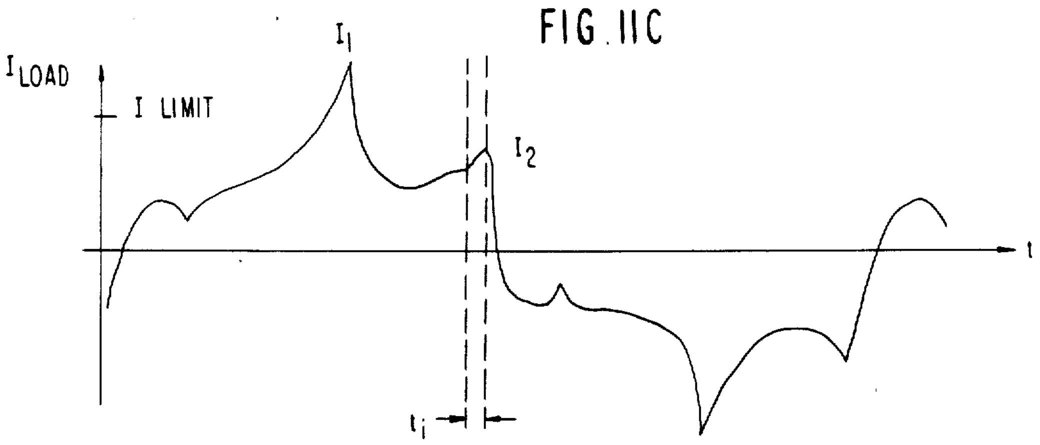
FIG. 11C
ILOAD
I LIMIT
I1
I2
t
t1

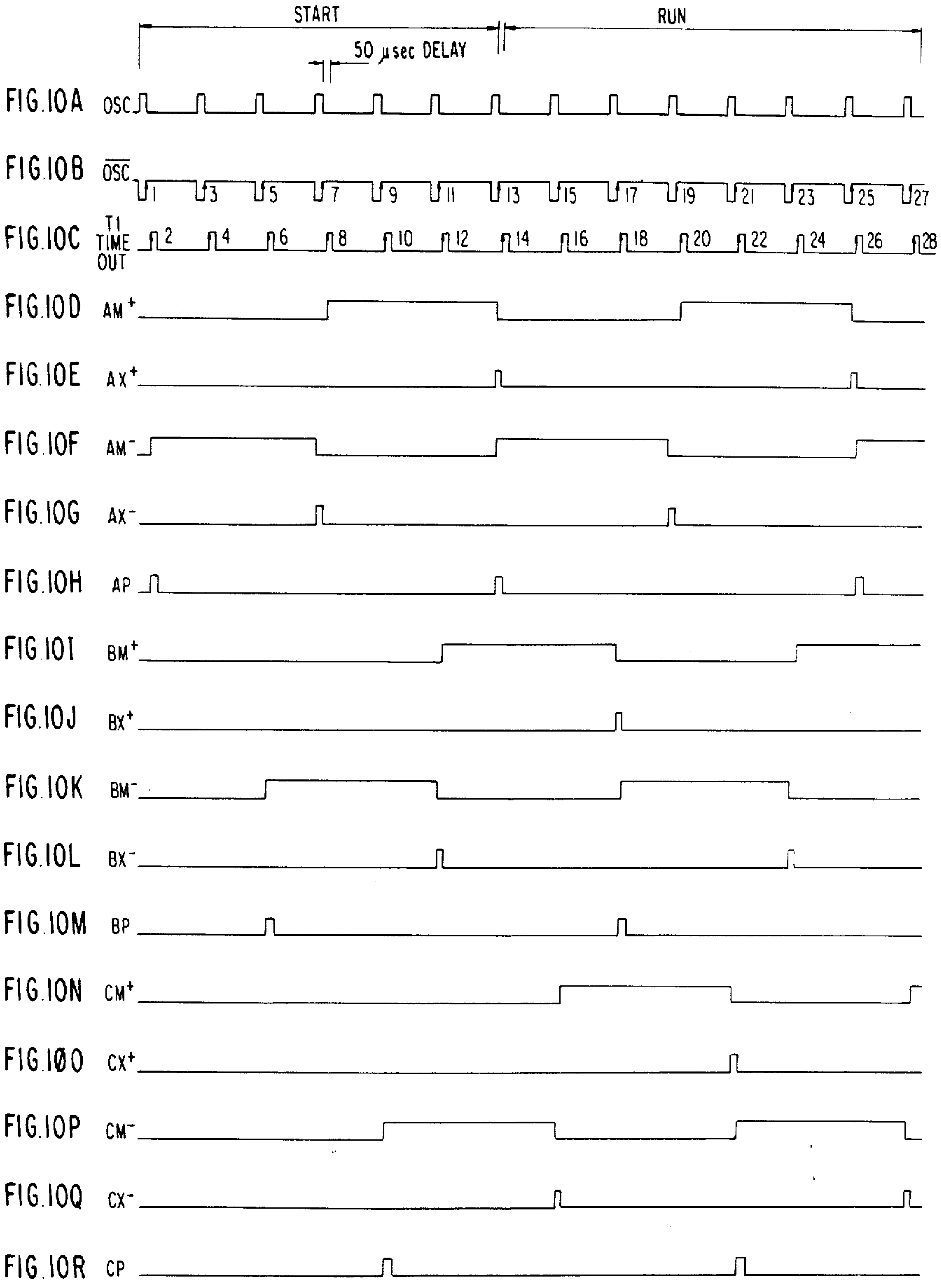
START
RUN
50 μsec DELAY
FIG.10A OSC
FIG.10B OSC
1 3 5 7 9 11 13 15 17 19 21 23 25 27
FIG.10C T1 TIME OUT
2 4 6 8 10 12 14 16 18 20 22 24 26 28
FIG.10D AM+
FIG.10E AX+
FIG.10F AM-
FIG.10G AX-
FIG.10H AP
FIG.10I BM+
FIG.10J BX+
FIG.10K BM-
FIG.10L BX-
FIG.10M BP
FIG.10N CM+
FIG.10O CX+
FIG.10P CM-
FIG.10Q CX-
FIG.10R CP

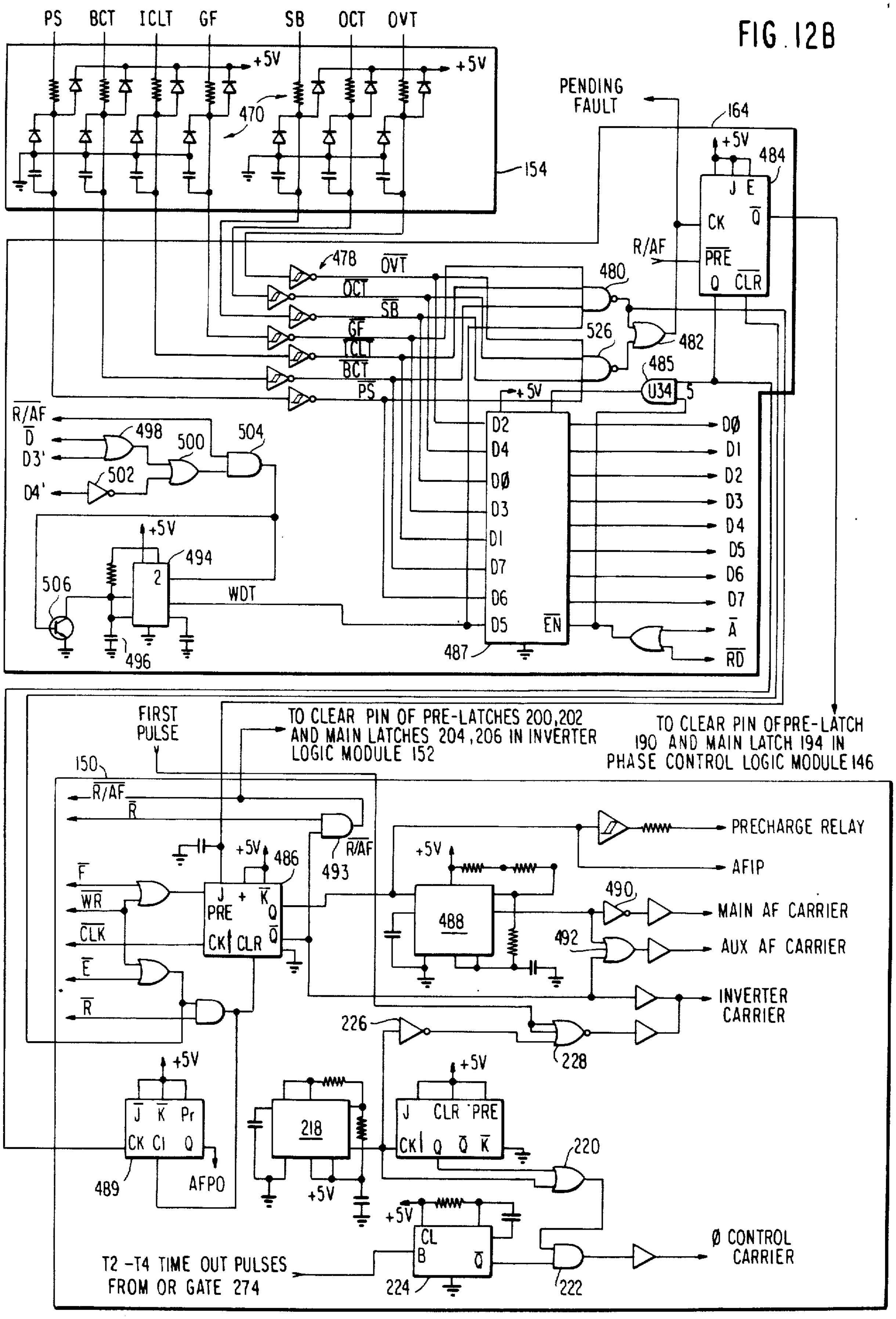

FIG. 12B
PS
BCT
ICLT
GF
SB
OCT
OVT
+5V
470
154
PENDING FAULT
164
484
J E
CK
PRE
Q CLR
R/AF
478
480
526
482
485
U34
5
+5V
D2
D4
DØ
D3
D1
D7
D6
D5
EN
487
DØ
D1
D2
D3
D4
D5
D6
D7
A
RD
R/AF
D
D3'
D4'
498
500
502
504
494
506
496
WDT
FIRST PULSE
TO CLEAR PIN OF PRE-LATCHES 200,202 AND MAIN LATCHES 204,206 IN INVERTER LOGIC MODULE 152
TO CLEAR PIN OF PRE-LATCH 190 AND MAIN LATCH 194 IN PHASE CONTROL LOGIC MODULE 146
150
R
F
WR
CLK
E
486
493
488
490
492
PRECHARGE RELAY
AFIP
MAIN AF CARRIER
AUX AF CARRIER
INVERTER CARRIER
226
228
489
AFPO
218
220
222
224
Ø CONTROL CARRIER
T2 -T4 TIME OUT PULSES FROM OR GATE 274

VARIABLE SPEED AC MOTOR CONTROL SYSTEM

TECHNICAL FIELD

The present invention generally relates to a control system for governing the operation of a variable speed AC motor and more particularly involves a system employing a bridge rectifier, an inverter and a microprocessor-based digital board which functions in combination with an analog regulator board to control the conduction intervals and sequencing of the bridge rectifier and inverter SCR's.

BACKGROUND ART

In prior art motor control systems, an AC mains voltage input is first rectified to provide a DC voltage output. The DC output voltage is used by an inverter to generate a three-phase AC output which drives the system motor. The frequency of the three-phase inverter output, and hence the motor speed, can be adjusted by regulating the DC voltage output from the bridge rectifier. In some of these prior art systems, the first 30° to 60° of each phase of the AC mains voltage input is devoted to computing the desired conduction angles for the bridge rectifier SCR's. Such a configuration of necessity sacrifices a portion of each AC mains voltage phase, which portion could otherwise be used to supply operating power for the system.

DISCLOSURE OF THE INVENTION

It is therefore an object of the present invention to provide an AC motor control system wherein a bridge rectifier connected to receive an AC mains voltage input supplies an inverter with a DC voltage output which may be regulated to adjust the frequency of the AC output from the inverter.

It is another object of the present invention to provide a variable speed AC motor control system having a bridge rectifier which employs SCR's under the control of a microprocessor-based CPU to provide regulated DC voltage for an inverter. The DC voltage is converted back into a variable frequency AC output for driving a motor in a manner such that a constant volts/-Hertz ratio is maintained between the voltage level of the AC output and the AC output frequency.

It is yet another object of the present invention to provide a microprocessor-based control system for a variable speed AC motor wherein the phase delays and corresponding conduction angles for the bridge rectifier SCR's used to supply regulated DC voltage for the system inverter are computed in advance of the zero-crossover points in the AC mains voltage input.

It is a further object of the present invention to provide a control system for a variable speed AC motor wherein a microprocessor determines the conduction intervals and sequencing for both the bridge rectifier SCR's and the inverter SCR's.

It is an object of the present invention to provide a control system for a variable speed AC motor wherein commutation failures in the system inverter are prevented by sensing load currents in "look ahead fashion" for each phase of the inverter output.

These and other objects of the present invention are achieved in a system which includes a bridge rectifier and a three-phase inverter under the control of a microprocessor-based control unit. The bridge rectifier comprises a series of SCR's arranged in three-phase configuration. The inverter likewise utilizes SCR's connected in a series of auxiliary commutated inverter circuits. Phase delays and sequencing data for the bridge rectifier SCR's are determined by the microprocessor in advance of each zero-crossover of the AC mains voltage input and used to generate firing pulses which maximize the efficiency of the bridge rectifier SCR operation. The DC output from the bridge rectifier SCR's is utilized by the inverter SCR's under the guidance of the microprocessor to generate a three-phase AC output which drives the motor. The voltage and frequency of the inverter AC output are both proportional to the value of the DC voltage output, enabling the system to maintain a constant volts/Hertz ratio between the AC output voltage and the AC output frequency. Motor speed is varied by adjusting the phase delay during the operation at the bridge rectifier SCR's to regulate the DC voltage output therefrom, thus changing the frequency of the AC output from the inverter. Appropriate fault protection circuits are included with the control unit to prevent fault conditions from damaging the system.

BRIEF DESCRIPTION OF THE DRAWINGS

The various features, objects and advantages of the control system of the present invention will become more apparent upon consideration of the following Brief Description of the Drawings and Best Mode for Carrying Out the Invention, wherein:

FIGS. 8A-8G outline a flow chart for the CPU software subroutines which determine the inverter SCR sequencing data;

FIGS. 9A-9C illustrate the various timing pulses used by the CPU to control the gating of the inverter SCR's;

FIGS. 10A-10R graphically depict the relationships between the various logic signals used to initiate firing pulses for the inverter SCR's;

FIGS. 11A-11B illustrate current and voltage relationships in an inverter SCR during commutation of the SCR;

FIG. 11C graphically depicts the "look-ahead" window employed by the CPU to determine whether load currents drawn from the inverter of the present invention are in excess of those required for safe inverter commutation; and FIGS. 12A and 12B provide detailed circuit diagrams of the fault-indicating circuitry of the present invention.

BEST MODE FOR CARRYING OUT THE INVENTION

Figure 1:
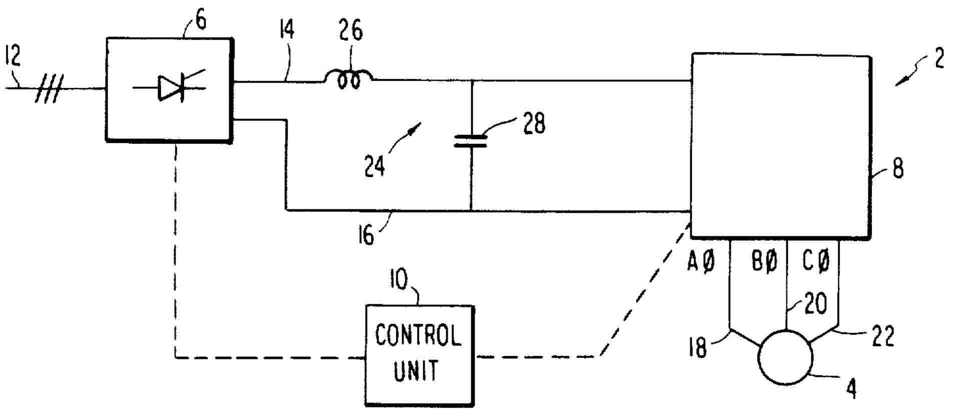
FIG. 1 provides a schematic overview of the control system of the present invention.

The control system 2 for a variable speed AC motor 4 is schematically illustrated in FIG. 1. Control system 2 includes a phase-controlled bridge rectifier 6 and a three-phase inverter 8 which together operate to supply load current for motor 4 under the direction of a microprocessor-based control unit 10. AC mains voltage is input to bridge rectifier 6 from three-phase mains line 12 and converted into a regulated DC voltage output on DC bus leads 14, 16. Inverter 8 utilizes the DC voltage output on bus leads 14, 16 to generate a three-phase AC output having a frequency proportional to the value of the DC voltage across DC bus leads 14, 16, which AC output is supplied to motor 4 via motor leads 18, 20, and 22. Inasmuch as the speed of motor 4 is a function of the frequency of the AC output reaching the motor, motor speed can be controlled by adjusting the regulated DC voltage output from bridge rectifier 6. A DC bus filter 24 including bus inductor 26 and bus capacitor 28 is employed to smooth the DC voltage output on DC bus leads 14, 16.

Figure 2:
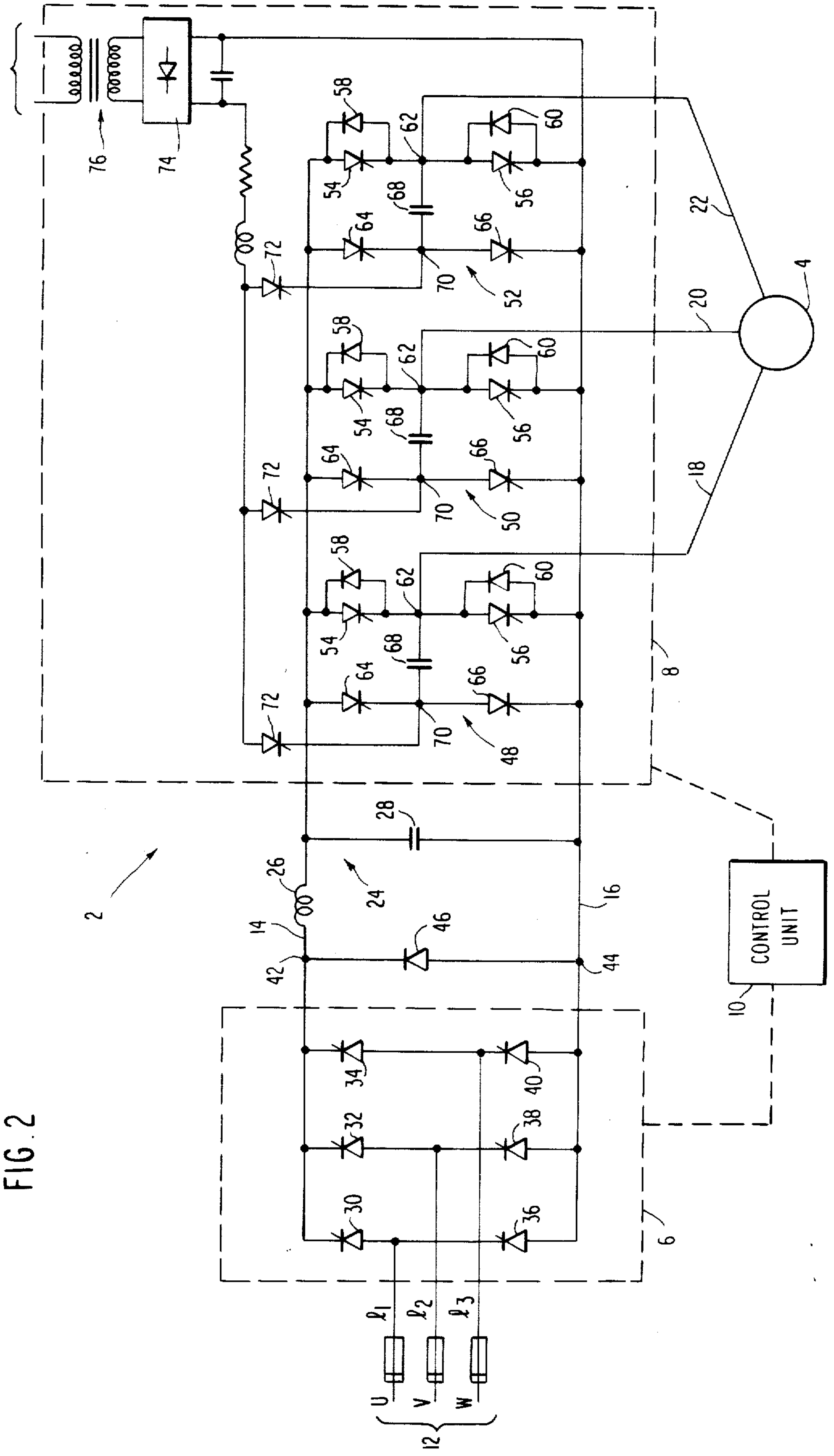
FIG. 2 furnishes a more detailed view of the bridge rectifier and inverter employed in the control system of the present invention.

FIG. 2 furnishes a more detailed view of control system 2, wherein bridge rectifier 6 comprises a series of six SCR's 30, 32, 34, 36, 38 and 40 arranged in three-phase configuration. Three leads $l_1$, $l_2$, $l_3$ in AC mains line 12 respectively carry the individual phases U, V and W of the AC mains voltage input to bridge rectifier 6. Each of the SCR's 30–40 is associated with an alternate half-cycle of one of the individual phases U, V, W on AC mains line 12. The bridge SCR's are gated into conduction by firing pulses received from control unit 10 at precisely defined firing angles such that the DC voltage output from the bridge rectifier 6 reaches or is regulated to a desired level in accordance with the desired speed of motor 4. This DC voltage is fed to DC bus leads 14, 16 through output terminals 42, 44. If desired, a free wheel diode 46 may be connected across terminals 42 and 44.

As noted above, three-phase inverter 8 generates three-phase alternating current on motor leads 18–22 in response to the DC voltage output on DC bus leads 14, 16. The A phase of the inverter output reaches motor 4 through lead 18, the B phase of the inverter output reaches motor 4 through lead 20 and the C phase of the inverter output reaches motor 4 through lead 22. Leads 18, 20, and 22 are specifically connected to receive the output of three auxiliary commutated inverter circuits 48, 50 and 52 in inverter 8. Each auxiliary commutated inverter circuit includes a pair of main SCR's 54 and 56 connected in series across DC bus leads 14, 16. A pair of anti-parallel diodes 58, 60 are respectively connected across the main SCR 54 and 56. A node 62 intermediate main SCR's 54 and 56 furnishes a current and voltage tap for the motor lead carrying the alternating current A, B or C phase associated with that auxiliary commutated inverter circuit. Seriesconnected auxiliary SCR's 64 and 66 are arranged across DC bus leads 14, 16 in parallel to main SCR's 54 and 56. A commutation capacitor 68 tied between node 62 and node 70 intermediate auxiliary SCR's 64, 66 operates in conjunction with the auxiliary SCR's to commutate or turn off the main SCR's 54, 56 as described more fully hereinbelow.

Each positive half-cycle for a given phase of the alternating current output generated by inverter 8 is initiated by gating the main SCR 54 of the associated auxiliary commutated inverter circuit 48–52 into conduction using a firing pulse generated in control unit 10. Current then flows in a positive direction from DC bus lead 14 through the now-conducting main SCR 54 and node 62 into the associated motor lead 18, 20 or 22. At the end of each positive half-cycle, an additional firing pulse generated in control unit 10 gates the auxiliary SCR 64 of the associated auxiliary commutated inverter circuit into conduction, causing a current pulse to flow through anti-parallel diode 58. This current pulse reverse biases and subsequently commutates the main SCR 54. After main SCR 54 ceases conduction, the negative half-cycle of the alternating current output for the given phase is initiated by gating main SCR 56 into conduction with a firing pulse from control unit 10, thereby establishing a current flow path in the negative direction from motor 4 through the associated motor lead 18, 20 or 22, node 62, and now-conducting main SCR 56 to DC bus lead 16. The negative half-cycle is completed by gating auxiliary SCR 66 into conduction with a firing pulse from control unit 10, causing current to flow through anti-parallel diode 60 and commutating main SCR 56 in preparation for the next succeeding positve half-cycle of the phase.

If the control system of the present invention relied upon a constant DC voltage output across DC bus leads 14, 16 to provide a constant motor speed, the presence of auxiliary SCR's 64, 66, and commutation capacitor 68 would be sufficient to commutate the main SCR's 54 and 56 in auxiliary commutated inverter circuits 48–52. Gating of either auxiliary SCR 64 or 66 would supply the corresponding anti-parallel diode 58 or 60 with sufficient current for carrying out the commutation operation. Any losses in the commutation capacitor voltage level would then be made up from the DC bus, and as a result the maximum voltage across commutation capacitor 68 would always equal the value of the voltage across the DC bus. Where inverter 8 is designed to supply alternating current to a variable speed motor of the type disclosed in the present invention, however, the DC voltage output on DC bus leads 14, 16 does not remain constant but instead varies over a relatively wide range. Consequently, the maximum voltage across commutation capacitor 68 also varies. If not compensated for, such variation would permit commutation of the main SCR's 54, 56 in the auxiliary commutated inverter circuits only if the load current being drawn through motor leads 18, 20 or 22 changed in proportion to variations of the DC bus voltage. The latter phenomenon does not occur in practice, and some means must thus be provided for precharging commutation capacitor 68 to a fixed voltage prior to actual commutation of the main SCR's. To this end, a series of precharge SCR's 72 respectively connected to nodes 70 of the auxiliary commutated inverter circuits 48–52 are gated into conduction by control unit 10 at precisely defined intervals, placing a precharge voltage $V_{pc}$ across the commutation capacitors in preparation for the gating of the auxiliary SCR's 64 or 66 in the auxiliary commutated inverter circuits. The precharge voltage $V_{pc}$, which has a value high enough to enable commutation of the main SCR's 54, 56 when the auxiliary SCR's 64, 66 are gated into conduction, is supplied by the output of a diode rectifier 74 connected across a transformer 76 tapping off the U and W phase lines $l_1$ and $l_3$ of mains line 12.

OVERVIEW OF THE CONTROL UNIT

Figures 3A, 3B:
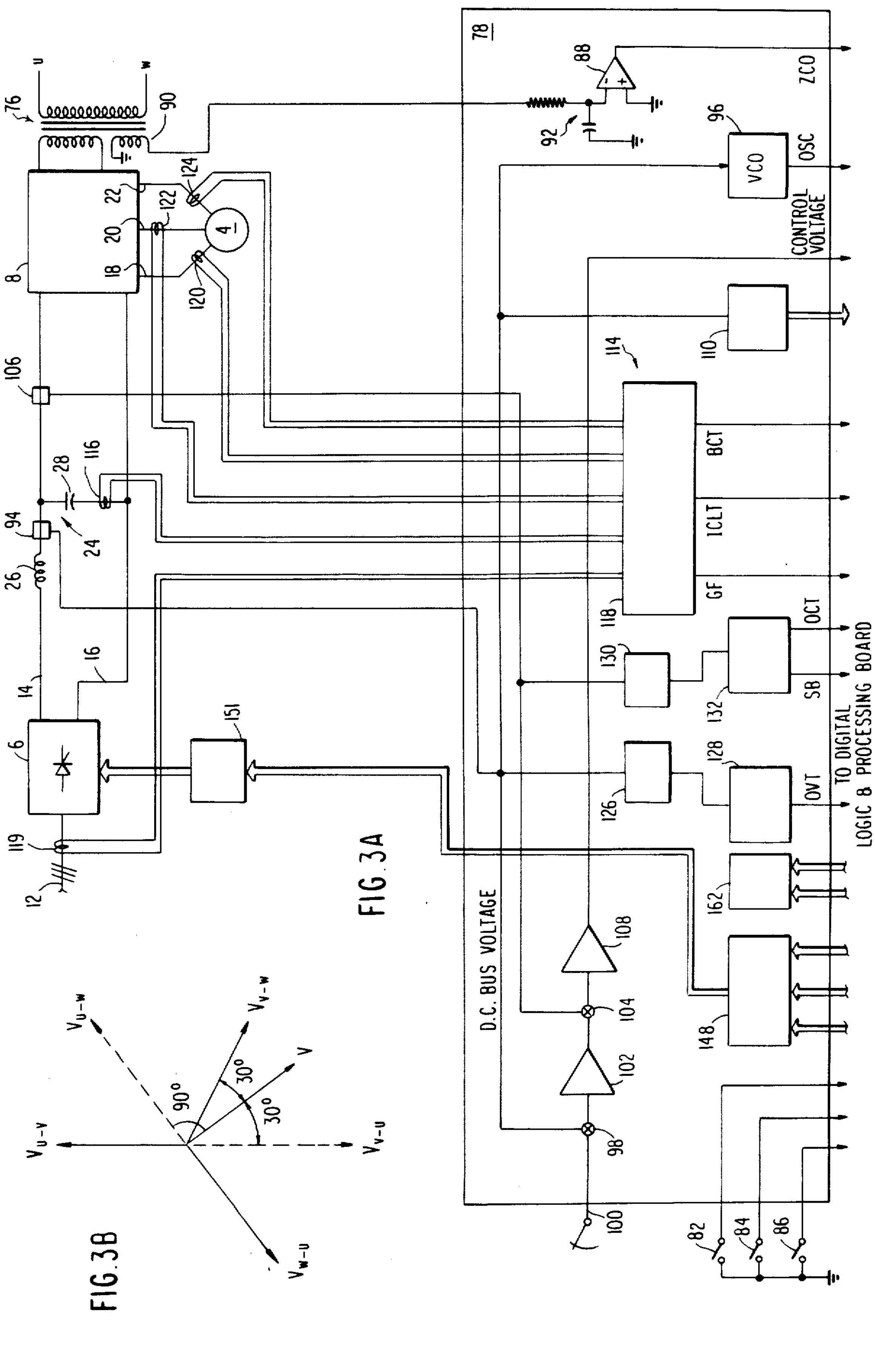
FIG. 3A is a schematic of the regulator board in the control unit of the present invention.
FIG. 3B is a graphic illustration of the relationships between the AC mains voltage input waveforms used to derive a timing reference against which conduction angles of the bridge rectifier SCR's are measured.
Figure 3C:
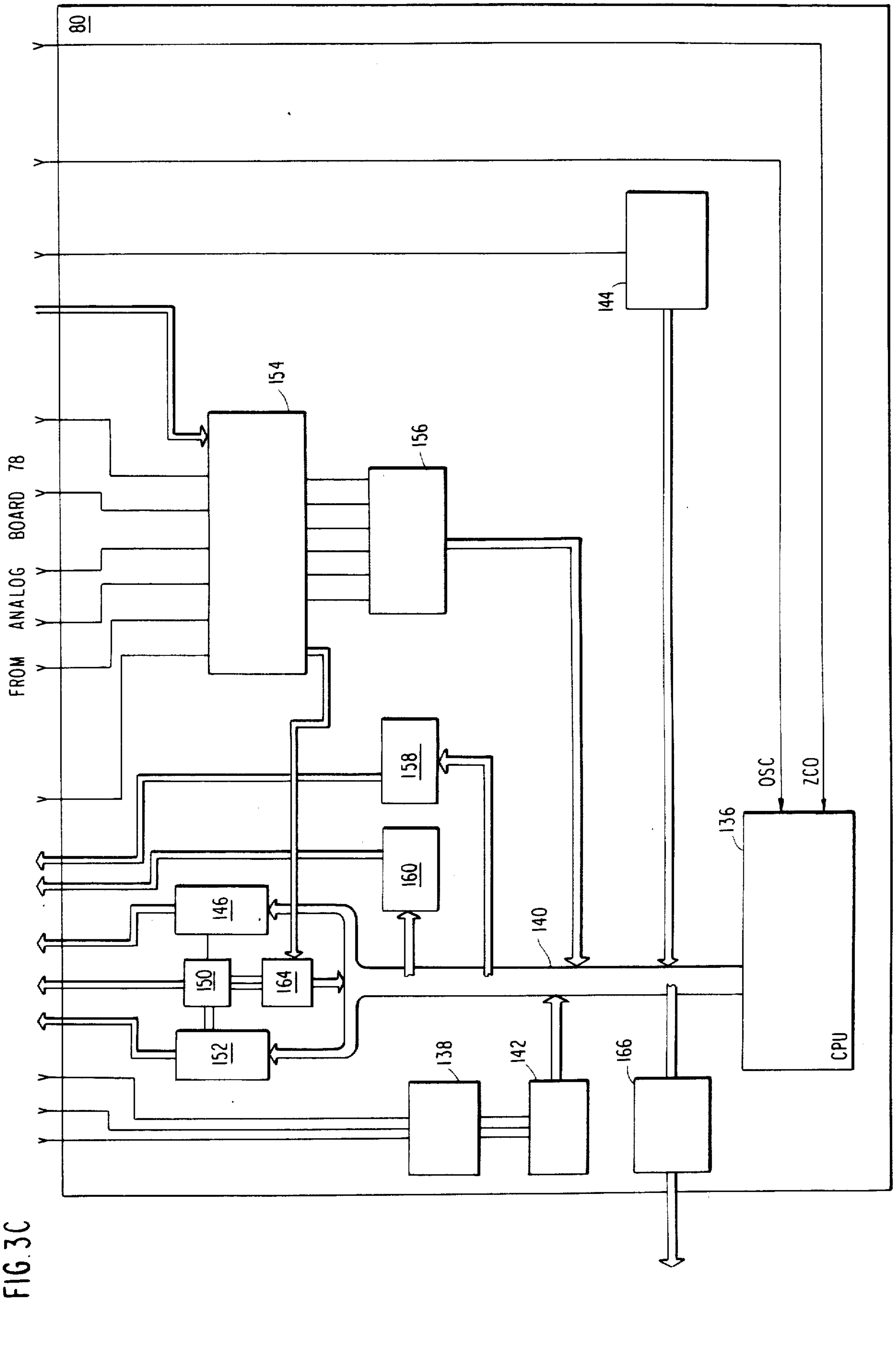
FIG. 3C is a schematic view of the digital logic and processing board in the control unit of the present invention.

Turning next to FIGS. 3A-3C, a block diagram of control unit 10 may be seen. Control unit 10 basically comprises an analog regulator board 78 and a digital logic and processing board 80. Regulator board 78, as depicted in FIG. 3A, includes a series of switches 82, 84 and 86 which are actuated by the system operator to select one of three motor operating modes, e.g., the motor run mode, the motor stop mode and the motor forward or reverse mode. If desired, additional switches (not shown) can be employed to initiate other motor operating modes such as a motor rapid start or jog mode, a DC brake mode or the like. Suitable modifications to the analog regulator board 78 must of course be made if the system is to actually operate in the latter modes. Regulator board 78 further includes a zero-crossover circuit 88 which detects the falling edge of the zero-crossover in the output from a synchronization winding 90 on transformer 76 and provides a ZCO signal in response thereto. The ZCO signal serves as a base timing point against which phase delays and corresponding conduction angles for the bridge rectifier SCR's 30–40 are measured. It will be recalled that transformer 76 taps the U and W phase lines $l_1$ and $l_3$ of mains line 12. Consequently, the output of synchronization winding 90 is an AC signal of approximately 40 volts (RMS) in phase with the U-to-W line-to-line waveform on mains line 12. This output is directed through a 90° RC lag filter 92 which smooths any "notches" present in the lag filter output waveform to guard against false zero-crossover readings by zero-crossover circuit 88. Referring to FIG. 3B, it is also evident that the 90° lag introduced by the lag filter creates an in-phase relationship between the signal input to zero-crossover circuit 88 and the V phase line-to-neutral waveform, causing the zero-crossover of the lag filter output to lead the actual zero-voltage point of the V-to-U phase, line-to-line waveform by 30°. Zero-crossover circuit 88 simply marks this lag filter output zero-crossover with a high speed transition to establish the ZCO signal.

A bus voltage sensor 94 on regulator board 78 measures the DC voltage output across DC bus leads 14, 16 and generates a DC BUS VOLTAGE signal having a magnitude proportional to the magnitude of the measured DC voltage output. The DC BUS VOLTAGE signal is simultaneously supplied to a voltage-controlled oscillator 96 and to one input of a summing junction 98. Voltage-controlled oscillator 96 generates a train of OSC oscillator pulses at a frequency equal to six times the frequency of the alternating current output from inverter 8. As will be described more fully hereinbelow, the OSC pulses are employed by digital logic and processing board 80 to derive the inverter SCR firing pulses necessary for obtaining a six step waveform on motor leads 18–22, in the process establishing the relationships between the DC bus voltage, the AC output frequency and the AC output voltage required for maintaining a constant ratio of AC output volts to AC output frequency. Meanwhile, the other input of summing junction 98 is connected to a speed potentiometer 100 which furnishes a signal having a voltage representing the DC bus voltage necessary for achieving a desired motor speed. The difference between the DC BUS VOLTAGE signal and the output of speed potentiometer 100 obtained at summing junction 98 is amplified by a voltage error amplifier 102 and directed to a second summing junction 104 for combination with the output of a bus current sensor 106. A current error amplifier 108 amplifies the signal thus obtained at summing junction 104 to provide a CONTROL VOLTAGE signal. The action of combining the voltage representative signal from voltage error amplifier 102 and the current representative signal from bus current sensor 106 effectively decouples the load of system 2 from the system power supply, leading to increased stability in the CONTROL VOLTAGE signal and faster system response to changes in the setting of speed potentiometer 100. Such response characteristics are particularly advantageous, because the digital logic and processing board 80 utilizes the CONTROL VOLTAGE signal to compute the conduction angles for the bridge rectifier SCR's 30–40. Upon reflection, it should be evident that the magnitude of the CONTROL VOLTAGE signal is proportional to the value of the conduction angles required by the bridge rectifier SCR's to achieve the desired DC bus voltage indicated on speed potentiometer 100. In contrast, the CONTROL VOLTAGE magnitude is inversely proportional to the phase delay which must be instituted for each bridge rectifier SCR in order to obtain the conduction angles associated with the desired DC bus voltage.

System operating conditions are monitored by motor monitoring circuits 110 on regulator board 78. Monitoring circuits 110 may, for example, utilize the DC BUS VOLTAGE signal to determine whether the DC voltage output on DC bus leads 14, 16 is low enough to complete a motor stop procedure. Similarly, the DC BUS VOLTAGE signal may be employed by monitoring circuits 110 to obtain a measure of the frequency of the alternating current output from inverter 8, providing an indication of whether the motor speed is slow enough to complete a motor reversing procedure. Monitoring outputs from the monitoring circuits 110 are directed to digital logic and processing board 80 through regulator interface module 112.

Numerous faults may occur during the operation of system 2. Such faults often "dump" DC energy into the auxiliary commutated inverter circuits 48–52 of inverter 8 at a level which exceeds the surge rating of the inverter main and auxiliary SCR's 54, 56, 64, 66. Some means must therefore be provided to prevent faults from destroying the inverter main and auxiliary SCR's. Two approaches to fault prevention are employed in the system of the present invention. The first or "all fire" approach is utilized for faults such as ground faults or commutation failures in the inverter. When an "all fire" type fault is sensed, all of the inverter main and auxiliary SCR's are turned on to establish six parallel paths across the DC bus leads in the inverter. Because the DC energy supplied to the inverter is divided among these six parallel paths, the fault current that would otherwise have been generated in individual inverter SCR's is reduced to a safe, non-destructive level. Under "all off" fault conditions such as excess DC bus voltage or excess DC bus current, the rate of rise of fault current is sufficiently slow to permit sensing of the fault current and turning off of the inverter SCR's before the fault current reaches a destructive level.

A variety of sensor circuits, some of which are shown at 114 in FIG. 3A, can be placed on regulator board 78 to detect actual or incipient "all fire" type fault conditions in the operation of system 2. For example, a DC bus current fault caused by a commutation failure in any one-of the auxiliary commutated inverter circuits 48–52 of inverter 8 may be detected by a bus current transformer 116 in DC bus filter 24. A current monitoring circuit 118 on the regulator board senses the output of bus current transformer 116 and provides a BCT signal indicative of commutation failure. Similarly, a ground fault current transformer 119 connected to current monitoring circuit 118 senses ground faults, causing the current-monitoring circuit to generate a GF signal in response thereto. A group of three current transformers 120, 122 and 124 connected to current monitoring circuit 118 respectively sense the magnitude of the load current in motor leads 18, 20 and 22. Inverter phase information is supplied to current monitoring circuit 118 by a commutation current "window" circuit (not shown in FIG. 3A), enabling the current monitoring circuit to determine whether any main SCR about to be commutated in inverter 8 is carrying load current in excess of that necessary for safe commutation. An ICLT signal is output from the current monitoring circuit in the event that commutation cannot be safely performed.

"All off" type fault conditions, such as the appearance of excess voltage or excess current on DC bus leads 14, 16, can be respectively detected by bus voltage sensor 94 and bus current sensor 106. The bus voltage sensor provides a voltage representative signal which is attenuated in a voltage feedback conditioner 126 and supplied to a DC bus voltage and output current detector 128. The bus current sensor provides a current representative signal which is attentuated in a current feedback conditioner 130 supplied to a DC current detector 132. The DC bus voltage and output current detector 128 and the DC current detector 132 are responsible for generating OVT, OCT and SB fault signals respectively indicative of overvoltage, overcurrent or shorted bus conditions in the system.

Digital logic and processing board 80 can be better understood by referring to FIG. 3C in conjunction with FIG. 3A. The digital logic and processing board includes a microprocessor-based CPU 136 which governs the activity of control unit 10. As noted above, the system operator selects the desired motor operating mode by actuating the appropriate motor control switch 82–86. A switch interface module 138 receives an input signal from the actuated motor control switch and outputs a data signal indicative of the selected motor operating mode. This data signal is supplied to the data bus 140 of CPU 136 through buffer/line driver 142. Zero-crossover circuit 88 concurrently supplies CPU 136 with ZCO signals in order to establish timing intervals for the conduction of the SCR's 30–40 in bridge rectifier 6. That is, the ZCO signals from zero-crossover circuit 88 serve as reference points for measuring the phase delays and corresponding conduction angles of the bridge rectifier SCR's. The phase delays, which determine the bridge rectifier SCR conduction angles and hence the level of DC voltage output from bridge rectifier 6, are actually computed as a function of the CONTROL VOLTAGE signal generated by current error amplifier 108. An analog-to-digital converter 144 places the CONTROL VOLTAGE signal into a digital form suitable for software manipulation by CPU 136. Software calculations of the phase delays are performed in "look ahead" fashion such that the SCR conduction angles are available before the point in time at which they are needed. Once computed, the conduction angles are counted down in CPU 136 to obtain proper conduction intervals for the bridge rectifier SCR's. Proper sequencing of bridge rectifier SCR conduction is established by bridge rectifier SCR sequencing data generated as a result of another software routine carried out in CPU 136. At each conduction interval, bridge rectifier SCR sequencing data is clocked from CPU 136 through a phase control logic module 146 to an analog gating circuit 148 of conventional design on regulator board 78. Phase carrier signals supplied by a carrier generator 150 are superimposed onto the bridge rectifier SCR sequencing data in the gating circuit, and the resulting pulsed version of the bridge rectifier SCR sequencing data is fed to an external gate drive circuit 151 which provides firing pulses also of conventional design (not shown) which pulses for the appropriate bridge rectifier SCR.

Conduction intervals for the main, auxiliary and precharge SCR's in each of the auxiliary commutated inverter circuits 48–52 of three-phase inverter 8 are measured against the OSC pulses from voltage-controller oscillator 96. Upon reaching CPU 136, each OSC pulse serves as a reference point for generating a series of timing signals which initiate auxiliary, main and precharge SCR conduction in a selected auxiliary commutated inverter circuit to provide the desired polarity reversal in the associated phase of the alternating current output from inverter 8. The exact sequencing of auxiliary, main and precharge SCR conduction in the selected auxiliary commutated inverter circuit is determined by inverter SCR sequencing data generated during a third software subroutine performed in CPU 136. This inverter SCR sequencing data is clocked through an inverter logic module 152 by the timing signals generated at each OSC pulse and is combined in gating circuit 148 with inverter carrier signals from carrier generator 150 to provide a pulsed version of the inverter SCR sequencing data. The pulsed inverter SCR sequencing data is then used by the external gate drive circuit to generate firing pulses for the appropriate auxiliary, main and precharge SCR's.

In addition to controlling the operation of bridge rectifier 6 and inverter 8, logic and processing board 80 is capable of directing a variety of motor regulating and diagnostic functions. Monitoring signals developed by the motor monitoring circuits 110 on regulator board 78 are passed through a regulator interface module 154 to a buffer/line driver 156 on logic and processing board 80. The data output from buffer/line driver 156 is directed to CPU 136, whereupon the CPU formulates control instructions based on both the selected motor operating mode and the actual motor operating conditions. These control instructions are latched through either a regulator output buffer 158 or a control output buffer 160 to activate various motor control relays 162 on regulator board 78. Fault-indicating signals from the current monitoring circuit 118, the DC bus voltage and output current detector 128 and the DC current detector 132 on regulator board 78 are passed through regulator interface module 154 to an all-fire/all-off decoding module 164 on logic and processing board 80. During those fault conditions which result in the generation of BCT, GF or ICLT signals, the all fire/all off decoding module 164 directs the phase control logic module 146 to phase back all of the bridge rectifier SCR's 30–40 until they self-commutate and simultaneously directs a pair of all fire carrier signals to gating circuit 148. The gating circuit in turn provides firing pulses for driving all of the main SCR's 54–56 and auxiliary SCR's 64, 66 of inverter 8 into conduction. During those fault conditions which result in the generation of OVT, OCT and SB signals, the all fire/all off decoding module again directs phase control logic module 146 to turn off all of the bridge rectifier SCR's and simultaneously instructs CPU 136 to perform an "all off" subroutine. The "all-off" subroutine generates inverter SCR sequencing data which is latched through inverter logic module 152 to gating circuit 148 in order to generate firing pulses for all of the auxiliary SCR's associated with conducting main SCR's in inverter 8, thereby commutating all of the conducting main SCR's in inverter 8. A diagnostic driver module 166 under the command of CPU 136 activates a diagnostic display module (not shown) to furnish a visual indication of the type of fault experienced by the system.

ORGANIZATION OF THE DIGITAL LOGIC AND PROCESSING BOARD

Figure 5A:
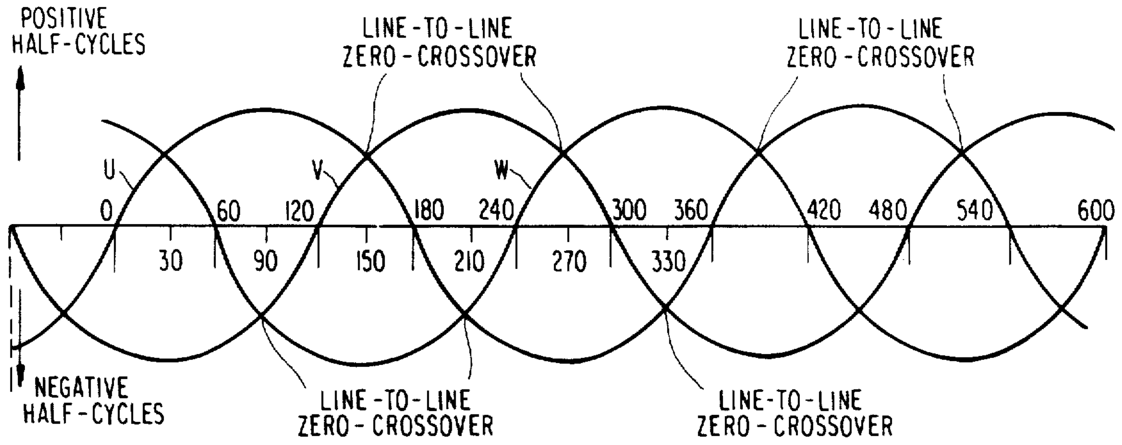
FIGS. 5A-5C depict the actual timing pulses employed by the CPU of FIG. 4A to measure conduction angles for the bridge rectifier SCR's.
Figure 5B:
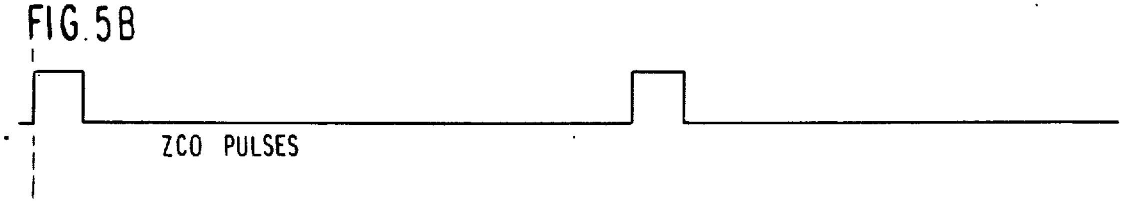
Figure 5C:
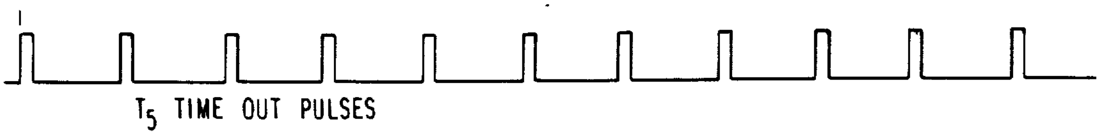
Figure 4A:
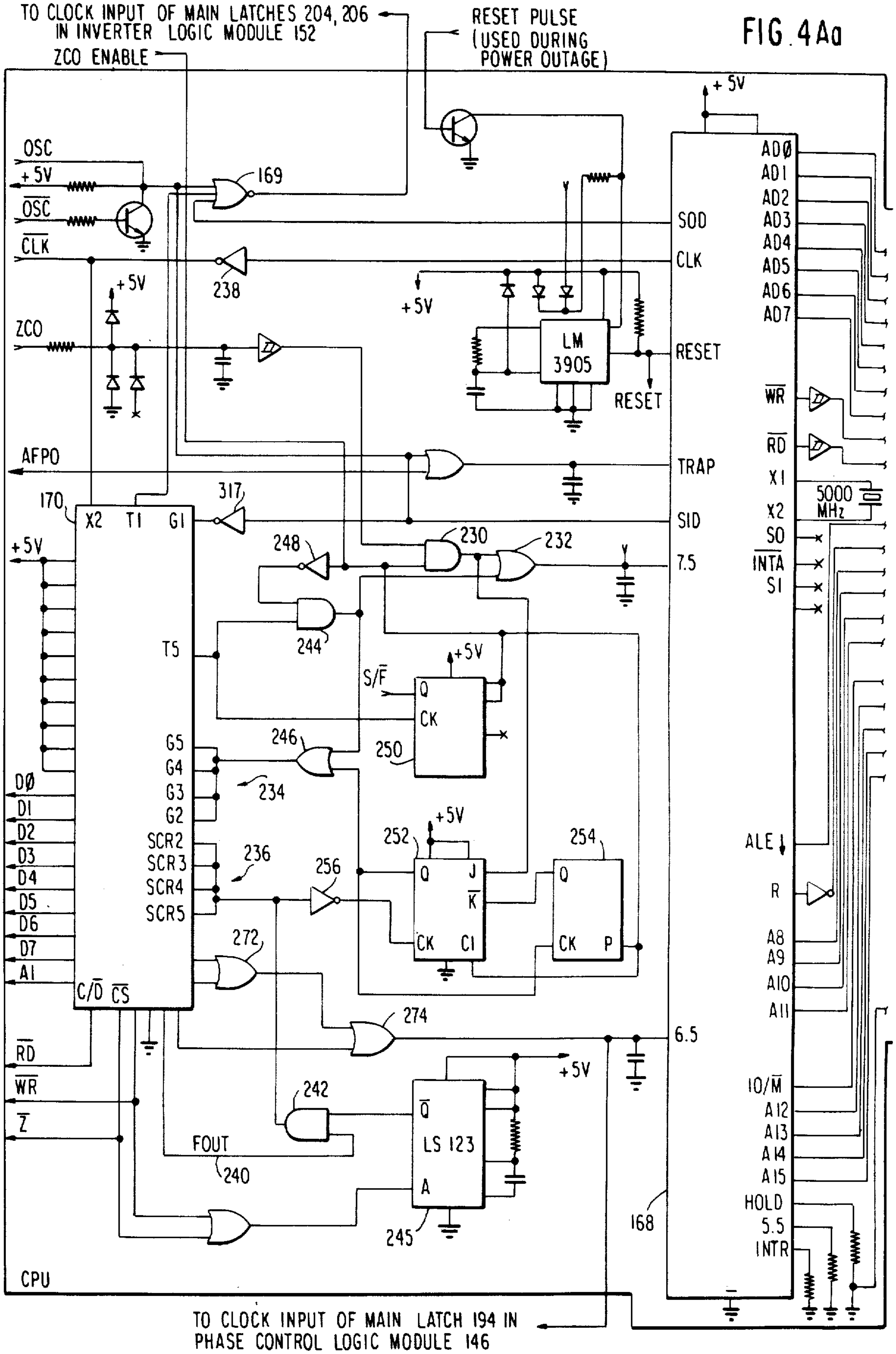
FIG. 4A provides a detailed circuit diagram of the CPU on the digital logic and processing board of FIG. 3C.
Figure 4A:
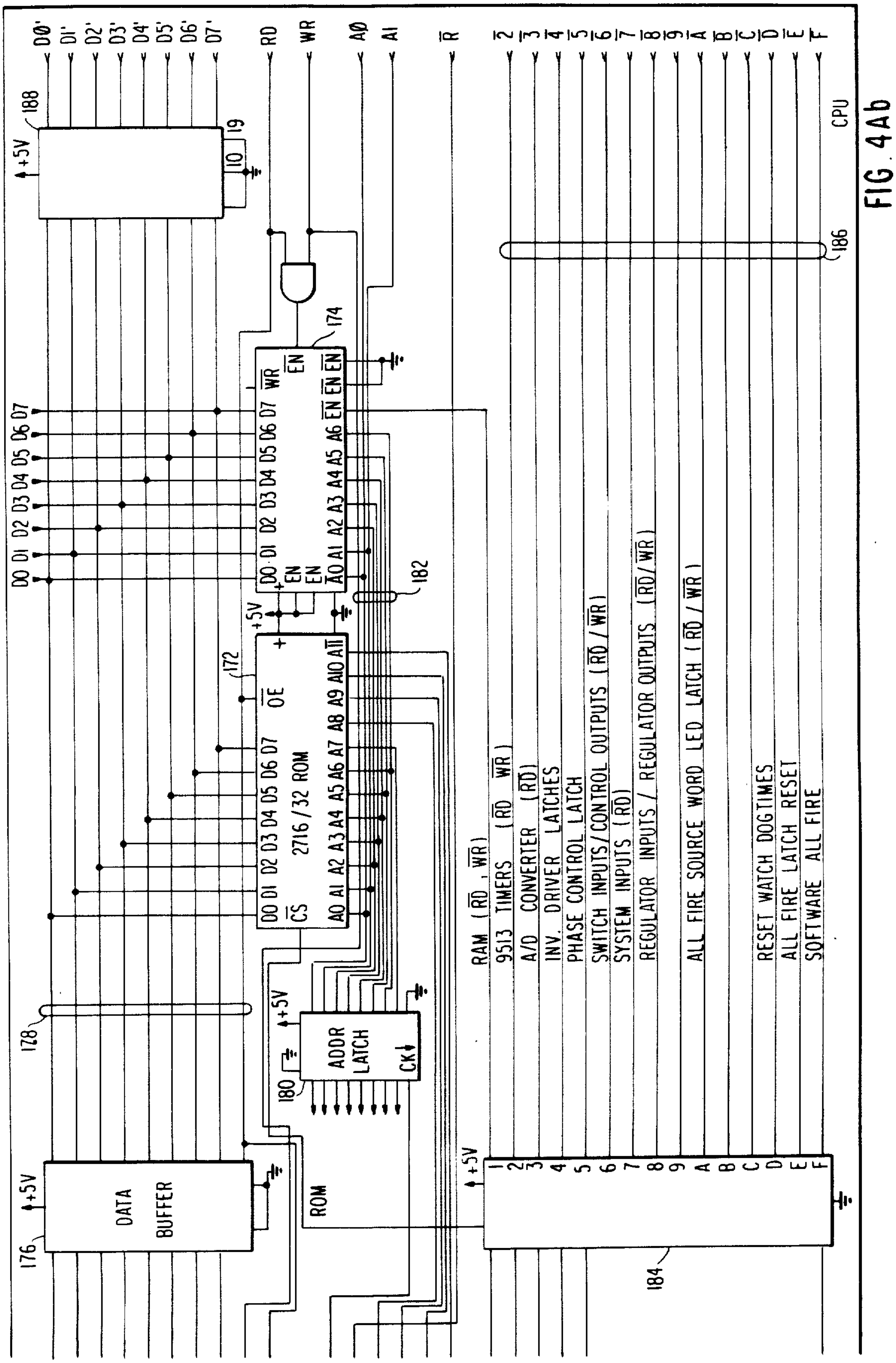
Figure 4B:
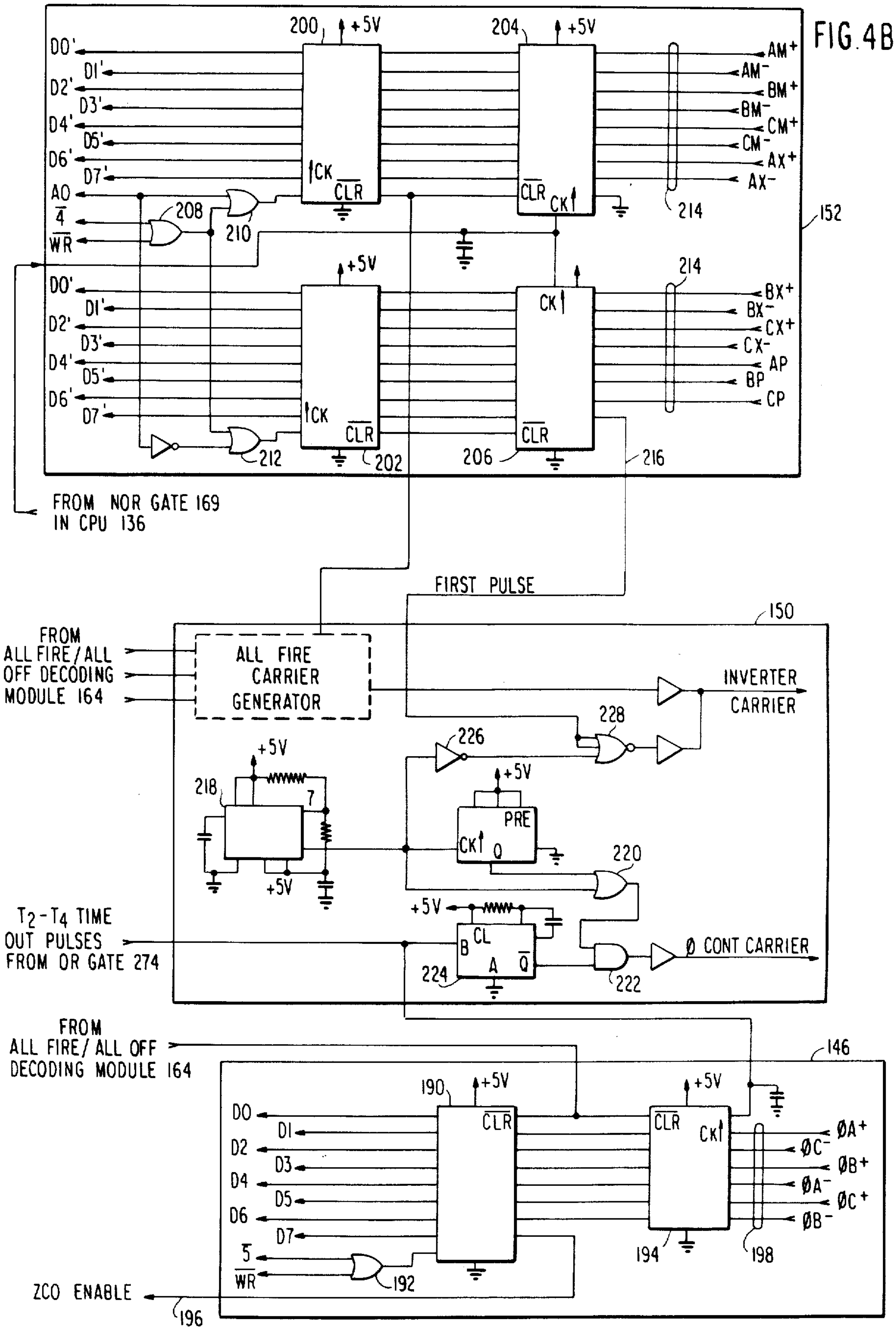
FIG. 4B illustrates the phase control logic module, inverter logic module and carrier generator of the present invention.
Figure 6:
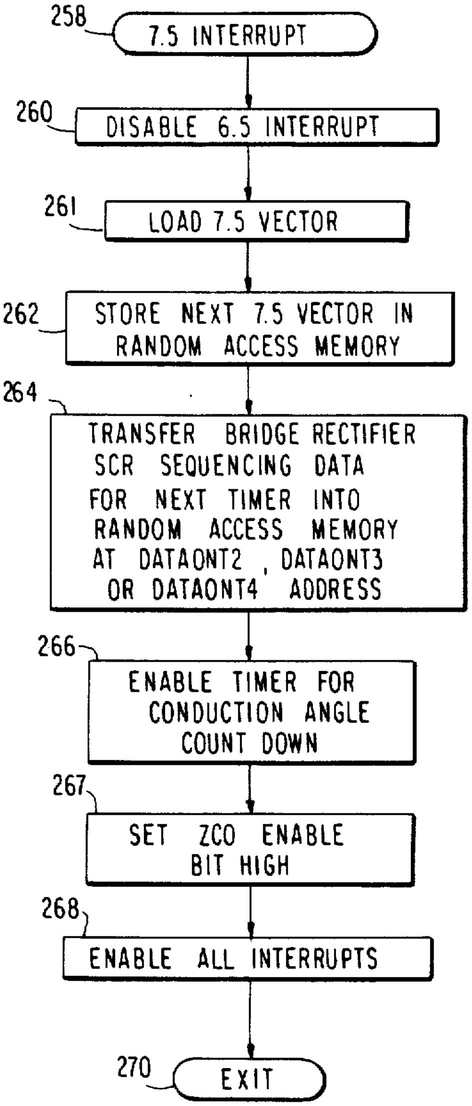
FIG. 6 outlines a flow chart for the CPU software subroutine which determines bridge rectifier SCR sequencing data.
Figure 7:
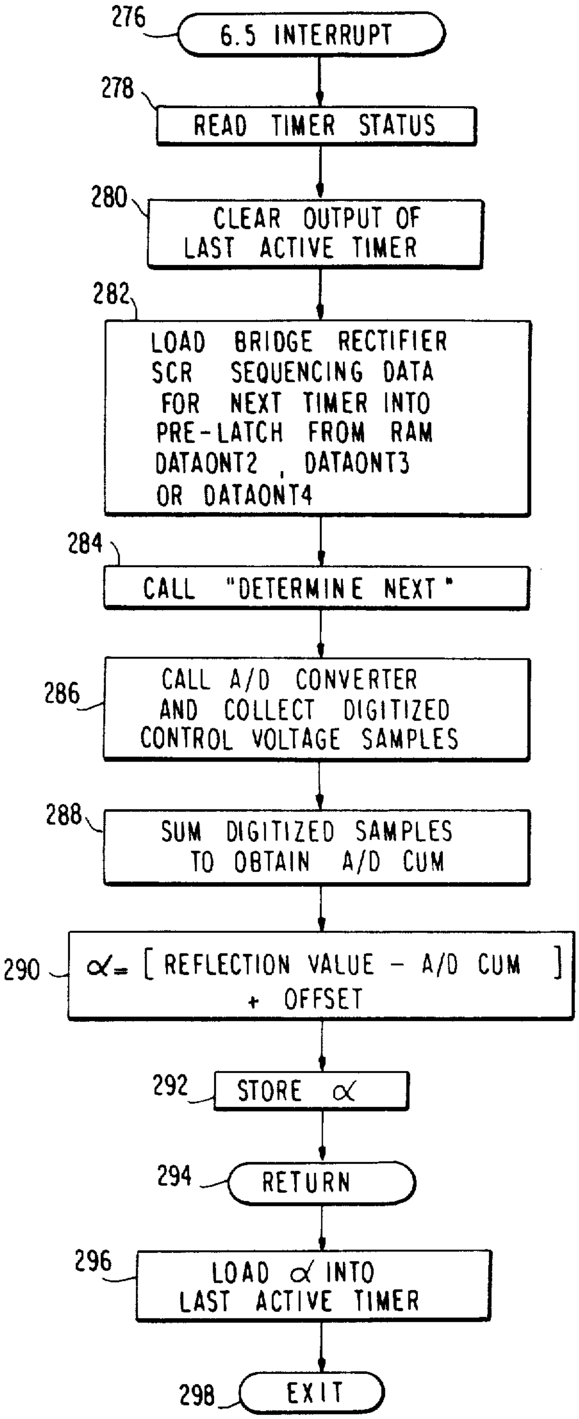
FIG. 7 outlines a flow chart for the CPU software subroutine which calculates bridge rectifier SCR conduction angles.

The manner in which control unit 10 governs the operation of bridge rectifier 6 and inverter 8 is described in greater detail with reference to FIGS. 4A–4B, 5A–5C, 6, 7, 8A–8G, 9A–9C and 10A–10R. FIG. 4A provides a detailed circuit diagram of CPU module 136. FIG. 4B illustrates phase control logic module 146, inverter logic module 152 and carrier generator 150. FIGS. 5A–5C respectively depict the timing pulses employed by CPU module 136 to measure conduction angles for the bridge rectifier SCR's 30–40. FIGS. 6, 7 and 8A–8G illustrate flow charts for the CPU software which calculates bridge rectifier SCR conduction angles and determines bridge rectifier and inverter SCR sequencing data. FIGS. 9A–9C illustrate various timing pulses used by CPU 136 to control the gating of the inverter SCR's and FIGS. 10A–10R illustrate the relationships between the logic signals used to initiate firing pulses for the inverter SCR's.

Turning first to FIG. 4A, it will be recalled that sequencing data and conduction intervals for the various bridge rectifier SCR's 30–40 and inverter SCR's 54, 56, 64, 66 and 72 are established by the CPU 136 using the ZCO signals and the OSC pulses generated on regulator board 78 as timing points. To this end, CPU 136 employs a microprocessor 168 such as an Intel 8085A eight-bit n-channel microprocessor. The Intel 8085A includes a series of hierarchically arranged interrupts, e.g., a 6.5 interrupt, a 7.5 interrupt, and a TRAP interrupt, which initiate software subroutines to determine proper bridge rectifier and inverter SCR's sequencing and conduction intervals. The TRAP interrupt has the highest priority and the "Inverter Driver" subroutine associated therewith is implemented by the OSC pulses to provide sequencing and conduction data for the inverter SCR's. Sequencing and conduction data for the bridge rectifier SCR's is respectively determined by the 7.5 and 6.5 interrupt-initiated subroutines. Gating of the 7.5 and 6.5 interrupts is performed by either the ZCO signals themselves or by the output from a timing circuit 170 such as an Advanced Micro Designs 9513 timing circuit which uses the ZCO signals as a timing reference.

Memory capacity for microprocessor 168 is provided by a read-only memory 172 and a random access memory 174 coupled to the microprocessor. Read-only memory 172 may comprise an Intel 2732 4K EPROM while random access memory 174 may comprise an MCM 6810 RAM. The $AD_0$–$AD_7$ multiplexed address-/data lines of microprocessor 168 are accordingly tied through data buffer 176 and $D_0$–$D_7$ data bus 178 to the $D_0$–$D_7$ data pins of both read-only memory 172 and random access memory 174. The $AD_0$–$AD_7$ multiplexed address/data lines of the microprocessor are also tied through address latch 180 and the $A_0$–$A_7$ address bus 182 to the $A_0$–$A_7$ address pins of both the read-only memory and random access memory. Memory addressing capability is completed by connecting the $A_8$–$A_{11}$ lines of microprocessor 168 to the $A_8$–$A_{11}$ address pins of read-only memory 172. The remaining $A_{12}$–$A_{15}$ address lines of microprocessor 168 drive a 4-line to 16-line decoder 184 arranged in memory-mapped I/O configuration to generate a series of logic and processing command signals on control leads 186. Actual data transfer between the microprocessor/memory of CPU 136 and the logic and processing board data 140 is carried out by supplying $D_0$–$D_7$ data bits directly from $D_0$–$D_7$ data bus 178 to the logic and processing board data bus and by supplying $D_0'$–$D_7'$ data bits from the $D_0$–$D_7$ data bus 178 through buffer/line driver 188 to the logic and processing board data bus.

Moving briefly to FIG. 4B, the phase control logic module 146, the inverter logic module 152 and the carrier generator 150 can all be seen. Phase control logic module 146 includes a pre-latch 190 which receives bridge rectifier SCR sequencing data from the $D_0$–$D_7$ address/data lines of the microprocessor. The memory mapped I/O configuration employed in conjunction with decoder 184 permits the microprocessor to simply address pre-latch 190 using an appropriate combination of $A_{12}$–$A_{15}$ address bits, whereupon a $\bar{5}$ command signal appearing on control leads 186 is directed through OR gate 192 to clock the bridge rectifier SCR sequencing data through pre-latch 190 to a main latch 194. The $\bar{5}$ command signal also causes a ZCO ENABLE signal to appear on output lead 196 of pre-latch 190. The ZCO ENAGLE signal, as will be described hereinbelow, is used to prepare the CPU 136 for receiving the ZCO signal from zero-crossover circuit 88 on regulator board 78. Main latch 194 is subsequently clocked by a pulse output from timing circuit 170 at the appropriate bridge rectifier SCR conduction angles to pass the bridge rectifier SCR sequencing data on to gating circuit 148. The output lines 198 from main latch 194 are each associated with a different bridge rectifier SCR, as indicated by the phase and polarity designators on the output lines.

Inverter logic module 152 includes a pair of pre-latches 200, 202 and a pair of main latches 204, 206 which function in a manner similar to pre-latch 190 and main latch 194 of phase control logic module 146. That is, pre-latches 200 and 202 in inverter logic module 152 receive inverter SCR sequencing data from the $D_0'$–$D_7'$ outputs of buffer/line driver 188. The inverter SCR sequencing data is clocked through pre-latches 200, 202 by supplying appropriate $A_{12}$–$A_{15}$ address bits to the four-bit to sixteen-bit decoder 184, driving the $\bar{4}$ output on control leads 186 low to provide a clock pulse which passes through OR gates 210, 212, and 214 to the clock input of pre-latches 200, 202. The sequencing data is then clocked through main latches 204 and 206 by either the OSC pulse supplied from voltage controlled oscillator 96 on regulator board 78 or by one of two CPU-generated pulses, e.g., a $T_1$ time out pulse or a SOD pulse, which occur during the "inverter Driver" subroutine of microprocessor 168. Inverter SCR sequencing data is output from main latches 204 and 206 to gating circuit 148 via output lines 214. Each output line is associated with a separate main, auxiliary or precharge SCR as indicated by the accompanying phase, polarity and main, auxiliary or precharge designators. In addition, main latch 206 outputs a high FIRST PULSE signal on line 216 when clocked. The purpose of the FIRST PULSE signal is to insure that the inverter carrier signal pulse train supplied by carrier generator 150 to gating circuit 148 begins immediately after the inverter SCR sequencing data is clocked through main latches 204 and 206, thereby guaranteeing that the appropriate inverter SCR's are fired into conduction at the exact intervals defined by the main clocking pulses.

Carrier generator 150 includes a timer/oscillator 218 such as a Motorola MC 1455 which is tuned to generate pulses at a frequency suitable for carrier signal purposes. The timer/oscillator pulses are directed from OR gate 220 through one input of AND gate 222 to define a phase control carrier signal which is superimposed by gating circuit 148 on the SCR sequencing data and passed through the external gate drive circuit 151 to fire the bridge rectifier SCR's. The other input of AND gate 222 is supplied by $\overline{Q}$ output of a retriggerable one-shot 224. This $\overline{Q}$ output is normally high, enabling AND gate 222 to pass the timer/oscillator pulses on to gating circuit 148. The timing pulses from timing circuit 170 which clock main latch 194 in phase control logic module 146, however, are received at the B input of retriggerable one-shot 224 to switch the $\overline{Q}$ output thereof low when main latch 194 is clocked, briefly disabling AND gate 222 and producing the equivalent of a FIRST PULSE signal for the phase control carrier.

The output pulses from timer/oscillator 218 are also supplied through an inverting amplifier 226 and triple-input NOR gate 228 to define the inverter carrier signal which is superimposed on the inverter SCR sequencing data by gating circuit 148 and passed through the external gate drive circuit to generate the inverter SCR firing pulses. The remaining two inputs of NOR gate 228 are connected to receive the FIRST PULSE signal output from main latch 206 in inverter logic 152. As previously noted, the FIRST PULSE signal switches high when main latches 204 and 206 are clocked, forcing the initial portion of the inverter carrier signal waveform low. Because the inverter carrier signal is inverted in gating circuit 148, the presence of this low FIRST PULSE produces a rising edge on the leading edge of the inverter carrier signal envelope containing the pulsed inverter SCR sequencing data used by the external gate drive circuit to generate inverter SCR firing pulses

BRIDGE RECTIFIER OPERATION

Returning to FIG. 4A, it will be recalled that the ZCO signal output from the zero-crossover circuit 88 on regulator board 78 (not shown in FIG. 4A) measures the zero-crossover of the V phase, line-to-neutral waveform on mains line 12. The ZCO signal is used to establish the basic bridge rectifier control cycle, thus providing a means for synchronizing the firing of the bridge rectifier SCR's with the actual AC main line frequency. The ZCO signal is directed through AND gate 230 and OR gate 232 in CPU 136 to the 7.5 interrupt of microprocessor 168. Timing circuit 170, on the other hand, generates a series of pseudo zero-crossovers in each phase of the AC mains voltage input. To this end, timing circuit 170 includes a series of timers $T_2$–$T_5$ which are respectively triggered into counting down from predetermined initial counts by applying pulses to a series of $G_2$–$G_5$ timer gating pins 234. The countdown rate for the timers is determined by the frequency of pulses supplied to the $SCR_2$–$SCR_5$ control pins 236. It should here be noted that timing circuit 170 is driven by an inverter 238 connected to the 2.5 Mhz clock output of microprocessor 168. Hence, the clock input of timing circuit 170 receives a 400 nsec pulse train. This 400 nsec pulse train feeds a divide-by-ten counter (not shown) in timing circuit 170 to provide 4 μsec pulse outputs on timing circuit lead 240. The 4 μsec pulses are passed through an AND gate 242 to the $SCR_2$–$SCR_5$ control pins 236 of the timing circuit, causing the $T_2$-14 $T_5$ counters to decrement at 4 μsec intervals.

The $T_5$ output of timing circuit 170 is directed to the microprocessor 7.5 interrupt through AND gate 244 and OR gate 232. As will be described more fully hereinbelow, the ZCO ENABLE signal from pre-latch 190 in phase control logic module 146 alternately enables AND gates 230 and 244. During power up or reinitialization of control unit 10 following an "all fire" procedure, the ZCO ENABLE signal is set high to render AND gate 230 active. The leading edges of the zero-to-one transitions in the ZCO signal consequently reach the 7.5 interrupt to initiate a counting routine in microprocessor 168, whereby the number of 24 μsec intervals occurring between successive zero-to-one transitions of the ZCO signal may be tallied to yield a COUNT TOTAL. The COUNT TOTAL is simultaneously divided by two and multiplied by two to provide respective OFFSET and REFLECTION values which are stored in random access memory 174 for later use in computing bridge rectifier conduction angles. The OFFSET value represents a 30° segment in the 360° cycle of the AC mains voltage input and the REFLECTION value represents a 120° segment in the 360° cycle of the AC mains voltage input. Microprocessor 168 then loads the COUNT TOTAL into the $T_5$ timer of timing circuit 170 via the timing circuit $D_0$–$D_7$ data inputs. Specifically, the microprocessor accesses timing circuit 170 by supplying the appropriate address signals on the $A_{12}$–$A_{15}$ microprocessor address bit outputs, causing decoder 184 to generate a $\overline{2}$ access signal on control leads 186. The $\overline{2}$ signal is directed to the $\overline{CS}$ input of timing circuit 170. Microprocessor 136 thereafter locates the $T_5$ timer in timing circuit 170 by writing an $A_1$ command signal into the $C/\overline{D}$ input of timing circuit 170 and furnishing the necessary vector on the timing circuit $D_0$–$D_7$ inputs. The actual COUNT TOTAL value is loaded into the timing circuit by generating a digital representation of the COUNT TOTAL value on the timing circuit $D_0$–$D_7$ inputs while rewriting the microprocessor $A_1$ signal to indicate an instruction mode at the $C/\overline{D}$ input of the timing circuit. The $\overline{2}$ access signal supplied to the timing circuit $\overline{CS}$ input is also fed to the A input of a retriggerable one shot 245, switching the one shot $\overline{Q}$ output low to disable AND gate 242 and prevent 4 μsec pulses from reaching control pins 236 during the $T_5$ loading operation.

Once the $T_5$ timer is triggered, the COUNT TOTAL loaded into the $T_5$ timer is decremented at 4 μsec intervals by the 4 μsec pulses reaching the $SCR_2$–$SCR_5$ control pins 236 from timing circuit lead 240. Inasmuch as the COUNT TOTAL reflects the number of 24 μsec intervals occurring between successive ZCO signals, it can be seen that the $T_5$ timer will "time out" to generate a time out pulse at a point one sixth of the way through each ZCO signal cycle. Intermediate the ZCO zero-to-one transitions, the ZCO ENABLE is low and the $T_5$ time out pulse is therefore dirrected through AND gate 244 to both the 7.5 interrupt of microprocessor 168 and to an OR gate 246. The output from OR gate 246 reaches the $G_5$ timer gating pin for the $T_5$ timer, causing the $T_5$ timer to once again begin decrementing the COUNT TOTAL. As a net result, a series of six time out pulses are generated by the $T_5$ timer during each interval between ZCO zero-to-one signal transitions, and the $T_5$ timer accordingly "tracks" the six real time zero-crossovers which occur in the U, V and W phases during each 360° period or cycle of the AC mains voltage input. Of course, the 30° degree lead between the ZCO signal and the actual zero-voltage point of the V-to-U line-to-line waveform results in a similar 30° lead between the pseudo zero-crossover points marked by the $T_5$ timer output and the real time zero-crossovers of each phase in the AC mains voltage input, permitting phase delay and conduction angle calculations to be performed for the bridge rectifier SCR's in advance of the real time line-to-line zero-crossover points. The latter relationships are graphically depicted in FIGS. 5A-5C.

Synchronization between the bridge rectifier operation of control unit 10 and the AC mains voltage input frequency is maintained by permitting the ZCO signal to initiate one out of every six 7.5 interrupts in microprocessor 168. This is accomplished by running the ZCO ENABLE signal from pre-latch 190 in phase control logic module 146 high following the occurrence of the fifth $T_5$ time out pulse in each bridge rectifier control cycle to enable AND gate 230 in anticipation of the ZCO signal. Due to the action of inverter 248, the high ZCO ENABLE signal which enables AND gate 230 simultaneously disables AND gate 244 to block the sixth $T_5$ time out pulse in each bridge rectifier control cycle from reaching the 7.5 interrupt of microprocessor 168. In this manner, the sixth 7.5 interrupt will be gated by a real time signal rather than a pseudo signal. Synchronization between the bridge rectifier control operation of control unit 10 and the AC mains voltage input can be further enhanced by comparing the $T_5$ time out pulses with the ZCO signals and using the outcome of such a comparison to adjust as necessary the COUNT TOTAL, OFFSET and REFLECTION values stored by the microprocessor. The $T_5$ time out pulses from timing circuit 170 are connected to supply the clock input for a $J\overline{K}$ flip-flop 250, the $J\overline{K}$ inputs of which are supplied by the ZCO ENABLE signal. If the sixth $T_5$ time out pulse in each bridge rectifier control cycle occurs while the ZCO ENABLE signal is still high, i .e., occurs before the appearance of the ZCO signal, the Q output of flip-flop 250 will be clocked high. Consequently, examination of the flip-flop Q output after a ZCO-initiated 7.5 interrupt permits microprocessor 168 to ascertain whether the sixth $T_5$ time out pulse is being generated in advance of or subsequent to the ZCO signal. Where a ZCO-initiated 7.5 interrupt occurs and the Q output of flip-flop 250 remains low, microprocessor 168 assumes that the $T_5$ time out pulses are lagging and the OFFSET value is decreased by one. The COUNT TOTAL, which is twice the OFFSET value, is then recomputed to shorten the period between successive $T_5$ time out pulses. Conversely, where the Q output of flip-flop 250 is high at the time of the ZCO-initiated 7.5 interrupt, microprocessor 168 assumes that the $T_5$ time out pulses are leading, the OFFSET value is increased by one and the COUNT TOTAL is recomputed to lengthen the period between successive $T_5$ time out pulses. In both instances, the REFLECTION value is also recomputed and stored in the random access memory 174.

As noted above, AND gate 244 is only enabled for the first five $T_5$ time out pulses. After the fifth $T_5$ time out pulse is generated, the ZCO ENABLE signal switches high to disable AND gate 244 in preparation for the ZCO-initiated 7.5 interrupt and the sixth $T_5$ time out pulse cannot reach gating pins 234 to retrigger the $T_5$ timer. Some means must then be provided for pulsing the gating pins at the sixth or ZCO-initiated 7.5 interrupt of each bridge rectifier control cycle. A pair of $J\overline{K}$ flip-flops 252 and 254 are employed for this purpose, providing a double pulse for use by the gating pins upon the occurrence of the sixth zero-crossover point in the bridge rectifier control cycle. A double pulse is necessary because a single pulse might reach gate pins 236 exactly at the terminal count of the $T_5$ timer, preventing the $T_5$ timer from being retriggered. The J input of flip-flop input 252 is tied to the output of AND gate 230, while the $\overline{K}$ input of flip-flop 252 receives the Q output of flip-flop 254. The Q output of flip-flop 252 is connected to gating pins 234 through OR gate 246 and simultaneously supplies the clock input of flip-flop 254. The clock input of flip-flop 252 receives 4 μsec clock pulses from the timing circuit lead 240 of timing circuit 170 via inverter 256. The ZCO ENABLE signal is tied to the Clear pin of flip-flop 252 and is also tied to the Preset pin of flip-flop 254. Finally, the J and $\overline{K}$ inputs of flip-flop 254 are respectively tied high and low while the Preset of flip-flop 252 and the Clear of flip-flop 254 are both tied high. Prior to the occurrence of the high ZCO ENABLE signal which follows the fifth $T_5$ time out pulse, the low Present and high Clear inputs of flip-flop 254 produce a high Q output which reaches the $\overline{K}$ input of flip-flop 252. When the ZCO ENABLE signal switches high in anticipation of the ZCO signal, the $\overline{K}$ input to flip-flop 252 remains high until flip-flop 252 is clocked. Meanwhile, the ZCO signal which occurs at the sixth zero-crossover point of the bridge rectifier control cycle drives the J pin of flip-flop 252 high to produce a high Q output from flip-flop 252 upon receipt of the next 4 μsec output from inverter 256. This high Q output from flip-flop 252 passes through OR gate 246 to drive the gating pins 234 of timing circuit 170 and also clocks the flip-flop 254. The Q output of flip-flop 254 subsequently switches low to drive flip-flop 252 into a toggle mode, causing the Q output of flip-flop 252 to switch low and then high again in response to successive 4 μsec pulses from inverter 256. The next high Q output from flip-flop 252 toggles flip-flop 254, switching the Q output thereof high to remove flip-flop 252 from the toggle mode. Flip-flop 252 thus continues to output a high Q despite being clocked by 4 μsec pulses from inverter 256. In fact, the Q output of flip-flop 252 remains high until the ZCO ENABLE signal switches low after the sixth zero-crossover of the instant bridge rectifier control cycle has passed, clearing the Q output of the flip-flop 252 until the entire sequence is repeated again at the sixth zero-crossover point of the next bridge rectifier control cycle. In this manner, it can be seen that a double pulse is received by gating pins 234 as each ZCO signal reaches CPU 136.

As previously described, the $T_5$ time out pulses passing through AND gate 244 and the ZCO signal passing through AND gate 230 reach the 7.5 interrupt of microprocessor 168 at 60° intervals throughout the bridge rectifier control cycle. The attendant gating of each 7.5 interrupt initiates a software subroutine to determine which of the bridge rectifier SCR's 30–40 is next in line for firing. The 7.5 subroutine is outlined in flow chart form in FIG. 6. Specifically, gating of each 7.5 interrupt, as indicated at program block 258, results in the disabling of the 6.5 interrupt of microprocessor 168, as indicated at program block 260. The address vector associated with the 7.5 interrupt, which has been stored in the VEC75 memory cell of random access memory 174 during the previous 7.5 subroutine, is loaded into the microprocessor at block 261 and the 7.5 subroutine returns to the VEC75 memory cell for the purpose of storing the memory address information necessary to establish the 7.5 vector for the next 7.5 interrupt, as indicated at program block 262. Upon reaching program block 264, the 7.5 interrupt addresses read-only memory 172 at an address location determined by the vector associated with the instant 7.5 subroutine, whereupon sequencing data reflecting the identity of the next-to-fire bridge rectifier is removed from the read-only memory via the $D_0$–$D_7$ data bus 178 and loaded into the DATAONT2, DATAONT3 or DATAONT4 data RAM cells in random access memory 174 for use during the 6.5 interrupt-initated subroutine. One of the $T_2$–$T_4$ phase timers in timing circuit 170 is enabled by the 7.5 subroutine at program block 266 to perform a phase delay countdown at the next zero-crossover point in the bridge rectifier control cycle subroutine. If the 7.5 interrupt has been initiated by the fifth $T_5$ time out pulse, the 7.5 subroutine moves to program block 267 and "or's" a logic "one" into the registers of the microprocessor to set the ZCO ENABLE bit high. The latter step is taken because the ZCO ENABLE signal must be driven high following the fifth $T_5$ time out pulse to disable AND gate 244 and enable AND gate 230 in preparation for receiving the ZCO pulse from zero-crossover circuit 88, permitting the sixth 7.5 interrupt in each bridge rectifier control cycle to be initiated by the ZCO signal. The ZCO ENABLE output lead is actually driven high by writing the logic "one" into the appropriate input of pre-latch 190 in phase control logic module 146 using the $A_{12}$–$A_{15}$ address bits to generate a low $\bar{5}$ signal in decoder 184. The 7.5 subroutine then enables all other interrupts and exits, as respectively indicated at program blocks 268 and 270.

In addition to gating the 7.5 interrupt in microprocessor 168, the $T_5$ time out pulses from timing circuit 170 are responsible for initiating a phase delay countdown procedure which establishes the conduction intervals for the bridge rectifier SCR's. As discussed above, the $T_5$ time out pulses are directed through AND gate 244 to OR gate 246 and the $G_2$–$G_5$ timer gating pins 234 of timer circuit 170. The $G_2$–$G_5$ timer gating pins are respectively associated with the $T_2$–$T_4$ timers in the timing circuit. Software calculations performed at the 6.5 interrupt, to be described below, yield values for bridge rectifier SCR phase delays associated with each phase of the AC mains voltage input, which values can be loaded into the $T_2$–$T_4$ timers and counted down to provide time out pulses indicative of the desired conduction angles. Hence, a selected one of the $T_2$–$T_4$ timers will be loaded with phase delay data and enabled by the 7.5 subroutine to begin a phase delay countdown at each $T_5$ time out pulse.

Following the triggering of the selected $T_2$–$T_5$ timer at each $T_5$ time out pulse, the phase delay countdown proceeds until the $T_2$–$T_4$ time out is reached. An appropriate one of the bridge rectifier SCR's has already been selected by the 7.5 subroutine and sequencing data identifying the selected bridge rectifier SCR has been clocked by the previous 6.5 subroutine through the pre-latch 190 in phase control logic module 146. At the conclusion of the phase delay countdown, the selected timer generates a time out pulse which passes through one of two OR gates 272, 274 and is directed to the clock input of main latch 194 in the phase control logic module. The sequencing data identifying the selected bridge rectifier SCR is clocked through main latch 194 to switch the output line 198 associated with the selected bridge rectifier SCR high, activating gating circuit 148 and the external gate drive circuit 151 to provide firing pulses for the gate of the selected bridge rectifier SCR.

The time out pulses generated by the selected $T_2$–$T_4$ timer also clock the 6.5 interrupt of microprocessor 168 to initiate the 6.5 subroutine. The 6.5 subroutine computes the phase delay required by the next-to-fire bridge rectifier SCR in order to maintain the desired voltage across DC bus leads 14, 16. As shown in flow chart form in FIG. 7, the 6.5 subroutine is initiated at program block 276 by the firing pulse of the last active $T_2$–$T_4$ timer. As indicated at program blocks 278 and 280, a $T_2$–$T_4$ timer status check is performed in order to ascertain the identity of this last active $T_2$–$T_4$ timer and the time out pulse is cleared from the last active timer output. At program block 282, data identifying the next-to-fire SCR is fetched from either the DATAONT1, DATAONT2 or DATAONT3 locations in random access memory 174 and loaded into pre-latch 190 using the appropriate combination of $A_{12}$–$A_{15}$ address bits to generate a low $\bar{5}$ signal output from decoder 184. A "Determine Next" subroutine is then called to calculate the phase delay required during the next half-cycle operation of the last active $T_2$–$T_4$ timer. The "Determine Next" subroutine, which begins at program block 284, polls the A/D converter 144 and collects either eight or ten samples of the digitized CONTROL VOLTAGE signal as indicated at program block 286. Eight samples are employed for a 60 Hz AC mains input voltage frequency and ten samples are employed for a 50 Hz AC mains input voltage frequency. The digitized samples are summed at program block 290 to provide an A/D CUMULATIVE value which can be used to determine the $T_2$–$T_4$ timer countdown necessary to achieve the bridge rectifier SCR phase delay associated with the desired DC voltage level across the DC bus leads 14, 16. Because the CONTROL VOLTAGE signal is inversely poportional to the required phase delay, the A/D CUMULATIVE value is also inversely proportional to the required phase delay. Program block 290 indicates the precise computation that is performed to obtain the phase delay, i.e.:

$$\alpha = [\text{REFLECTION VALUE} - \text{A/D CUMULATIVE}] + [\text{OFFSET}] \quad (1)$$

where $\alpha$ represents the phase delay and the REFLECTION and OFFSET values are obtained from random access memory 174. Substituting the appropriate control cycle degree equivalents for the REFLECTION and OFFSET values in Equation (1) and rearranging yields:

$$\alpha = [120° - \text{A/D CUMULATIVE}] + [30°] \quad (2)$$

$$\alpha = [150° - \text{A/D CUMULATIVE}] \quad (3)$$

A maximum phase delay of 150° can be obtained for any bridge rectifier if the value of A/D CUMULATIVE is zero. A maximum phase delay will in turn yield a minimum bridge rectifier SCR conduction angle of 30°, leaving a zero voltage across DC bus leads 14, 16. On the other hand, a minimum phase delay of 30° can be obtained where A/D CUMULATIVE equals 120°, yielding a maximum conduction angle of 120° and producing the maximum obtainable voltage across the DC bus leads. A conduction angle of greater than 120° is not desirable, inasmuch as such a conduction angle would gate the bridge rectifier SCR's on in advance of the line-to-line zero-crossover points of the AC input waveform. The phase delay is temporarily stored in the random-access memory 174, as indicated at program block 292, and the "Determine Next" subroutine returns via program block 294 to the 6.5 subroutine. The phase delay is loaded into the last active $T_2$–$T_4$ timer at program block 296 by generating appropriate $A_1$ signals for the $C/\overline{D}$ input of timing circuit 170 and providing respective location command and data instruction signals to the $D_0$–$D_7$ data inputs of the timing circuit. All microprocessor interrupts are subsequently enabled, as indicated at program block 297, and the 6.5 subroutine exits at program block 298.

INVERTER OPERATION

The sequencing of the main SCR's 54, 56, auxiliary SCR's 64, 66 and pre-charge SCR's 72 in inverter 8 necessary to achieve the proper polarity and phase relationships between the current flowing to motor 4 on motor leads 18, 20 and 22 is established by inverter logic module 152 under the direction of CPU 136. That is, sequencing data for the various inverter SCR's is loaded into inverter pre-latches 200, 202 in the inverter logic module via the $D_0$–$D_7$ and $D_0'$–$D_7'$ data leads from data bus 140 and is clocked through main inverter latches 204, 206 in the inverter logic module such that a standard six-step, three-phase waveform is generated on motor leads 18, 22 by inverter 8. Data from inverter pre-latch 200 and main latch 204 initiates firing pulses for the A, B and C phase main positive and negative SCR's 54, 56 as well as the A phase auxiliary positive and negative SCR's 64, 66 while data from inverter pre-latch 202 and main latch 206 initiates the firing pulses for the B and C phase auxiliary SCR's 64, 66, the pre-charge SCR's 72 and the FIRST PULSE.

The OSC pulses generated by voltage-controlled oscillator 96 on regulator board 78 provide a base timing point for determining the conduction intervals of the main SCR's 54, 56, the auxiliary SCR's 64, 66, and the pre-charge SCR's 72 in the inverter 8. More particularly, the rising edge of each OSC pulse gates the TRAP interrupt of microprocessor 168, initiating a software routine which delineates the proper sequencing of main, auxiliary and pre-charge SCR's necessary to achieve polarity reversal of the current flowing on motor leads 18, 20 and 22. The manner in which this is accomplished may be better understood by viewing FIGS. 8A–8G, which outline the TRAP interrupt-initiated subroutines in flow chart form. The TRAP interrupt starts at program block 300 and moves through program block 302 to disable all other interrupts in the microprocessor. At program block 304, an AFPO data bit is queried to determine whether an inverter "all fire" or "all off" condition is occurring where an "all fire" or "all off" condition is indicated at program block 304, i.e., where AFPO equals one, the TRAP interrupt jumps to program block 306 and interrogates an AFIP data bit to determine the type of fault which is causing the "all fire" or "all off" condition. If the "all fire" procedure is in progress, the AFIP data bit equals one and an appropriate diagnostic subroutine is performed as indicated at program block 308 in order to determine the exact fault which lead to the "all fire." If an "all off" condition is indicated, i.e., if the AFIP data bit equals zero, microprocessor 168 performs a software "all off" subroutine at program block 310. The "all fire" and "all off" modes of inverter operation, as well as the generation of the AFPO and AFIP data bits, are discussed more fully hereinbelow.

Assuming that none of the aforementioned fault conditions are present at program block 304, the microprocessor enters the "Inverter Driver" subroutine at program block 312 and enables the $T_1$ timer in timing circuit 170, as indicated at program block 314. A DATA1 word containing sixteen data bits which establish the FIRST PULSE signal, identify the main SCR's to be turned off at the next inverter commutation operation and identify the corresponding auxiliary SCR's which must be turned on to complete the commutation procedure is fetched from an INVDATA1 address in random access memory 174 and loaded into inverter pre-latches 200, 202 as indicated at program block 316. The loading of the DATA1 word is accomplished by supplying appropriate $A_{12}$–$A_{15}$ address bits to four-bit to sixteen-bit decoder 184, driving the $\overline{4}$ output on control leads 186 low to provide a clock signal which passes through OR gates 208, 210 and 212 to the clock inputs of inverter pre-latches 220 and 202. The data bits of the DATA1 word, as will be described shortly, have been placed into the INVDATA1 address location of the random access memory from forward or reverse data tables stored in read-only memory 172, which data tables contain the inverter SCR conduction sequences associated with the run, start up, and shutdown modes of motor operation in either a forward or reverse direction.

After the inverter SCR sequencing data has been loaded into inverter pre-latches 200, 202, the "Inverter Driver" subroutine waits until the falling edge of the OSC pulse passes through triple-input NOR gate 169 to clock main inverter latches 204, 206, whereupon the DATA1 word passes to gating circuit 148 and is combined with the inverter carrier signal to provide external gate drive circuit 151 with the pulsed inverter SCR sequencing data used in generating firing pulses for driving the selected auxiliary SCR's 64 or 66 into conduction. The falling edge of the OSC pulse also passes through an inverter 317 to the $G_1$ gating pin of the $T_1$ timer in timing circuit 170, causing the $T_1$ timer to begin a 50 μsec countdown. These latter two occurrences are indicated in phantom at 318. Microprocessor 168 next modifies the DATA1 word at program block 320, in order to clear out the FIRST PULSE and the auxiliary SCR firing pulses which were generated at the falling edge of the preceding OSC pulse. This modification is performed by zeroing out the microprocessor H register while "anding" the microprocessor L register.

Those main SCR's that were conducting, i.e., those main SCR's associated with inverter output phases other than the inverter phase undergoing polarity reversal, will continue conducting but all of the data bits at the auxiliary SCR bit locations in the DATA1 word will be zeroed to turn off the auxiliary SCR's. Subsequently, as indicated at program block 322, the modified DATA1 word is loaded into pre-latches 200, 202 and a pulse is generated on the SOD line of microprocessor 168, as indicated at program block 324. The SOD pulse passes through triple-input NOR gate 169 to clock the modified DATA1 word through main inverter latches 204, 206 to gating circuit 148, thus turning off the previously conducting auxiliary SCR's and completing the main SCR commutation process.

At program block 326, a sixteen-bit DATA2 word is fetched from the INVDATA2 address in random access memory 174 and loaded into the inverter pre-latches 200, 202 using the appropriate address to activate the $\bar{4}$ outputs on control leads 186. The DATA2 word includes data bits identifying the inverter main SCR's which are on during the next half-cycle of the auxiliary commutated inverter circuit operation, the pre-charge SCR which is to be gated into conduction to prepare for the next main SCR commutation and a FIRST PULSE signal for output from inverter main latch 206. A 90 μsec data bit used in detecting possible commutation failures is then set at program block 328 and the "Inverter Driver" subroutine waits for the 50 μsec interval defined by the $T_1$ timer in timing circuit 170 to be completed, whereupon a $T_1$ timer output pulse is generated as indicated in phantom at program block 330. The $T_1$ timer output pulse passes through triple-input NOR gate 169 to clock the DATA2 word through inverter main latches 204, 206, firing the designated main SCR's and precharge SCR into conduction. Microprocessor 168 then modifies the DATA2 word to clear the precharge SCR and FIRST PULSE signal, as indicated at program block 332. Inasmuch as only the precharge SCR and FIRST PULSE signals are involved, only that portion of DATA2 word generated in the microprocessor H register for transmission to inverter pre-latch 202 need be zeroed. The modified DATA2 word is loaded into pre-latch 202 and the "Inverter Driver" subroutine proceeds to program block 334 where a SOD pulse is again generated at the SOD output of microprocessor 168 to clock inverter main latches 204, 206, clearing the selected precharge SCR and FIRST PULSE signal. The AFPO bit is also queried again to determine whether a fault condition occurred while the OSC pulse was high, as indicated at program block 336. If such a fault has occurred, the AFPO bit will equal one and the "Inverter Driver" subroutine will read and store the AFPO data for diagnostic use, as indicated at program block 338. The "Inverter Driver" subroutine subsequently jumps to program block 340 for interrogation of the AFIP bit in order to determine whether the fault is an "all fire" or "all off" type of fault and the diagnostic or software "all off" subroutines are performed as necessary at program blocks 342 or 344. Where no fault has occurred during the OSC pulse, i.e., where AFPO equals zero, the "Inverter Driver" subroutine continues on to program block 346 for the next series of machine steps.

The actual timing of the commutation and phase polarity reversal procedures carried out at program blocks 312-334 of the "Inverter Driver" subroutine can be better understood by examining FIGS. 9A-9C, wherein the relationshps between the OSC pulse responsible for firing auxiliary SCR's, the SOD output from microprocessor 168 responsible for turning auxiliary and pre-charge SCR's off and the $T_1$ time out pulse responsible for firing main SCR's can all be seen. The relevance of the 90 μsec bit can also be better explained in conjunction with FIGS. 9A-9C. If a shoot-through condition resulting in a BCT signal output from current monitoring circuit 118 on regulator board 78 (not shown in FIGS. 8A-8G) appears during the 90 μsec interval defined by the 90 μsec bit, the microprocessor assumes that a commutation failure has occurred and the particular main SCR which failed to commutate can be identified by referring to the inverter SCR sequencing data which has just been generated at program blocks 312-334.

Figure 8A:
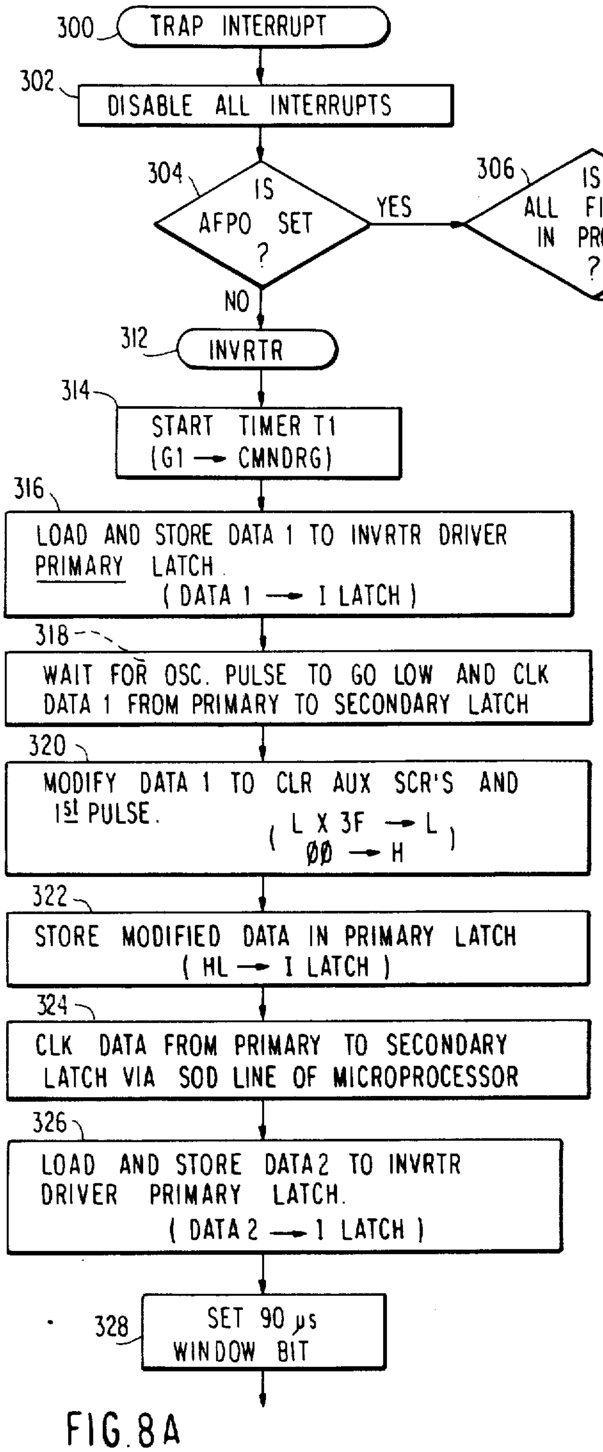
Figure 8B:
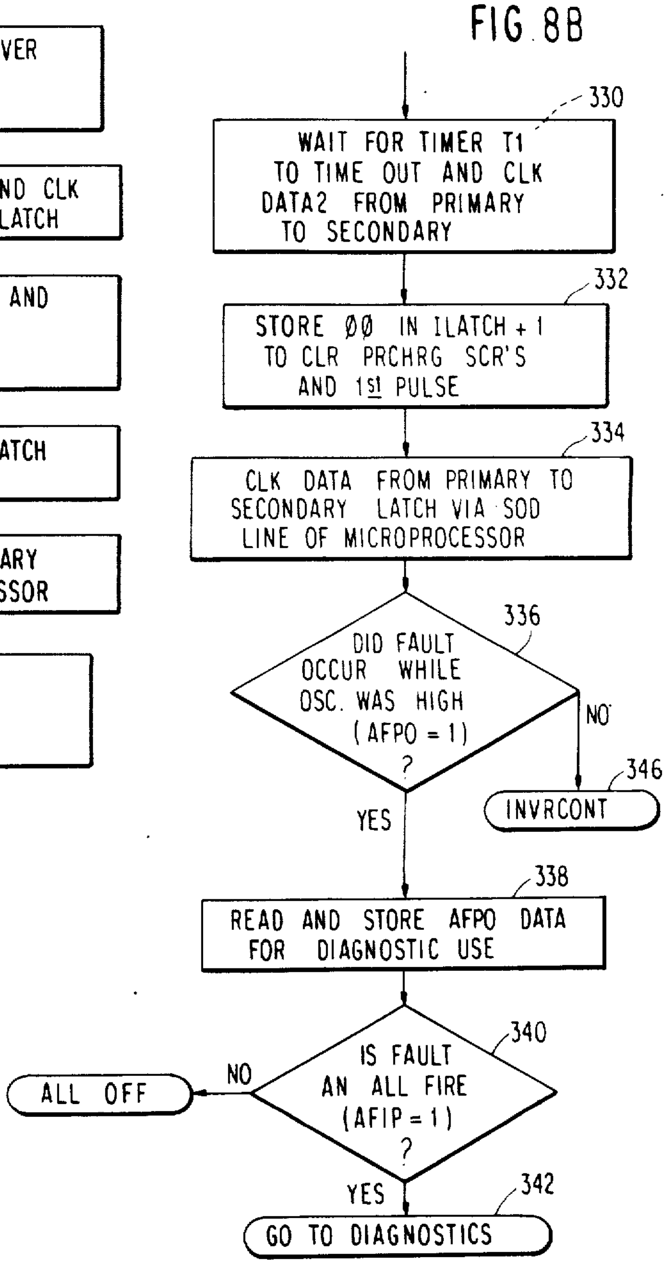
Figure 8C:
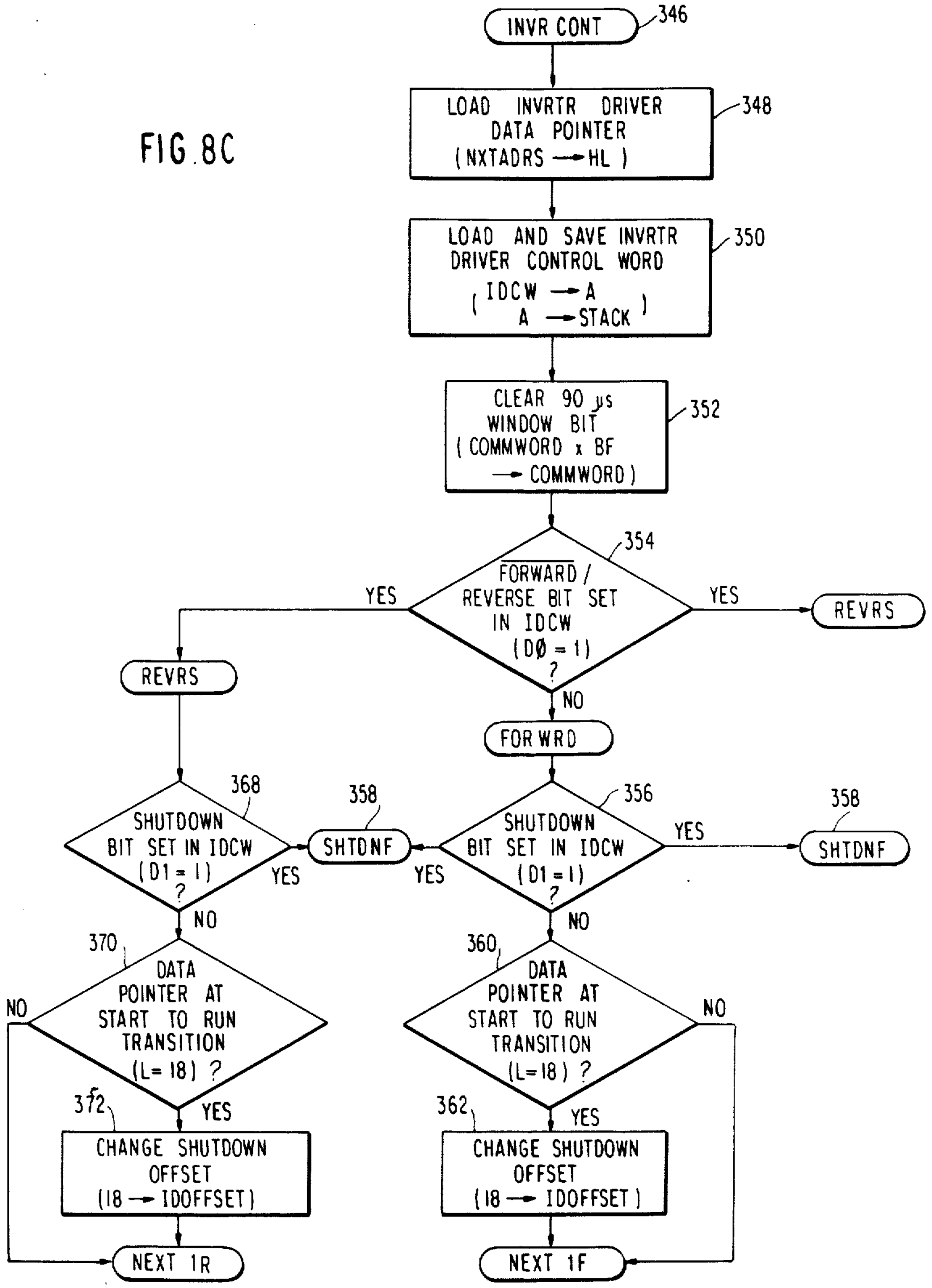

Turning now to FIG. 8C, the "Inverter Driver" subroutine moves on from program block 346 and stores the most recent subroutine data pointer in the LASTADRS location of random access memory 174, as indicated at program block 348. The subroutine data pointer is used by the "Inverter Driver" subroutine as disclosed hereinbelow to locate the DATA1 and DATA2 data bits in read-only memory 172 in preparation for transferring the DATA1 and DATA2 words to the random access memory 174. Hence, the most recent subroutine data pointer will serve as a guide to the storage location of the DATA2 data bits which were retrieved at program block 326 following the most recent inverter commutation procedure instituted at program blocks 316-324. If, prior to the next succeeding loop of the "Inverter Driver" subroutine, the "all off" subroutine is initiated, the "all off" subroutine can employ the subroutine data pointer stored in LASTADRS of the random access memory to determine the identify of the main SCR's which must be turned off in order to complete an "all off" operation. The "Inverter Driver" subroutine next loads an Inverter Driver Control Word or IDCW at program block 350. The IDCW is an eight-bit status word wherein the $D_0$-$D_2$ data bits provide information related to the forward, reverse and motor shutdown operating modes. At program block 352, the 90 μsec bit originally set at program block 328 in FIG. 8B is cleared and the $D_0$ or $\overline{\text{FORWARD}}$/REVERSE bit in the IDCW is examined to determine which direction motor 4 has been running in, as indicated at program block 354. If $D_0$ equals zero, the motor has been operating in the forward direction and the "Inverter Driver" subroutine moves to program block 356 where the $D_1$ or SHUTDOWN bit in the IDCW is examined to determine whether a motor shutdown or stop procedure has been initiated. If the system operator has toggled motor control switch 84 on regulator board 78 (not shown in FIG. 8C) to generate a motor stop signal, the speed of motor 4 will be slowed by the control unit 10 until reaching a level sufficient to permit motor shutdown, the $D_1$ bit will be set to one and the microprocessor will jump to a "shutdown" subroutine at program block 358.

The "Shutdown" subroutine (not illustrated) simply addresses the shutdown section of the forward data table to pick up at an address location consistent with either the startup section or run section address location in the forward data table toward which the subroutine data pointer is vectored when shutdown is initiated, thereby ensuring that proper sequencing of the inverter SCR's is maintained as the motor operation shifts from either the startup or run mode to the shutdown mode.

Assuming that the system operator continues to signal motor shutdown, the "Inverter Driver" subroutine will continue to loop from the beginning of the TRAP interrupt at program block 300 through program block 356 to the shutdown subroutine 358 as each succeeding OSC pulse occurs until all of the address locations in the shutdown section of the forward data table have been accessed. At this point, the voltage controlled oscillator is disabled and the entire system comes to a stop.

If the shutdown or $D_1$ bit in the IDCW is not set as determined at program block 356, a further inquiry is made at program block 360 to determine whether the subroutine data pointer is at a "start-to-run" transition. Such a determination is necessary because the subroutine data pointer must be offset when the "Shutdown" subroutine is initiated if the aforementioned shift between the old address location in the startup or run section of the forward data table and the new address location in the shutdown section of the forward data table is to be performed properly. The exact amount of offset, however, depends on whether the system is in the startup mode or the run mode at shutdown, inasmuch as a smaller shift in the forward data table is required where the "Inverter Driver" subroutine has already progressed through the startup section of the data table to the data table run section. In actuality, the offset added to the subroutine data pointer is initially set to a predetermined value appropriate for motor startup, and it is this value which is changed at program block 362 (specifically from 30 to 18) when motor 4 is operating in a run mode. When motor 4 is still operating in the startup mode, the offset value is left unchanged. Following the offset determination at program blocks 360–362, the subroutine data pointer is again queried at program block 364 to ascertain whether the subroutine data pointer has reached the end of the run section in the forward data table. If so, the subroutine data pointer is reset to the first address location in the run section of the forward data table, as indicated at program block 366, to continue the run mode commutation and phase polarity reversal procedures of program blocks 312–334 during the next cycle of the "Inverter Driver" subroutine. If the subroutine data pointer has not reached the end of the forward data table run section, the "Inverter Driver" subroutine loops around program block 366 during each subroutine cycle until the end of the run section in the forward data table is reached and the subroutine data pointer is returned to the start of the run section by program block 366.

Referring back briefly to program block 354, where the $D_0$ or $\overline{\text{FORWARD}}$/REVERSE bit in the IDCW is interrogated and found to equal one, motor 4 has been operating in a reverse direction and the "Inverter Driver" subroutine moves through a series of program blocks 368–376 functionally equivalent to program blocks 356–366, except that the "start-to-run" determination, shift in offset and subroutine data pointer reset are all performed using values and addresses appropriate to the reverse data table.

Figure 8D:
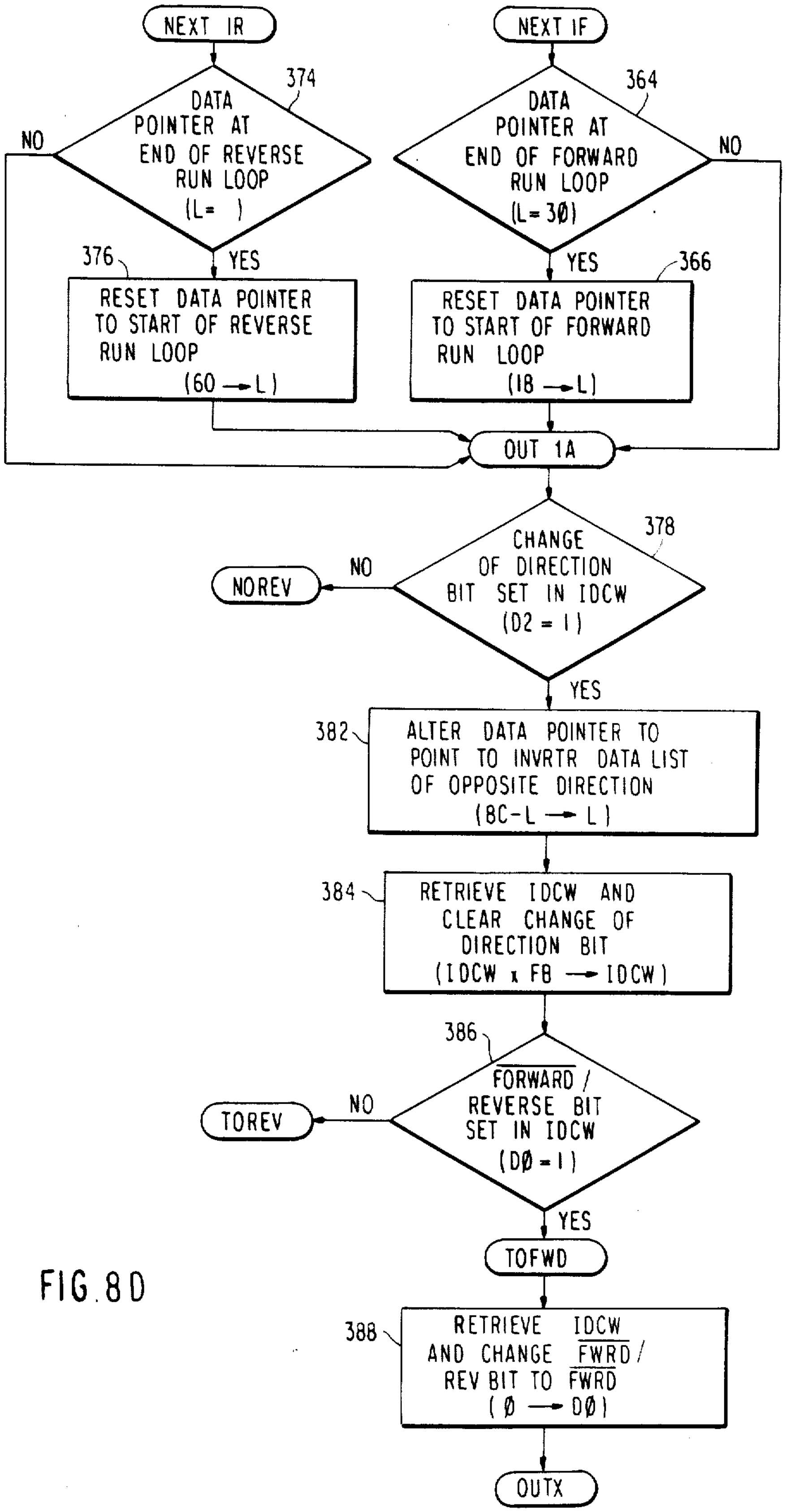

As is evident from FIG. 8D, the $D_2$ or change of direction bit in IDCW is subsequently examined at program block 378 to ascertain whether a change in the direction of motor operation should be initited. Where $D_2$ equals one, no such change is called for and the "Inverter Driver" subroutine simply restores the microprocessor stack to its prior condition, as indicated at program block 380, before jumping to the DATA1 and DATA2 loading procedure described below in connection with FIGS. 8E and 8F. Where motor control switch 86 (not shown in FIG. 8D) on regulator board 78 has been moved by the system operator during the instant cycle of the "Inverter Driver" subroutine to signal a desired change, whether from the forward direction to the reverse direction or vice versa, motor 4 will complete a "glide down" to a speed safe for carrying out motor reversal and $D_2$ will be set to zero by the microprocessor. The "Inverter Driver" subroutine must then alter the subroutine data pointer in preparation for accessing the data table associated with the opposite direction, as indicated at program block 382. The IDCW is retrieved at program block 384 and the $D_2$ or change of direction bit is cleared to prevent the "Inverter Driver" subroutine from again changing motor direction at the next subroutine cycle. The $D_0$ or $\overline{\text{FORWARD}}$/REVERSE bit in the IDCW is interrogated at program block 386 to determine the present direction of motor operation. If motor 4 is in a reverse mode, $D_0$ equals one and thus the $D_0$ bit must be revised to reflect the fact that the motor will henceforth be operating in a forward mode. To this end, the $\overline{\text{FORWARD}}$/REVERSE bit is set to zero, as indicated at program block 388. If $D_0$ equals zero, motor 4 has been operating in the forward direction but as soon as the change of direction signaled at program block 378 is implemented will be operating in the reverse direction. Consequently, the $\overline{\text{FORWARD}}$/REVERSE bit in the IDCW is shifted to one at program block 390 and the IDCW as modified at either program blocks 388 or 390 is thereafter stored in random access memory 174 as indicated at program block 392.

As seen in FIGS. 8E and 8F, the inverter SCR conduction sequence data necessary for carrying out the next commutation and polarity reversal in the operation of auxiliary commutated inverter circuits 48–52 is then obtained from the appropriate data table stored in read-only memory 172 and is loaded into random access memory 174. The data tables themselves, discussed briefly above, are each divided into three sections corresponding to the various operating stages of the motor run mode, e.g., the startup stage, run stage per se and the shutdown stage. In one embodiment of the present invention, the startup section of the forward data table may occupy address locations 00–17 Hex in the read-only memory, the run section of the forward data table may occupy address locations 18–2F Hex and the shutdown section of the forward data table may occupy address locations 30–47 Hex. Similarly, the startup, run and shutdown sections of the reverse data table may respectively occupy ROM address locations 48–5F Hex, 60–77 Hex and 78–8F Hex. It will be noted that twenty-four address locations are used for each section in the forward and reverse direction. As will be disclosed below, data must be withdrawn from four address locations for each commutation and polarity reversal procedure performed by microprocessor 168. In order to provide for the six commutations and polarity reversals in each six-step waveform output from the auxiliary commutated inverter circuits, 6×4 or 24 different address locations are required. The first address locations in the data table accessed during each "Inverter Driver" subroutine cycle are those holding the data bits of the sixteen bit DATA1 word. It will be recalled that the DATA1 word is placed into the INVDATA1 address of random access memory 174 and provides information identifying the inverter SCR's which must be fired to complete the actual inverter commutation procedure in preparation for the next polarity reversal in the inverter output. Because DATA1 is a sixteen bit word, two separate eight-bit data transfers between read-only memory 172 and random access memory 174 must be made. The first data transfer, performed at program block 400, contains information regarding the firing status of the A, B and C phase main positive and negative SCR's 54, 56 and the A phase auxiliary positive and negative SCR's 64, 66. The subroutine data pointer is incremented at program block 402 and the second half of the DATA1 data transfer, containing firing information for the B and C phase positive and negative auxiliary SCR's, the precharge SCR's and FIRST PULSE, is performed at program block 404.

The "Inverter Driver" subroutine next moves to a detection phase and the subroutine data pointer is stored in the microprocessor stack at program block 406. The entire sixteen bits of the DATA1 word are loaded into the microprocessor H and L registers at program blocks 408 and the $D_6$ and $D_7$ data bits from the L register are rotated into the $D_0$ and $D_1$ data bits in the H register at program block 410, creating a commutation failure data word COMMWORD which marks the status of all the auxiliary SCR's 64, 66 in inverter 8. If an "all fire" condition resulting from a BCT signal appears while the 90 μsec bit generated at program block 328 is set, the "all fire" diagnostic subroutines of program blocks 308 and 342 in FIGS. 8A and 8B assume that a commutation failure has occurred. The COMMWORD data word may then be used by the "all fire" diagnostic subroutines to determine the identity of the failed main SCR. Because the 90 μsec bit is itself stored in COMMWORD, shifting of all the data bits in the microprocessor H register as the $D_6$ and $D_7$ data bits of the L register are rotated into the H register may inadvertently change the status of the 90 μsec bit. For this reason, the 90 μsec bit is again cleared at program block 412 and the contents of the microprocessor H register are stored as the new COMMWORD at program block 414. The subroutine data pointer is recalled from the microprocessor stack at program block 416 and incremented at program block 418 to prepare for loading of the DATA2 word into the INVDATA2 address of random access memory 174. As was the case with the DATA1 word, the DATA2 word, which turns on the main SCR's and precharge SCR's and sets the FIRST PULSE to establish polarity reversal following the completion of the next commutation procedure, is a sixteen bit word which must be transferred in two eight bits segments. Accordingly, the first eight bits of the DATA2 word are loaded from the read-only memory into the random access memory at program block 420, the subroutine data poiner is incremented at program block at 422 and the remaining eight bits of the DATA2 word are loaded from the read-only memory into the random access memory at program block 424. The subroutine data pointer is incremented a final time at program block 426 and stored in the NEXTADRS location of the random access memory for use during the next "Inverter Driver" subroutine cycle as indicated at program block 428.

The exit procedure for the "Inverter Driver" subroutine is illustrated in detail in FIG. 8G. After leaving program block 428 of FIG. 8F, the subroutine reaches program block 430 to restore the pre-TRAP status of the microprocessor. If another microprocessor interrupt was masked off by the TRAP interrupt at the beginning of the instant "Inverter Driver" subroutine cycle, the masked-off interrupt is enabled at program block 432 and the microprocessor shifts back to that point in the masked-off interrupt at which the masking occurred. If, however, no other interrupt was in progress when the TRAP interrupt began, the "Inverter Driver" returns to a waiting mode in expectation of the next OSC pulse, as indicated at program block 434.

FIGS. 10A–10R graphically depict the inverter SCR sequencing data generated in the manner described above during several successive "Inverter Driver" subroutine cycles. This sequencing data is output by CPU 136 to the pre-latches 200, 202 and the main latches 204, 206 of the inverter logic module 152 illustrated in FIG. 4B.

ALL FIRE AND ALL OFF OPERATION

The precise manner by which the "all fire" and "all off" procedures are carried out will now be described in connection with FIGS. 11A–11C and 12A–12B. As previously indicated, DC bus shorts, ground faults and anticipated commutation failures are all conditions which lead to "all fire" operation of inverter 8. The manner by which commutation failures can be aniticpated can be better understood with reference to FIGS. 11A–11C. FIGS. 11A and 11B respectively illustrate the voltage and current characteristics during commutation for a typical SCR arranged in auxiliary commutated configuration. Those current and voltage relationships established when the hold-off time imposed by the commutation circuit on the SCR is greater than the SCR turn-off time are depicted in solid-line form while those situations in which the hold-off time imposed by the commutation circuit on the SCR is less than the SCR turn-off time are depicted in dotted line form. In the former case, it can be seen that the SCR successfully blocks the reapplication of forward voltage and all current flow through the SCR ceases. In the latter case, i.e., where hold-off time is less than SCR turn-off time, the SCR starts to block the reapplication of forward voltage but subsequently breaks over and goes back into conduction. Specifically, the commutation pulse supplied by the commutation circuit in the second case reverse biases the SCR and some reverse recovery current flows. Hole-electron recombination nevertheless continues even after the reverse recovery current stops. During this latter period, the SCR has not yet regained its full forward blocking capability and can thus be retriggered into conduction if the forward voltage is too great or is reapplied at too fast a rate. A high forward voltage or fast dV/dt causes a leakage current through the SCR which looks like a small gate current. Typically, only a small portion of the SCR chip turns on in response to the leakage current, and if the turn-off results in a high rate of rise of fault current, too much current will begin forcing its way through a very small area of the chip. This situation can easily cause the SCR to burn out. The system of the present invention anticipates such failures by recognizing the fact that inadequate hold-off times can occur when the load current being commutated is in excess of that designed for. During the bulk of the SCR conduction period, the load current can be greater than the commutation current limit $I_{LIMIT}$ without adversely affecting the SCR. If, however, at some predetermined interval $t_i$ just prior to commutation, the peak load current exceeds $I_{LIMIT}$, an "all fire" procedure is performed in order to avoid burning out the SCR. The latter situation is illustrated in FIG. 11C.

Figure 12A:
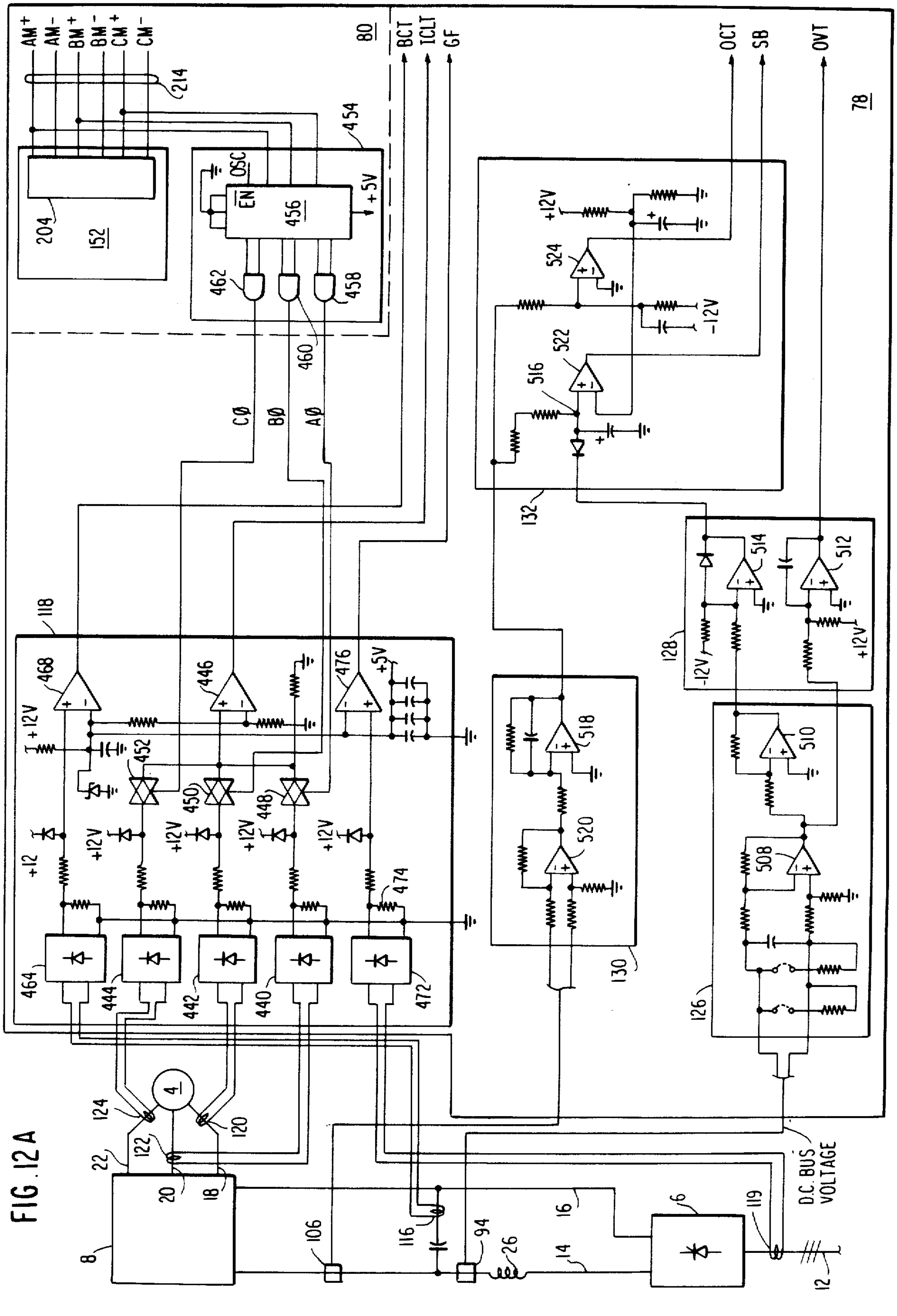

Turning to FIGS. 12A and 12B, it can be seen that each of the current transformers 120, 122 and 124 at regulator board 78 monitor the load current on a separate motor lead 18, 20 and 22. The outputs from the current transformers are respectively rectified by diode rectifiers 440, 442 and 444 in monitoring circuit 118 on the regulator board and are connected to a differential amplifier 446 through one of three quad analog switches 448, 450 and 452. Switches 448, 450 and 452 are supplied with actuation signals by a commutation current "window" circuit 454 in inverter logic module 152 on digital logic and processing board 80. Commutation current "window" circuit 454 comprises a three-bit to eight-bit decoder 456. The outputs of decoder 456 are supplied through AND gates 458, 460 and 462 to the quad analog switches 448, 450 and 452 in current monitoring circuit 118, while the inputs of decoder 456 are alternately supplied by the outputs of the main latch 204 in inverter logic module 152, which outputs are associated with the A, B, and C phase positive main SCR's 54 in auxiliary commutated inverter circuit 48–52. Each AND gate 458–462 is associated with a particular inverter output phase. Input and output connections to deocder 456 are arranged in a manner such that each AND gate 458, 460 and 462 is activated only when a commutation occurs in the inverter output phase with which that AND gate is associated. This is accomplished by enabling the decoder with the falling edge of the OSC pulse. Because the falling edge of the OSC pulse is also responsible for clocking inverter SCR sequencing data from main latch 204 for the purpose of identifying the auxiliary SCR which is gated into conduction to initiate commutation in a particular phase of the inverter output, data identifying the particular commutation being carried out will be present on main latch output lines 214 of the inverter logic module and can be used to activate the associated AND gate 458–462. The corresonding quad analog switch in current monitoring circuit 118 will thus be activated, connecting differential amplifier 446 to the rectified output of the current transformer associated with the inverter output phase being commutated. A comparison with a reference value representing maximum acceptable current loads can then be carried out and the differential amplifier will generate a Current Commutation Limit Trip or ICLT signal if excessively high current loads are present for that phase. When the $T_1$ timer of timing circuit 170 in CPU 106 times out to clock the inverter SCR sequencing data identifying the main SCR which is gated into conduction to initiate polarity reversal in the particular phase, the new set of signals received by decoder 454 from main latch output lines 214 will result in the disabling of the activated AND gate and the corresponding quad analog gate will open to remove the current transformer input to the differential amplifier. The commutation current window circuit 454 thereafter awaits the occurrence of the next commutation in the inverter operation.

When a commutation failure or the like actually occurs during the operation of inverter 8, a short circuit is created across the DC bus leads 14, 16 and the attendant rapidly rising fault current is detected by bus current transformer 116. The output of the bus current transformer is fed to the current monitoring circuit 118 on analog board 78 and rectified in a diode rectifier 464. A normalizing resistor 466 is connected across the output of diode rectifier 464 to provide appropriate current attentuation. An operational amplifier 468 then compares the diode rectifier output with a reference value and generates a bus current trip or BCT signal when the level of current detected by bus current transformer 116 reaches fault levels. The BCT signal is rendered TTL compatible by a diode network 470 in regulator interface 154. The output from the ground fault current transformer 119 is rectified in diode rectifier 472, normalized by normalizing resistor 474 and compared with a reference value in operational amplifier 476 to generate a ground fault trip or GF signal when current flow through the ground line reaches ground fault proportions.

All of the "all fire" type fault signals from current monitoring circuit 118, i.e., the BCT, GF and ICLT signals are directed to the all off/all fire decoding module 164 on digital logic and processing board 80 where they pass through a bank of inverting amplifiers 478 before being input to a quad NAND gate 480. The output of NAND gate 480 passes through OR gate 482 to the clock input of a $J\overline{K}$ flip-flop 484 and is simultaneously supplied to the J input of a $J\overline{K}$ flip-flop 486 in carrier generator 150. When no "all fire" fault conditions are present, the BCT, GF and ICLT signals are all low and NAND gate 480 is disabled. When, however, any one of the "all fire" fault signals switches high in response to the occurrence of an "all fire" type fault condition, the action of inverting amplifiers 478 drives the output of NAND gate 480 high to clock $J\overline{K}$ flip-flop 484. The resulting high Q output from flip-flop 484 clocks a $J\overline{K}$ flip-flop 489 in carrier generator 150 high, providing the AFPO signal employed by microprocessor 168 to ascertain the existence of a fault condition during the TRAP interrupt-initiated "Inverter Driver" subroutine of FIGS. 8A–8G. The high Q output from flip-flop 484 further enables AND gate 485, whereupon an appropriate $\overline{A}$ output from decoder 182 in CPU 136 loads a data latch 487 with information from inverting amplifiers 478 to identify the particular type of fault which has occurred. The low $\overline{Q}$ signal output from flip-flop 484 when the flip-flop is clocked by NAND gate 480 is used to clear pre-latch 190 and main latch 194 in phase control logic module 146, turning off all of the SCR's 30–40 in bridge rectifier 6.

The output from NAND gate 480 which clocks flip-flop 484 switches the aforementioned J input of flip-flop 486 high. The Q output of flip-flop 486 is then driven high on the occurrence of the next clock pulse $\overline{CLK}$ from microprocessor 168, turning on a timer-oscillator 488. Timer/oscillator 488, which may comprise a Motorola MC 1455 timer, subsequently outputs a pulse train through inverting amplifier 490 to supply gating circuit 148 (not shown in FIGS. 12A or 12B) with a carrier signal which gates all of the main SCR's 54, 56 in inverter 8 into conduction. The pulse train from timer-/oscillator 488 also passes through OR gate 492 to supply gating circuit 148 with a carrier signal which gates all of the auxiliary SCR's 64, 66 in inverter 8 into conduction. The characteristics of timer/oscillator 488 are such that the timer/oscillator output is low at the timer-/oscillator startup. The presence of inverting amplifier 490, however, causes the carrier signals for the inverter main SCR's to begin immediately, whereas the carrier signals for the inverter auxiliary SCR's come directly from timer/oscillator 488 and begin one-half period into the operation of the timer/oscillator, i.e., at the point where the timer/oscillator output first switches high. A delay between the initiation of the inverter main SCR carrier signals and the inverter auxiliary SCR carrier signals is thus introduced, insuring that the inverter main SCR's fire in advance of the inverter auxiliary SCR's. Otherwise, conduction of the inverter auxiliary SCR's might commutate the inverter main SCR's and prevent the "all fire" from taking place in the inverter.

In addition to starting timer/oscillator 488, the high Q output of flip-flop 486 supplies the AFIP signal employed during the TRAP interrupt-initiated "Inverter Driver" subroutine of microprocessor 168 and also triggers a precharge relay (not shown) which disconnects transformer 76 (not shown in FIGS. 12A or 12B) from the precharge capacitors 68 in the auxiliary commutated inverter circuits 48-52. Meanwhile, the $\overline{Q}$ output of flip-flop 486 switches low to disable AND gate 493. The output of AND gate 493 likewise switches low to generate an $\overline{R/AF}$ signal which clears inverter prelatches 200, 202 and inverter main latches 204, 206 in the inverter logic module 152 (not shown in FIGS. 12A or 12B). The "all fire" condition is maintained for approximately one-half second during which time microprocessor 168 sits in a loop. At the completion of the "all fire" period, microprocessor 168 generates the $A_{12}$-$A_{15}$ address bits necessary to provide a low $\overline{E}$ output on the control leads 186 from decoder 184, clearing flip-flop 486 and restoring the Q output thereof to a low value which turns off timer/oscillator 488. The low $\overline{E}$ signal also clears flip-flop 484.

If desired, an "all fire" procedure can be initiated via appropriate software in microprocessor 168. Specifically, microprocessor 168 can be programmed to supply decoder 184 with $A_{12}$-$A_{15}$ address bits necessary to generate a low $\overline{F}$ output. The low $\overline{F}$ output is in turn supplied to the Preset pin of flip-flop 486, driving the Q output thereof high to initiate an "all fire" procedure as described above. Software implementation of the "all fire" procedure is desirable in order to discharge DC bus leads 14, 16 following an "all fire" procedure and may also be used to discharge the DC bus leads the first time a motor run mode is instituted following power up of the system.

The all fire/all off decoding module 164 may incorporate another feature which functions together with microprocessor 168 to provide a microprocessor "watchdog" capability, i.e., a capability for monitoring the microprocessor to determine whether the microprocessor software is being properly implemented. Specifically, all off/all fire decoding module 164 includes a Motorola MC 1455 timer/oscillator 494 which is set to time out approximately every 2 msec. The WDT signal output of oscillator/timer 494 supplies the final input to quad NAND gate 480. This output is normally left high to disable NAND gate 480 but will switch low unless timer/oscillator 494 is restarted by driving the timer/oscillator "2" pin low and discharging capacitor 496 prior to the timer/oscillator time out. Punctual restarting of timer/oscillator 494 is accomplished by programming microprocessor 168 to provide a low $\overline{D}$ output from decoder 184, a low $D_3'$ data bit and a high $D_4'$ data bit once during each timing interval of timer/oscillator 494. The low $\overline{D}$ and $D_3'$ bits pass through OR gate 498 to one input of OR gate 500 while the high $D_4'$ bit is inverted by inverting amplifier 502 and fed to the other input of OR gate 500. Assuming that microprocessor 168 is functioning properly, i.e., that in fact the $\overline{D}$ and $D_3'$ bits are low and the $D_4'$ bit is high at the appropriate point during the operation of the microprocessor, the output of OR gate 500 will switch low to disable AND gate 504, driving pin "2" of timer/oscillator 494 low and turning on PNP transistor 506 to rapidly discharge capacitor 496. Timer/oscillator 494 will consequently be restarted before it has a chance to time out and the WDT signal input to quad NAND gate 480 will remain high. Conversely, where microprocessor 168 is malfunctioning, that portion of the microprocessor software dedicated to providing the aforementioned $\overline{D}$, $D_3'$ and $D_4'$ signals will fail to achieve proper synchronization with the operation of timer/oscillator 494, AND gate 504 will not be disabled in time and the timer/oscillator will time out to drive the WDT signal low, clocking flip-flop 484 to create an "all fire" situation which will alert the system operator to the microprocessor malfunction. It should here be noted that the remaining input to AND gate 504 is supplied by the $\overline{R/AF}$ signal from AND gate 493 in carrier generator 150. Under normal system operating conditions, the $\overline{R/AF}$ signal is high and the output of AND gate 504 switches in accordance with the status of the $\overline{D}$, $D_3'$ and $D_4'$ data bits. When an "all fire" procedure is initiated, AND gate 493 in the carrier generator outputs a low $\overline{R/AF}$ signal which disables AND gate 504 independent of the $\overline{D}$, $D_3'$ and $D_4'$ data bits from microprocessor 168. Timer/oscillator 494 is thereafter restarted to prevent a second "all fire" procedure from being initiated due to the preoccupation of the microprocessor with the preceding "all fire" situation.

"All off" conditions are detected by either the DC bus voltage sensor 94 connected across DC bus leads 14, 16 or by the bus current sensor 106 on DC bus lead 14. The output from the bus voltage sensor is attenuated by connecting the bus voltage sensor across a differential amplifier 508 in the voltage feedback conditioner 126. The output of differential amplifier 508 is supplied to a second amplifier 510 in the voltage feedback conditioner circuit, which second amplifier references the differential amplifier output with respect to ground. A differential amplifier 512 in DC bus voltage and output current detector 128 directly receives the output from differential amplifier 508 and generates an over voltage trip or OVT signal whenever the DC bus voltage exceeds a predetermined voltage threshold. Simultaneously, a second differential amplifier 514 in DC bus voltage and output current detector 128 receives the output from amplifier 510 in the voltage feedback conditioner 126. The output of amplifier 514, which is a signal representing the DC bus voltage, is connected to a summing junction 516 in DC current detector 132. The other input to summing junction 516 is supplied by the output of an inverting amplifier 518 in the current feedback conditioner 130. Inverting amplifier 518 in turn receives the output from a differential amplifier 520 connected across the bus current sensor 106. Hence, the output of the inverting amplifier 518 is a signal representative of the current flow through the DC bus leads 14, 16. Summing junction 516 is tied to the positive input of a differential amplifier 522 in the DC current detector 132. Differential amplifier 522 outputs a shorted bus or SB signal whenever the voltage across and current through the DC bus leads reach values indicative of a short circuit. In addition to providing one input for summing junction 516, the output of inverting amplifier 518 in current feedback conditioner 130 directly supplies the positive input for a second operational amplifier 524 in DC current detector 132. Operational amplifier 524 compares the output of inverting amplifier 518 against a reference value and generates an overcurrent trip or OCT signal when conditions are such that excess current is flowing through DC bus leads 14, 16. A final "all off" condition may be established by providing the control unit power supply (not shown) with a circuit which outputs a PS signal whenever the power supply voltages are out of tolerance.

The various "all off" signals are directed from the DC bus voltage and output current detector 128 and the DC current detector 132 through regulator interface 154 to the all off/all fire decoding module 164 and are inverted by inverting amplifiers 478 before reaching a second quad NAND gate 526 in the all off/all fire decoding module. The output of NAND gate 526 clocks $J\bar{K}$ flip-flop 484 via OR gate 482 as does the output of NAND gate 480. Hence, if an "all off" type fault occurs during system operation, the appropriate "all off" fault signal will switch the output of NAND gate 526 high to clock flip-flop 484, driving the Q output thereof high to initiate the AFPO signal in flip-flop 489 of carrier generator 150. The AFPO signal, it will be recalled, warns microprocessor 168 that a fault condition of some type exists. When "all off" types of faults in particular occur, however, $J\bar{K}$ flip-flop 486 in the carrier generator 150, the J input of which is connected to NAND gate 480, is not affected and the AFIP signal remains low, permitting the microprocessor to perform the "all off" subroutine outlined at program blocks 310 and 344. The high Q output from flip-flop 484 additionally enables AND gate 485. Data latch 487 can then be loaded with data identifying the particular "all off" fault situation. The $\bar{Q}$ output of flip-flop 484 again switches low to clear the pre-latch 190 and main latch 194 in phase control logic module 146, insuring that the bridge rectifier SCR's 30-40 are turned off to disconnect mains line 12 from the DC bus leads 14, 16 at the outset of the "all off" procedure.

REPRESENTATIVE SOFTWARE PROGRAM FOR IMPLEMENTING MICROPROCESSOR OPERATION

A suitable software program for performing all of the various microprocessor subroutines discussed above is listed as follows:

```
                ************************************************************************:
                ***************** INTERRUPT VECTORING ROUTINES *****************************:
                ************************************************************************:

                *-------------- POWERUP RESET -------------------------------------------
0000                    ASEG
0000 218010     RST0    LXI     H,1080H
0003 C30B01             JMP     CONT0
0006                    DS      2
                *-------------- RESET WATCH DOG TIMER (52 STATES) ----------------------
0008 F5         RST1    PUSH    PSW
0009 3E10               MVI     A,10H
000B 3200D0             STA     WDTRESET
000E F1                 POP     PSW
000F C9                 RET
                *-------------- SET REGULATOR CONTROLS ---------------------------------
0010 325310     RST2    STA     ANALOGLR
0013 320080             STA     ANALOGL
0016 C9                 RET
0017                    DS      1
                *-------------- SET OUTPUT CONTROLS ------------------------------------
0018 325110     RST3    STA     CONTROLR
001B 320060             STA     CONTROLL
001E C9                 RET
001F                    DS      1
                *-------------- SOFTWARE DELAY (10 STATES) -----------------------------
0020 C9         RST4    RET
0021                    DS      3
                *-------------- TRAP INTERRUPT -----------------------------------------
0024 C3B200     TRAP    JMP     TRAPA
0027                    DS      1
                *-------------- RST 5 --------------------------------------------------
0028            RST5    DS      4
                *-------------- 5.5 INTERRUPT ------------------------------------------
002C C3180B     I55     JMP     CPULOST
002F                    DS      1
```

```
                *--------------- RST 6 -----------------------------------------
0030            RST6    DS      4
                *--------------- 6.5 INTERRUPT ---------------------------------
0034 C38D09     I65     JMP     PHSFIRE
0037                    DS      1
                *--------------- LOST CPU RESET VECTOR -------------------------
0038 C3180B     RST7    JMP     CPULOST
003B                    DS      1
                *--------------- 7.5 INTERRUPT ---------------------------------
                *
                *       THIS INTERRUPT IS INITIATED BY EITHER THE ZCO OR THE PSEUDO-ZCO'S.
                *       IF THE BOARD RECEIVES A RFI SIGNAL THIS INTERRUPT WILL TAKE CARE
                *       OF DOING THE PHASEOFF.  IF THERE IS NO RFI THEN THE PROGRAM JUMPS
                *       TO THE PHASE TIMING ROUTINE AT ADDRESS VEC75 STORED IN RAM.  IN
                *       EACH SECTION THE PROGRAM STORES THE NEXT SCR DATA INTO A RAM CELL
                *       FOR USE IN THE NEXT 6.5 INTERRUPT.  THE NEXT TIMER(T2,T3,T4) IN
                *       SEQUENCE TO GO OFF IS ARMED FOR COUNTING BEGINNING AT THE NEXT GATE
                *       (ZCO) PULSE.
                *
                *       REGISTERS DESTROYED:            NONE
                *
                *       REGISTER USAGE:                 HL= NEXT 7.5 VECTOR
                *                                       B = NEXT SCR DATA
                *                                       C =TIMER LOAD REGISTER ADDRESS
                *
                *       MEMORY USAGE:                   ZCOTIME, ZCOFLAG, SYSMEM, PCSWORD
                *                                       VEC75, TEFLAG, DATAONT2, DATAONT3
                *                                       DATAONT4, PHASEOFF
                *
                *       INPUT/OUTPUT                    SYSTEMBF, PCLATCH, TCOMMAND
                *                                       TDATA, ANALOGBF
                *
                *---------------------------------------------------------------
003C E5         I75     PUSH    H
003D F5                 PUSH    PSW
003E C5                 PUSH    B
003F CF                 RST     1
0040 3EE5               MVI     A,0E5H
0042 320220             STA     TCOMMAND
0045 3A0080             LDA     ANALOGBF
0048 E640               ANI     40H
004A CAAE00             JZ      NOPHSBK
004D AF                 XRA     A
004E 326A10             STA     PCSWORD
0051 320050             STA     PCLATCH
0054 326F10             STA     TEFLAG
0057 326C10             STA     DATAONT2
005A 3EDE               MVI     A,0DEH
005C 320220             STA     TCOMMAND
005F 3EE2               MVI     A,0E2H
0061 320220             STA     TCOMMAND
0064 3C                 INR     A
0065 320220             STA     TCOMMAND
0068 3C                 INR     A
0069 320220             STA     TCOMMAND
006C 3EEA               MVI     A,0EAH
006E 320220             STA     TCOMMAND
0071 3EE2               MVI     A,0E2H
0073 320220             STA     TCOMMAND
0076 3EAA               MVI     A,0AAH
0078 325910             STA     PHASEOFF
007B 21C706             LXI     H,06C7H
007E 3E0A               MVI     A,0AH
0080 320220             STA     TCOMMAND
0083 7D                 MOV     A,L
0084 320020             STA     TDATA
0087 7C                 MOV     A,H
```

```
0088 320020          STA     TDATA
008B 3E0B            MVI     A,0BH
008D 320220          STA     TCOMMAND
0090 7D              MOV     A,L
0091 320020          STA     TDATA
0094 7C              MOV     A,H
0095 320020          STA     TDATA
0098 3E0C            MVI     A,0CH
009A 320220          STA     TCOMMAND
009D 7D              MOV     A,L
009E 320020          STA     TDATA
00A1 7C              MOV     A,H
00A2 320020          STA     TDATA
00A5 3E5E            MVI     A,5EH
00A7 320220          STA     TCOMMAND   .
00AA C1     BACK     POP     B
00AB F1              POP     PSW
00AC E1              POP     H
00AD C9              RET
00AE 2A6410 NOPHSBK  LHLD    VEC75
00B1 E9              PCHL
            *-------------- TRAP INTERRUPT ROUTINE ----------------------------
            *
            *        THIS INTERRUPT PERFORMS TWO FUNCTIONS, EITHER THE INVERTER DRIVER
            *        ROUTINE OR A SYSTEM FAULT ROUTINE.  UPON ENTRY INTO THE INTERRUPT
            *        THE ROUTINE CHECKS TO SEE IF THE OSCILLATOR IS HIGH OR LOW, IF THE
            *        OSCILLATOR IS HIGH THE ROUTINE PERFORMS THE INVERTER DRIVER
            *        SECTION WHICH FIRES THE CORRECT MAIN, AUXILLARY AND PRECHARGE SCR'S
            *        IN A SERIES OF FOUR OUTPUT SECTIONS.  IF THE OSCILLATOR WAS LOW
            *        UPON ENTRY, THE INTERRUPT CHECKS TO SEE IF THE AFPO FAULT SIGNAL
            *        WAS HIGH.  IF THE AFPO SIGNAL WAS HIGH THE INTERRUPT DETERMINES IF
            *        THE FAULT WAS AN ALL-OFF OR ALL-FIRE FAULT BY CHECKING THE AFTP
            *        SIGNAL AND JUMPS TO THE CORRESPONDING ROUTINE.  IF THERE WAS NO
            *        OSCILLATOR OR AFPO THE ROUTINE RETURNS.  IF THE INVERTER DRIVER
            *        SECTION WAS ENTERED, AFTER FIRING THE SCR'S THE ROUTINE CHECKS TO
            *        SEE IF THERE WAS AN AFPO FAULT DURING THE TIME THE OSCILLATOR WAS
            *        HIGH.  IF THERE WAS A FAULT THE CORRECT ALL-OFF OR ALL-FIRE
            *        ROUTINE IS ENTERED.
            *------------------------------------------------------------------
00B2 F5     TRAPA    PUSH    PSW
00B3 E5              PUSH    H
00B4 20              RIM
00B5 CF              RST     1
00B6 327B10          STA     PTSWORD
00B9 17              RAL
00BA D2C100          JNC     AFPOCK
00BD 2A6210          LHLD    TRAPVEC
00C0 E9              PCHL
            * - - - - - - - - TRAP NOISE BUFFER - - - - - - - - - - - - - - - - - - - - -
00C1 C5     AFPOCK   PUSH    B
00C2 3A0070          LDA     SYSTEMBF
00C5 47              MOV     B,A
00C6 3A0070          LDA     SYSTEMBF
00C9 A0              ANA     B
00CA E601            ANI     01H
00CC CA0701          JZ      OUTZ
            * - - - - - - - - CLEAR 90 MICROSECOND BIT - - - - - - - - - - - - - - - - -
00CF 3A7A10          LDA     COMMWORD
00D2 E6BF            ANI     0BFH
00D4 327A10          STA     COMMWORD
            * - - - - - - - - - - - - - - - - - - - - - - - - - - - - - - - - - - - - - -
00D7 3A0080          LDA     ANALOGBF
00DA 324510          STA     LINELOW
00DD 3A5B10          LDA     SWAFWORD
00E0 FEAA            CPI     0AAH
00E2 CABD04          JZ      ALFIRE2
00E5 FE55            CPI     55H
00E7 CA4906          JZ      AFMODE
```

```
00EA 3A00A0                  LDA    AFSOURCE
00ED 2F                      CMA
00EE 324010                  STA    AFPODATA
00F1 3E55                    MVI    A,55H
00F3 325B10                  STA    SWAFWORD
00F6 3A0080                  LDA    ANALOGBF
00F9 E602                    ANI    02H
00FB CA2C0A                  JZ     ALLOFF
00FE 3A5110                  LDA    CONTROLR
0101 E6FE                    ANI    0FEH
0103 DF                      RST    3
0104 C34906                  JMP    AFMODE
0107 C1          OUTZ        POP    B
0108 C34C08                  JMP    OUTC

             ***************** SYSTEM INITIALIZATION **********************************

             *--------------- INITIALIZE RAM AND STACK POINTER ----------------------
010B 313F10      CONT0       LXI    SP,103FH
010E 3200E0                  STA    AFRESET
0111 C31A01                  JMP    CONT1
0114 217C10      SYSRESET    LXI    H,107CH
0117 313F10                  LXI    SP,103FH
011A AF          CONT1       XRA    A
011B 2D          LOOPR       DCR    L
011C 77                      MOV    M,A
011D C21B01                  JNZ    LOOPR
             * - - - - - - - - - INITIALIZE TIMER - - - - - - - - - - - - - - - - - - - - -
0120 3EFF                    MVI    A,0FFH
0122 320220                  STA    TCOMMAND
0125 3E5F                    MVI    A,5FH
0127 320220                  STA    TCOMMAND
012A 060B                    MVI    B,0BH
012C 21F70A                  LXI    H,TABLEI
012F 7E          LOOPA       MOV    A,M
0130 320220                  STA    TCOMMAND
0133 23                      INX    H
0134 7E                      MOV    A,M
0135 320020                  STA    TDATA
0138 23                      INX    H
0139 7E                      MOV    A,M
013A 320020                  STA    TDATA
013D 23                      INX    H
013E 05                      DCR    B
013F C22F01                  JNZ    LOOPA
0142 3E5F                    MVI    A,5FH
0144 320220                  STA    TCOMMAND
0147 C3E101                  JMP    RTJSTART
             * - - - - - - - - - INITIAL FREQUENCY SETUP/CHECK SUBROUTINE - - - - - - - - - -
014A F5          INTIALHZ    PUSH   PSW
014B E5                      PUSH   H
014C 3E00                    MVI    A,00H
014E 324110                  STA    FREQFLAG
0151 324310                  STA    ZCOFLAG
0154 3E04                    MVI    A,04H
0156 327010                  STA    CONVNUM
0159 210000                  LXI    H,0000H
015C 3E40                    MVI    A,40H
015E 320050                  STA    PCLATCH
0161 CF          QUE1        RST    1
0162 CDD101                  CALL   TESTZCO
0165 3A0070                  LDA    SYSTEMBF
0168 E602                    ANI    02H
016A C26101                  JNZ    QUE1
016D 210000                  LXI    H,0000H
0170 CF          QUE2        RST    1
0171 CDD101                  CALL   TESTZCO
0174 3A0070                  LDA    SYSTEMBF
```

```
0177 E602                ANI     02H
0179 CA7001              JZ      QUE2
017C 210000              LXI     H,0000H
017F 23        QUE3      INX     H
0180 3E10                MVI     A,10H
0182 3200D0              STA     WDTRESET
0185 00                  NOP
0186 3A0070              LDA     SYSTEMBF
0189 E602                ANI     02H
018B C27F01              JNZ     QUE3
018E 23        QUE4      INX     H
018F 3E10                MVI     A,10H
0191 3200D0              STA     WDTRESET
0194 00                  NOP
0195 3A0070              LDA     SYSTEMBF
0198 E602                ANI     02H
019A CA8E01              JZ      QUE4
019D 3E00                MVI     A,00H
019F 320050              STA     PCLATCH
01A2 3E0D                MVI     A,0DH
01A4 320220              STA     TCOMMAND
01A7 7D                  MOV     A,L
01A8 320020              STA     TDATA
01AB 7C                  MOV     A,H
01AC 320020              STA     TDATA
01AF A7                  ANA     A
01B0 7C                  MOV     A,H
01B1 1F                  RAR
01B2 67                  MOV     H,A
01B3 7D                  MOV     A,L
01B4 1F                  RAR
01B5 6F                  MOV     L,A
01B6 225610              SHLD    OFFSET
01B9 CD9B0A              CALL    FREQERR
01BC 3A5610              LDA     OFFSET
01BF E680                ANI     80H
01C1 CAC901              JZ      FINISH
01C4 3E05                MVI     A,05H
01C6 327010              STA     CONVNUM
01C9 29        FINISH    DAD     H
01CA 29                  DAD     H
01CB 225410              SHLD    REFLECT
01CE E1                  POP     H
01CF F1                  POP     PSW
01D0 C9                  RET
               *----------------- ERROR ROUTINE FOR MISSING ZCO ----------------------------
01D1 23        TESTZCO   INX     H
01D2 7C                  MOV     A,H
01D3 FEE0                CPI     0E0H
01D5 C0                  RNZ
01D6 33                  INX     SP
01D7 33                  INX     SP
01D8 E1                  POP     H
01D9 F1                  POP     PSW
01DA 33                  INX     SP
01DB 33                  INX     SP
01DC 1608                MVI     D,08H

01DE C35D05              JMP     PRELOCK

               **************************** CONTROL LOGIC ************************************
               *---------------- INITIAL START COMMAND SORT ------------------------------
01E1 CD4C05    RTJSTART  CALL    PRERUN
01E4 CD0307    INHIBRET  CALL    DMODE
01E7 C2E101              JNZ     RTJSTART
01EA 3A5010              LDA     SWITCHR
01ED E620                ANI     20H
01EF C2FD01              JNZ     SETREV
```

```
01F2 3E00     SETFWD   MVI    A,00H
01F4 327510            STA    IDCWORD
01F7 21000C            LXI    H,FWDTABLE
01FA C30502            JMP    NEXT
01FD 3E01     SETREV   MVI    A,01H
01FF 327510            STA    IDCWORD
0202 21480C            LXI    H,REVTABLE
0205 227610   NEXT     SHLD   NEXTADRS
0208 3A5010            LDA    SWITCHR
020B 1F                RAR
020C DC5A02            CC     RUN
020F 1F                RAR
0210 DC6602            CC     THREAD
0213 1F                RAR
0214 DCAD02            CC     JOG
0217 C3E101            JMP    RTJSTART

              *--------------- STOP OR BRAKE COMMAND SORT ---------------------------
021A CDE703   HALTCHK  CALL   RDVRFYSW
021D E608              ANI    08H
021F CA1B03            JZ     STOP
0222 3A5010            LDA    SWITCHR
0225 E610              ANI    10H
0227 CA5A03            JZ     BRAKE
022A C9                RET
              *--------------- CHECK FOR RUN/THREAD RESTART ---------------------------
022B CDE703   RESTART  CALL   RDVRFYSW
022E 2F                CMA
022F E618              ANI    18H
0231 C0                RNZ
0232 3A5010            LDA    SWITCHR
0235 E601              ANI    01H
0237 CA4902            JZ     CKTHD
023A 3A5110            LDA    CONTROLR
023D E6FD              ANI    0FDH
023F DF                RST    3
0240 3E99     RUNRSRT  MVI    A,99H
0242 33       BCK      INX    SP
0243 33                INX    SP
0244 33                INX    SP
0245 33                INX    SP
0246 C37602            JMP    IN
0249 3A5010   CKTHD    LDA    SWITCHR
024C E602              ANI    02H
024E C8                RZ
024F 3A5110            LDA    CONTROLR
0252 E6FD              ANI    0FDH
0254 DF                RST    3
0255 3E9A     THDRSRT  MVI    A,9AH
0257 C34202            JMP    BCK

              *--------------- RUN/THREAD ROUTINE ---------------------------
025A CD240B   RUN      CALL   FIRST
025D CCA104            CZ     SOFTFIRE
0260 019906            LXI    B,0699H
0263 C36F02            JMP    STARTCHK
0266 CD240B   THREAD   CALL   FIRST
0269 CCA104            CZ     SOFTFIRE
026C 019A05            LXI    B,059AH
026F CDD805   STARTCHK CALL   INHIBCK
0272 CDFF03   START    CALL   ENSYS
0275 79                MOV    A,C
0276 D7       IN       RST    2
0277 3EAA              MVI    A,0AAH
0279 325A10            STA    MODEWORD
027C CD1A02   LOOP1    CALL   HALTCHK
027F CDC20A            CALL   UPDATE
0282 CD0606            CALL   REGCHK
```

```
0285 CD0307            CALL   DMODE
0288 CD6304            CALL   REVRSAL
028B CDAB03            CALL   PHSONCHK
028E 3A5310            LDA    ANALOGLR
0291 E601              ANI    01H
0293 3A5010            LDA    SWITCHR
0296 CAA302            JZ     INTHD
0299 E602    INRN      ANI    02H
029B CA7C02            JZ     LOOP1
029E 3E9A              MVI    A,9AH
02A0 C37602            JMP    IN
02A3 E601    INTHD     ANI    01H
02A5 CA7C02            JZ     LOOP1
02A8 3E99              MVI    A,99H
02AA C37602            JMP    IN
             *--------------- JOG ROUTINE ---------------------------------------
02AD CD240B  JOG       CALL   FIRST
02B0 CCA104            CZ     SOFTFIRE
02B3 0603              MVI    B,03H
02B5 CDD805            CALL   INHIBCK
02B8 CDFF03  JSTART    CALL   ENSYS
02BB 3E94    CONTINUE  MVI    A,94H
02BD D7                RST    2
02BE 3EAA              MVI    A,0AAH
02C0 325A10            STA    MODEWORD
02C3 CD1A02  JOGLOOP   CALL   HALTCHK
02C6 CD0606            CALL   REGCHK
02C9 CDAB03            CALL   PHSONCHK
02CC 3A5010            LDA    SWITCHR
02CF E604              ANI    04H
02D1 C2C302            JNZ    JOGLOOP
02D4 3E80    JOGCOAST  MVI    A,80H
02D6 D7                RST    2
02D7 CDE703  LOOPX     CALL   RDVRFYSW
02DA E604              ANI    04H
02DC C2BB02            JNZ    CONTINUE
02DF 3A0080            LDA    ANALOGBF
02E2 17                RAL
02E3 D2D702            JNC    LOOPX
02E6 3E30    JOGBRK    MVI    A,30H
02E8 D7                RST    2
02E9 210000            LXI    H,0000H
02EC CDAB03  LOOP4     CALL   PHSONCHK
02EF CDE703            CALL   RDVRFYSW
02F2 E604              ANI    04H
02F4 C20303            JNZ    JRESTART
02F7 23                INX    H
02F8 3E1F              MVI    A,01FH
02FA BC                CMP    H
02FB C2EC02            JNZ    LOOP4
02FE AF      JOGSTOP   XRA    A
02FF D7                RST    2
0300 C3A104            JMP    SOFTFIRE
0303 2A6210  JRESTART  LHLD   TRAPVEC
0306 225C10            SHLD   TRAPVEC0
0309 21C100            LXI    H,AFPOCK
030C 226210            SHLD   TRAPVEC
030F 3E94              MVI    A,94H
0311 D7                RST    2
0312 2A5C10            LHLD   TRAPVEC0
0315 226210            SHLD   TRAPVEC
0318 C3C302            JMP    JOGLOOP
             *--------------- STOP (CONTROLLED/COAST) ---------------------------
031B 3A0070  STOP      LDA    SYSTEMBF
031E E604              ANI    04H
0320 3E80              MVI    A,80H
0322 CA2703            JZ     STOPA
```

```
0325 3E98              MVI     A,98H
0327 D7       STOPA    RST     2
0328 CDAB03   LOOPS    CALL    PHSONCHK
032B CD2B02            CALL    RESTART
032E 3A0080   DOSTOP   LDA     ANALOGBF
0331 E620              ANI     20H
0333 CA2803            JZ      LOOPS
0336 3A5110            LDA     CONTROLR
0339 E628              ANI     28H
033B F605              ORI     05H
033D DF                RST     3
033E 3E80              MVI     A,80H
0340 D7                RST     2
0341 3A7510   SHTDOWN  LDA     IDCWORD
0344 F602              ORI     02H
0346 327510            STA     IDCWORD
0349 CF       REPEAT   RST     1
034A 3A7510            LDA     IDCWORD
034D E602              ANI     02H
034F C24903            JNZ     REPEAT
0352 3EAA              MVI     A,0AAH
0354 325B10            STA     SWAFWORD
0357 C3750A            JMP     LINEGD
              *--------------- BRAKING (AC/DC) ----------------------------------------
035A 3E80     BRAKE    MVI     A,80H
035C D7                RST     2
035D 3A0080            LDA     ANALOGBF
0360 17                RAL
0361 D26D03            JNC     DOBRAKE
0364 3A5110   LOOPS1   LDA     CONTROLR
0367 F602              ORI     02H
0369 DF                RST     3
036A CD2B02            CALL    RESTART
036D 3A0070   DOBRAKE  LDA     SYSTEMBF
0370 E608              ANI     08H
0372 C28003            JNZ     DCBRAKE
0375 3A0080            LDA     ANALOGBF
0378 E620              ANI     20H
037A C24103            JNZ     SHTDOWN
037D C36403            JMP     LOOPS1
0380 3A0080   DCBRAKE  LDA     ANALOGBF
0383 17                RAL
0384 D26403            JNC     LOOPS1
0387 3A5110            LDA     CONTROLR
038A E6FD              ANI     0FDH
038C DF                RST     3
038D 3E30              MVI     A,30H
038F D7                RST     2
0390 3A7010            LDA     CONVNUM
0393 F680              ORI     80H
0395 327010            STA     CONVNUM
0398 210000            LXI     H,0000H
039B CF       LOOPBR   RST     1
039C CDAB03            CALL    PHSONCHK
039F 23                INX     H
03A0 3EA0              MVI     A,0A0H
03A2 BC                CMP     H
03A3 C29B03            JNZ     LOOPBR
03A6 AF                XRA     A
03A7 D7                RST     2
03A8 C3A104            JMP     SOFTFIRE
              *--------------- CHECK FOR PHASECONTROL RE-ENABLE --------------------
03AB F3       PHSONCHK DI
03AC 3A5910            LDA     PHASEOFF
03AF FE00              CPI     00H
03B1 CADF03            JZ      RTRN
03B4 3A5310            LDA     ANALOGLR
03B7 E6D8              ANI     0D8H
```

```
03B9 320080           STA    ANALOGL
03BC 3A0080           LDA    ANALOGBF
03BF E640             ANI    40H
03C1 C0               RNZ
03C2 E5               PUSH   H
03C3 3A5310           LDA    ANALOGLR
03C6 320080           STA    ANALOGL
03C9 AF               XRA    A
03CA 325910           STA    PHASEOFF
03CD 21E103           LXI    H,RESYNC
03D0 226410           SHLD   VEC75
03D3 3E40             MVI    A,40H
03D5 326A10           STA    PCSWORD
03D8 320050           STA    PCLATCH
03DB 3E1B             MVI    A,1BH
03DD 30               SIM
03DE EI               POP    H
03DF FB     RTRN      EI
03E0 C9               RET
03E1 CD2904 RESYNC    CALL   PHSEN
03E4 C3AA00           JMP    BACK
            *--------------- READ SWITCH WORD UNTIL VERIFIED -------------------------
03E7 CF     RDVRFYSW  RST    1
03E8 C5               PUSH   B
03E9 3A0060 LOOP9     LDA    SWITCHBF
03EC 325010           STA    SWITCHR
03EF 0E10             MVI    C,10H
03F1 47               MOV    B,A
03F2 3A0060 LOOP2     LDA    SWITCHBF
03F5 B8               CMP    B
03F6 C2E903           JNZ    LOOP9
03F9 0D               DCR    C
03FA C2F203           JNZ    LOOP2
03FD C1               POP    B
03FE C9               RET

            *--------------- OUTPUT CONTROLS ENABLE -----------------------------------
03FF 3A5110 ENSYS     LDA    CONTROLR
0402 F605             ORI    05H
0404 DF               RST    3
            * - - - - - - - - INVERTER DRIVER ENABLE - - - - - - - - - - - - - - - - - - -
0405 210000 INVRTREN  LXI    H,0000H
0408 227110           SHLD   INVDATA1
040B 227310           SHLD   INVDATA2
040E 220040           SHLD   INVLATCH
0411 213007           LXI    H,0730H
0414 227810           SHLD   IDOFFSET
0417 21C100           LXI    H,AFPOCK
041A 226210           SHLD   TRAPVEC
041D 3A5310           LDA    ANALOGLR
0420 F680             ORI    80H
0422 D7               RST    2
0423 217B07           LXI    H,INVRTR
0426 226210           SHLD   TRAPVEC
            * - - - - - - - - PHASE CONTROL ENABLE - - - - - - - - - - - - - - - - - - - - - *
0429 21C708 PHSEN     LXI    H,PSTIMO
042C 226410           SHLD   VEC75
042F 3E40             MVI    A,40H
0431 326A10           STA    PCSWORD
0434 320050           STA    PCLATCH
0437 CF     ZCOIS0    RST    1
0438 3A0070           LDA    SYSTEMBF
043B E602             ANI    02H
043D CA3704           JZ     ZCOIS0
0440 CF     ZCOIS1    RST    1
0441 3A0070           LDA    SYSTEMBF
0444 E602             ANI    02H
0446 C24004           JNZ    ZCOIS1
```

```
0449 3E00                MVI    A,00H
044B 326A10              STA    PCSWORD
044E 320050              STA    PCLATCH
0451 3E40                MVI    A,40H
0453 326A10              STA    PCSWORD
0456 320050              STA    PCLATCH
0459 3E19                MVI    A,19H
045B 30                  SIM

045C 3E72                MVI    A,72H
045E 320220              STA    TCOMMAND
0461 FB                  EI
0462 C9                  RET
            *--------------- REVERSAL ----------------------------------------
0463 3A7510  REVRSAL     LDA    IDCWORD
0466 F5                  PUSH   PSW
0467 1F                  RAR
0468 DA8F04              JC     REVCK
046B 3A5010  FWDCK       LDA    SWITCHR
046E E620                ANI    20H
0470 CA9704              JZ     RETURN1
0473 3A5310  REVERSE     LDA    ANALOGLR
0476 E6E7                ANI    0E7H
0478 D7                  RST    2
0479 3A0080              LDA    ANALOGBF
047C E601                ANI    01H
047E CA9F04              JZ     RETURN2
0481 F1                  POP    PSW
0482 F5                  PUSH   PSW
0483 E604                ANI    04H
0485 C29F04              JNZ    RETURN2
0488 F1                  POP    PSW
0489 F604                ORI    04H
048B 327510              STA    IDCWORD
048E C9                  RET
048F 3A5010  REVCK       LDA    SWITCHR
0492 E620                ANI    20H
0494 CA7304              JZ     REVERSE
0497 F1      RETURN1     POP    PSW
0498 3A5310              LDA    ANALOGLR
049B F618                ORI    18H
049D D7                  RST    2
049E C9                  RET
049F F1      RETURN2     POP    PSW
04A0 C9                  RET
            *--------------- SOFTWARE ALLFIRE --------------------------------
04A1 3A5110  SOFTFIRE    LDA    CONTROLR
04A4 E6FE                ANI    0FEH
04A6 DF                  RST    3
04A7 210000              LXI    H,0000H
04AA 011000  DELAY       LXI    B,0010H
04AD 09                  DAD    B
04AE CF                  RST    1
04AF D2AA04              JNC    DELAY
04B2 3EAA                MVI    A,0AAH
04B4 325B10              STA    SWAFWORD
04B7 3200F0  SOFTLOOP    STA    SOFTAF
04BA C3B704              JMP    SOFTLOOP

            *--------------- ALLFIRE DELAY -----------------------------------
04BD 210000  ALFIRE2     LXI    H,0000H
04C0 7C                  MOV    A,H
04C1 325B10              STA    SWAFWORD
04C4 CF                  RST    1
04C5 010300  LOOPZ       LXI    B,0003H
04C8 09                  DAD    B
04C9 D2C504              JNC    LOOPZ
```

```
*---------------- PENDING FAULT DIAGNOSTICS ---------------------------
04CC 3A0080   PENDFALT  LDA    ANALOGBF
04CF E604               ANI    04H
04D1 CA2C05             JZ     ALLSEQ
04D4 3A5A10             LDA    MODEWORD
04D7 FEAA               CPI    0AAH
04D9 CAFA04             JZ     NOPRERUN
04DC 3A4010             LDA    AFPODATA
04DF E640               ANI    40H
04E1 CAEF04             JZ     NOPREPS
04E4 1610               MVI    D,10H
04E6 CD5D05             CALL   PRELOCK
04E9 CD0307             CALL   DMODE
04EC C3CC04             JMP    PENDFALT
04EF 1620     NOPREPS   MVI    D,20H
04F1 CD5D05             CALL   PRELOCK
04F4 CD0307             CALL   DMODE
04F7 C3CC04             JMP    PENDFALT
04FA CDE703   NOPRERUN  CALL   RDVRFYSW
04FD E607               ANI    07H
04FF CA0705             JZ     NOSTART
0502 3E55               MVI    A,55H
0504 325A10             STA    MODEWORD
0507 3A4010   NOSTART   LDA    AFPODATA
050A E640               ANI    40H
050C CA2105             JZ     NORUNPS
050F 3A0080             LDA    ANALOGBF
0512 E640               ANI    40H
0514 CA1C05             JZ     RUNPS
0517 1E44               MVI    E,44H
0519 C32305             JMP    DISPLYRN
051C 1E50     RUNPS     MVI    E,50H
051E C32305             JMP    DISPLYRN
0521 1E60     NORUNPS   MVI    E,60H
0523 CDEC06   DISPLYRN  CALL   SAVELST
0526 CD0307             CALL   DMODE
0529 C3CC04             JMP    PENDFALT
052C 3200E0   ALLSEQ    STA    AFRESET
052F 3A4610             LDA    FIRSTCLR
0532 FEAA               CPI    0AAH
0534 C23F05             JNZ    RETEST
0537 3E00               MVI    A,00H
0539 327C10             STA    FRSTFAIL
053C 324610             STA    FIRSTCLR
053F 3A7F10   RETEST    LDA    LASTADRS+1
0542 FEAA               CPI    0AAH
0544 C21401             JNZ    SYSRESET
0547 F1                 POP    PSW
0548 F1                 POP    PSW
0549 F1                 POP    PSW
054A F1                 POP    PSW
054B C9                 RET

              **************** DIAGNOSTICS ***********************************************
              *--------------- PRE-RUN DIAGNOSTICS SUBROUTINE ---------------------------
              *
              *         IN PRERUN DIAGNOSTICS REGISTERS: B,C,H,L ARE PROTECTED ON THE STACK
              *         REGISTERS A,PSW, D AND E ARE UNPROTECTED. REGISTER D IS USED TO PAS:
              *         PARAMETERS TO/FROM THE PRERUN DIAGNOSTICS SUBROUTINE.  THE PSW IS
              *         USED TO PASS AN ERROR FLAG TO THE CALLING ROUTINE IN THE EVENT OF
              *         FAILING ANY PART OF THE PRERUN DIAGNOSTICS.
              *
054C 1600     PRERUN    MVI    D,00H
054E CD4A01   LINEFREQ  CALL   INTIALHZ
0551 3A4110             LDA    FREQFLAG
0554 FEAA               CPI    0AAH
0556 C25D05             JNZ    PRELOCK
0559 7A                 MOV    A,D
```

```
055A F608                  ORI     08H
055C 57                    MOV     D,A
055D C5        PRELOCK     PUSH    B
055E E5                    PUSH    H
055F CDE703                CALL    RDVRFYSW
0562 210010    RAMCHECK    LXI     H,1000H
0565 01AA55                LXI     B,55AAH
0568 5E        RAMLOOP     MOV     E,M
0569 70                    MOV     M,B
056A 7E                    MOV     A,M
056B B8                    CMP     B
056C C28505                JNZ     RAMFAIL
056F 71                    MOV     M,C
0570 7E                    MOV     A,M
0571 B9                    CMP     C
0572 C28505                JNZ     RAMFAIL
0575 73                    MOV     M,E
0576 23                    INX     H
0577 3E10                  MVI     A,10H
0579 3200D0                STA     WDTRESET
057C 3E80                  MVI     A,80H
057E BD                    CMP     L
057F C26805                JNZ     RAMLOOP
0582 C38905                JMP     ROMCHECK
0585 7A        RAMFAIL     MOV     A,D
0586 F601                  ORI     01H
0588 57                    MOV     D,A
0589 210000    ROMCHECK    LXI     H,0000H
058C 7E                    MOV     A,M
058D 23                    INX     H
058E 46        ROMLOOP     MOV     B,M
058F 80                    ADD     B
0590 23                    INX     H
0591 4F                    MOV     C,A
0592 3E10                  MVI     A,10H
0594 3200D0                STA     WDTRESET
0597 BC                    CMP     H
0598 79                    MOV     A,C
0599 C28E05                JNZ     ROMLOOP
059C FE00                  CPI     00H
059E CAA505                JZ      LINEVOLT
05A1 7A                    MOV     A,D
05A2 F602                  ORI     02H
05A4 57                    MOV     D,A
05A5 3A0080    LINEVOLT    LDA     ANALOGBF
05A8 E640                  ANI     40H
05AA CAB105                JZ      DISPLYCK
05AD 7A                    MOV     A,D
05AE F604                  ORI     04H
05B0 57                    MOV     D,A
05B1 3A7D10    DISPLYCK    LDA     LASTFAIL
05B4 E6C0                  ANI     0C0H
05B6 CACE05                JZ      DISPLYPR
05B9 3A5A10                LDA     MODEWORD
05BC FE55                  CPI     55H
05BE CACE05                JZ      DISPLYPR
05C1 3A5010                LDA     SWITCHR
05C4 E607                  ANI     07H
05C6 CAD205                JZ      FAULTFLG
05C9 3E55                  MVI     A,55H
05CB 325A10                STA     MODEWORD
05CE 7A        DISPLYPR    MOV     A,D
05CF 327D10                STA     LASTFAIL
05D2 7A        FAULTFLG    MOV     A,D
05D3 E63F                  ANI     3FH
05D5 E1                    POP     H
05D6 C1                    POP     B
05D7 C9                    RET
```

```
                  *- - - - - - - - - - RUN INHIBIT CHECK SUBROUTINE - - - - - - - - - - - - - - -
05D8 3A5010  INHIBCK  LDA   SWITCHR
05DB A0               ANA   B
05DC C2FA05           JNZ   RINHIBIT
05DF 3A5010           LDA   SWITCHR
05E2 E618             ANI   18H
05E4 FE18             CPI   18H
05E6 C2FA05           JNZ   RINHIBIT
05E9 3A0080           LDA   ANALOGBF
05EC E620             ANI   20H
05EE CAFA05           JZ    RINHIBIT
05F1 AF               XRA   A
05F2 3200A0           STA   LEDPANEL
05F5 327D10           STA   LASTFAIL
05F8 AF               XRA   A
05F9 C9               RET
05FA 3E41    RINHIBIT MVI   A,41H
05FC 327D10           STA   LASTFAIL
05FF F1               POP   PSW
0600 F1               POP   PSW
0601 F6FF             ORI   0FFH
0603 C3E401           JMP   INHIBRET
                  *--------------- RUN MONITOR DIAGNOSTICS ----------------------------------
0606 3A4110  REGCHK   LDA   FREQFLAG
0609 FEAA             CPI   0AAH
060B C21606           JNZ   REGCHK1
060E 3E48             MVI   A,48H
0610 CDEC06           CALL  SAVELST
0613 C31B03           JMP   STOP
0616 3A0080  REGCHK1  LDA   ANALOGBF
0619 325210           STA   ANALOGBR
061C E604             ANI   04H
061E CA2906           JZ    ROL
0621 1E60             MVI   E,60H
0623 CDEC06           CALL  SAVELST
0626 C3A104           JMP   SOFTFIRE
0629 3A5210  ROL      LDA   ANALOGBR
062C E610             ANI   10H
062E CA3906           JZ    INLINE
0631 3E42             MVI   A,42H
0633 327D10           STA   LASTFAIL
0636 C31B03           JMP   STOP
0639 3A5210  INLINE   LDA   ANALOGBR
063C E640             ANI   40H
063E 3E00             MVI   A,00H
0640 CA4506           JZ    LINEOK
0643 3E44             MVI   A,44H
0645 327D10  LINEOK   STA   LASTFAIL
0648 C9               RET
                  *--------------- TRIP MONITOR DIAGNOSTICS ----------------------------------
0649 1E00    AFMODE   MVI   E,00H
064B 3A5B10           LDA   SWAFWORD
064E FEAA             CPI   0AAH
0650 CABD04           JZ    ALFIRE2
0653 3A5A10           LDA   MODEWORD
0656 FEAA             CPI   0AAH
0658 CA9B06           JZ    RNSHUTDN
065B 3A4010           LDA   AFPODATA
065E E640             ANI   40H
0660 CA7B06           JZ    PRLOGIC
0663 3A0080           LDA   ANALOGBF
0666 E640             ANI   40H
0668 CA7006           JZ    PRPOWER
066B 1604             MVI   D,04H
066D C37206           JMP   OUTPRERN
0670 1610    PRPOWER  MVI   D,10H
0672 CD5D05  OUTPRERN CALL  PRELOCK
```

```
0675 C3B606             JMP     OUTAF
0678 1620     PRLOGIC   MVI     D,20H
067A CD5D05             CALL    PRELOCK
067D 3A7D10             LDA     LASTFAIL
0680 E6C0               ANI     0C0H
0682 C2B606             JNZ     OUTAF
0685 3A7C10             LDA     FRSTFAIL
0688 E6FF               ANI     0FFH
068A C2B606             JNZ     OUTAF
068D 3EAA               MVI     A,0AAH
068F 324610             STA     FIRSTCLR
0692 3A4010             LDA     AFPODATA
0695 1E00               MVI     E,00H
0697 57                 MOV     D,A
0698 C3BC06             JMP     DIAGNSTS
069B 3A4010   RNSHUTDN  LDA     AFPODATA
069E 57                 MOV     D,A
069F E640               ANI     40H
06A1 CABC06             JZ      DIAGNSTS
06A4 3A0080             LDA     ANALOGBF
06A7 E640               ANI     40H
06A9 CAB106             JZ      RNPOWER
06AC 1E44               MVI     E,44H
06AE C3B306             JMP     OUTRNMON
06B1 1E50     RNPOWER   MVI     E,50H
06B3 CDEC06   OUTRNMON  CALL    SAVELST
06B6 CD0307   OUTAF     CALL    DMODE
06B9 C3BD04             JMP     ALFIRE2
06BC 7A       DIAGNSTS  MOV     A,D
06BD E680               ANI     80H
06BF CADC06             JZ      CONTD
06C2 3A7A10   COMFAIL   LDA     COMMWORD
06C5 47                 MOV     B,A
06C6 E640               ANI     40H
06C8 C2D206             JNZ     DETPHS
06CB 7B       SHOOT     MOV     A,E
06CC F690               ORI     90H
06CE 5F                 MOV     E,A
06CF C3DC06             JMP     CONTD
06D2 78       DETPHS    MOV     A,B
06D3 F6C0               ORI     0C0H
06D5 5F                 MOV     E,A
06D6 CDEC06             CALL    SAVELST
06D9 C3BD04             JMP     ALFIRE2
06DC 7A       CONTD     MOV     A,D
06DD E6BF               ANI     0BFH
06DF F680               ORI     80H
06E1 B3                 ORA     E
06E2 5F                 MOV     E,A
06E3 CDEC06             CALL    SAVELST
06E6 CD0307             CALL    DMODE
06E9 C3BD04             JMP     ALFIRE2
              *--------------- SAVE DIAGNOSTICS SUBROUTINE ----------------------------
06EC 3A4610   SAVELST   LDA     FIRSTCLR
06EF FEAA               CPI     0AAH
06F1 CAF806             JZ      CHKFIRST
06F4 7B                 MOV     A,E
06F5 327D10             STA     LASTFAIL
06F8 3A7C10   CHKFIRST  LDA     FRSTFAIL
06FB FE00               CPI     00H
06FD C0                 RNZ
06FE 7B                 MOV     A,E
06FF 327C10             STA     FRSTFAIL
0702 C9                 RET
              *--------------- DISPLAY DIAGNOSTICS SUBROUTINE -------------------------
0703 F5       DMODE     PUSH    PSW
0704 CD4207             CALL    FAULTRE
0707 3A7C10             LDA     FRSTFAIL
```

```
070A B7                       ORA    A
070B CA1607                   JZ     NOFIRST
070E 3A5110                   LDA    CONTROLR
0711 F620                     ORI    20H
0713 C31B07                   JMP    FIRSTLED
0716 3A5110     NOFIRST       LDA    CONTROLR
0719 E6DF                     ANI    0DFH
071B DF         FIRSTLED      RST    3
071C 3A0060                   LDA    SWITCHBF
071F E640                     ANI    40H
0721 CA2D07                   JZ     DLAST
0724 3A7C10     DFIRST        LDA    FRSTFAIL
0727 3200A0                   STA    LEDPANEL
072A C33307                   JMP    RESETCK
072D 3A7D10     DLAST         LDA    LASTFAIL
0730 3200A0                   STA    LEDPANEL
0733 3A0060     RESETCK       LDA    SWITCHBF
0736 E680                     ANI    80H
0738 CA4007                   JZ     NORESET
073B 3E00                     MVI    A,00H
073D 327C10                   STA    FRSTFAIL
0740 F1         NORESET       POP    PSW
0741 C9                       RET

                *---------------- FAULT RELAY CONTROL SUBROUTINE ---------------------------
                *         THIS SUBROUTINE CONTROLS THE OPERATION OF THE FAULT RELAY: A CUSTOME
                *         OPTION THAT INDICATES SYSTEM FAILURES.  A LOGIC 1 ON D3 OF THE CON-
                *         TROL OUTPUT LATCH WILL ENERGIZE THE RELAY.  THE RELAY IS TO BE ENER-
                *         GIZED FOR:  ALL 'TRIP MONITOR' AND 'COMMUTATION' SHUTDOWNS
                *         ITOR' POWER SUPPLY AND LOGIC SHUTDOWNS
                *         SUPPLY AND LOGIC ERRORS.  THE RELAY IS TO BE CLEARED BY EITHER A
                *         POWER-UP RESET OR BY SUCESSFULLY STARTING (PASSING PRE-RUN).
                *
                *         REGISTERS DESTROYED:          NONE
                *         REGISTER USAGE:               E= TEMP STORAGE OF PRESENT DIAG. DATA
                *         MEMORY USAGE:                 LASTFAIL= PRESENT DIAGNOSTIC DATA
                *                                       CONTROLR= PRESENT STATUS OF LATCH
                *         INPUT/OUTPUT:                 RST3= TRANSFER OF DATA INTO CONTROLR
                *                                            (RAM) AND CONTROLL OUTPUT LATCH
                *

0742 D5         FAULTRE       PUSH   D
0743 3A7D10                   LDA    LASTFAIL
0746 5F                       MOV    E,A
0747 B3                       ORA    E
0748 CA6A07                   JZ     CLEAR
074B E680                     ANI    80H
074D C25C07                   JNZ    SETFAULT
0750 7B                       MOV    A,E
0751 E640                     ANI    40H
0753 CA6407                   JZ     PREFAULT
0756 7B                       MOV    A,E
0757 E630                     ANI    30H
0759 CA6A07                   JZ     CLEAR
075C 3A5110     SETFAULT      LDA    CONTROLR
075F F608                     ORI    08H
0761 DF                       RST    3
0762 D1                       POP    D
0763 C9                       RET
0764 7B         PREFAULT      MOV    A,E
0765 E633                     ANI    33H
0767 C25C07                   JNZ    SETFAULT
076A 3A5110     CLEAR         LDA    CONTROLR
076D E6F7                     ANI    0F7H
076F DF                       RST    3
0770 D1                       POP    D
0771 C9                       RET
```

```
                  ****************** INVERTER DRIVER ********************************************
0772 217B07  CHECK     LXI    H,INVRTR
0775 226210            SHLD   TRAPVEC
0778 C3C100            JMP    AFPOCK
077B 3E61    INVRTR    MVI    A,61H
077D 320220            STA    TCOMMAND
0780 2A7110            LHLD   INVDATA1
0783 220040            SHLD   INVLATCH
0786 20      WAIT      RIM
0787 17                RAL
0788 DA8607            JC     WAIT
078B 7D                MOV    A,L
078C E63F              ANI    3FH
078E 6F                MOV    L,A
078F 2600              MVI    H,00H
0791 220040            SHLD   INVLATCH
0794 3EC0              MVI    A,0C0H
0796 30                SIM
0797 3E40              MVI    A,40H
0799 30                SIM
079A 2A7310            LHLD   INVDATA2
079D 220040            SHLD   INVLATCH
             * - - - - - - - - SET 90 MICROSECOND WINDOW BIT - - - - - - - - - - - - - - -
07A0 3A7A10            LDA    COMMWORD
07A3 F640              ORI    40H
07A5 327A10            STA    COMMWORD
             * - - - - - - - - - - - - - - - - - - - - - - - - - - - - - - - - - - - - - -
07A8 E7                RST    4
07A9 AF                XRA    A
07AA 320140            STA    INVLATCH+1
07AD 3EC0              MVI    A,0C0H
07AF 30                SIM
07B0 3E40              MVI    A,40H
07B2 30                SIM
             * - - - - - - - - CHECK IF A FAULT TRAP OCCURRED WHILE OSCILLATOR=1 - - - - -
07B3 C5                PUSH   B
07B4 3A0070            LDA    SYSTEMBF
07B7 47                MOV    B,A
07B8 3A0070            LDA    SYSTEMBF
07BB A0                ANA    B
07BC E601              ANI    01H
07BE C1                POP    B
07BF CAD807            JZ     INVRCONT
07C2 3A00A0            LDA    AFSOURCE
07C5 324010            STA    AFPODATA
07C8 3A0080            LDA    ANALOGBF
07CB E602              ANI    02H
07CD 3E55              MVI    A,55H
07CF 325B10            STA    SWAFWORD
07D2 CA2C0A            JZ     ALLOFF
07D5 C34906            JMP    AFMODE
             * - - - - - - - - - - - - - - - - - - - - - - - - - - - - - - - - - - - - - -
07D8 2A7610  INVRCONT  LHLD   NEXTADRS
07DB 227E10            SHLD   LASTADRS
07DE 3A7510            LDA    IDCWORD
07E1 F5                PUSH   PSW
07E2 1F                RAR
07E3 DA9808            JC     REVRS
07E6 1F      FORWRD    RAR
07E7 DA6208            JC     SHTDNF
07EA F5                PUSH   PSW
07EB 3E18              MVI    A,18H
07ED BD                CMP    L
07EE C2F407            JNZ    NEXT1F
07F1 327810            STA    IDOFFSET
07F4 3E30    NEXT1F    MVI    A,30H
07F6 BD                CMP    L
07F7 C2FC07            JNZ    OUT1A
```

```
07FA 2E18                 MVI     L,18H
07FC F1          OUT1A    POP     PSW
07FD 1F                   RAR
07FE D21D08               JNC     NOREV
0801 3E8C                 MVI     A,8CH
0803 95                   SUB     L
0804 6F                   MOV     L,A
0805 F1                   POP     PSW
0806 E6FB                 ANI     0FBH
0808 F5                   PUSH    PSW
0809 E601                 ANI     01H
080B CA1408               JZ      TOREV
080E F1          TOFWD    POP     PSW
080F E6FE                 ANI     0FEH
0811 C31708               JMP     OUTX
0814 F1          TOREV    POP     PSW
0815 F601                 ORI     01H
0817 327510      OUTX     STA     IDCWORD
081A C31E08               JMP     OUT1B
081D F1          NOREV    POP     PSW
081E 7E          OUT1B    MOV     A,M
081F 327110               STA     INVDATA1
0822 23                   INX     H
0823 7E                   MOV     A,M
0824 327210               STA     INVDATA1+1
                 * - - - - - - - - DETERMINE PHASE FOR COM FAIL - - - - - - - - - - - - - - - -
0827 E5          PDETECT  PUSH    H
0828 2A7110               LHLD    INVDATA1
082B 7D                   MOV     A,L
082C 07                   RLC
082D 6F                   MOV     L,A
082E 7C                   MOV     A,H
082F 17                   RAL
0830 67                   MOV     H,A
0831 7D                   MOV     A,L
0832 07                   RLC
0833 7C                   MOV     A,H
0834 17                   RAL
0835 F640                 ORI     40H
0837 327A10               STA     COMMWORD
083A E1                   POP     H
                 * - - - - - - - - - - - - - - - - - - - - - - - - - - - - - - - - - - - - - -
083B 23                   INX     H
083C 7E                   MOV     A,M
083D 327310               STA     INVDATA2
0840 23                   INX     H
0841 7E                   MOV     A,M
0842 327410               STA     INVDATA2+1
0845 23                   INX     H
0846 227610               SHLD    NEXTADRS
0849 C3C100               JMP     AFPOCK
                 * - - - - - - - - CLEAR 90 MICROSECOND WINDOW BIT - - - - - - - - - - - - - - -
084C 3A7A10      OUTC     LDA     COMMWORD
084F E6BF                 ANI     0BFH
0851 327A10               STA     COMMWORD
                 * - - - - - - - - - - - - - - - - - - - - - - - - - - - - - - - - - - - - - -
0854 3A7B10               LDA     PTSWORD
0857 E608                 ANI     08H
0859 E1                   POP     H
085A CA6008      OUTB     JZ      OUTA
085D F1                   POP     PSW
085E FB                   EI
085F C9                   RET
0860 F1          OUTA     POP     PSW
0861 C9                   RET
0862 3A7810      SHTDNF   LDA     IDOFFSET
0865 85                   ADD     L
0866 6F                   MOV     L,A
```

```
0867 AF                 XRA     A
0868 327810             STA     IDOFFSET
086B 3E48               MVI     A,48H
086D BD                 CMP     L
086E C27308             JNZ     NEXT2
0871 2E30               MVI     L,30H
0873 3A7910    NEXT2    LDA     IDLOOPCT
0876 3D                 DCR     A
0877 327910             STA     IDLOOPCT
087A C29108             JNZ     OUTN
087D 3A7510             LDA     IDCWORD
0880 E6FD               ANI     0FDH
0882 327510             STA     IDCWORD
0885 21C100             LXI     H,AFPOCK
0888 226210             SHLD    TRAPVEC
088B 3A5310             LDA     ANALOGLB
088E E67F               ANI     7FH
0890 D7                 RST     2
0891 227610    OUTN     SHLD    NEXTADRS
0894 F1                 POP     PSW
0895 C31E08             JMP     OUT1B
0898 1F        REVRS    RAR
0899 DAB308             JC      SHTDNR
089C F5                 PUSH    PSW
089D 3E60               MVI     A,60H
089F BD                 CMP     L
08A0 C2A808             JNZ     NEXT1R
08A3 3E18               MVI     A,18H
08A5 327810             STA     IDOFFSET
08A8 3E78      NEXT1R   MVI     A,78H
08AA BD                 CMP     L
08AB C2FC07             JNZ     OUT1A
08AE 2E60               MVI     L,60H
08B0 C3FC07             JMP     OUT1A
08B3 3A7810    SHTDNR   LDA     IDOFFSET
08B6 85                 ADD     L
08B7 6F                 MOV     L,A
08B8 AF                 XRA     A
08B9 327810             STA     IDOFFSET
08BC 3E90               MVI     A,90H
08BE BD                 CMP     L
08BF C27308             JNZ     NEXT2
08C2 2E78               MVI     L,78H
08C4 C37308             JMP     NEXT2

               ***************** PHASE CONTROL ************************************************

               *--------------- PHASE TIMING ---------------------------------------------
08C7 00        PSTIM0   NOP
08C8 214210             LXI     H,ZCOTIME
08CB 34                 INR     M
08CC C2DA08             JNZ     TIME0
08CF 3EAA               MVI     A,0AAH
08D1 324310             STA     ZCOFLAG
08D4 3A0070             LDA     SYSTEMBF
08D7 324410             STA     SYSMEM
08DA 3A6A10    TIME0    LDA     PCSWORD
08DD E6BF               ANI     0BFH
08DF 326A10             STA     PCSWORD
08E2 320050             STA     PCLATCH
08E5 21ED08             LXI     H,PSTIM1
08E8 0621               MVI     B,21H
08EA C30209             JMP     THREE
08ED 21F508    PSTIM1   LXI     H,PSTIM2
08F0 0603               MVI     B,03H
08F2 C30E09             JMP     FOUR
08F5 21FD08    PSTIM2   LXI     H,PSTIM3
08F8 0606               MVI     B,06H
```

```
08FA C32509           JMP    TWO
08FD 210909  PSTIM3   LXI    H,PSTIM4
0900 060C             MVI    B,0CH
0902 3E24    THREE    MVI    A,24H
0904 0E0B             MVI    C,0BH
0906 C32909           JMP    OUT
0909 211509  PSTIM4   LXI    H,PSTIM5
090C 0618             MVI    B,18H
090E 3E28    FOUR     MVI    A,28H
0910 0E0C             MVI    C,0CH
0912 C32909           JMP    OUT
0915 3A6A10  PSTIM5   LDA    PCSWORD
0918 F640             ORI    40H
091A 326A10           STA    PCSWORD
091D 320050           STA    PCLATCH
0920 21C708           LXI    H,PSTIM0
0923 0630             MVI    B,30H
0925 3E22    TWO      MVI    A,22H
0927 0E0A             MVI    C,0AH
0929 226410  OUT      SHLD   VEC75
092C 320220           STA    TCOMMAND
092F 326F10           STA    TEFLAG
0932 79               MOV    A,C
0933 216210           LXI    H,1062H
0936 85               ADD    L
0937 6F               MOV    L,A
0938 78               MOV    A,B
0939 77               MOV    M,A
093A 3E10             MVI    A,10H
093C 30               SIM
093D C1      I75RET   POP    B
093E F1               POP    PSW
093F E1               POP    H
0940 FB               EI
0941 C9               RET
             ;--------------- DETERMINE NEXT PHASE ANGLE --------------------------------
0942 F5      DETNX    PUSH   PSW
0943 C5               PUSH   B
0944 CD6309           CALL   ATOD
0947 3A5410           LDA    REFLECT
094A 95               SUB    L
094B 6F               MOV    L,A
094C 3A5510           LDA    REFLECT+1
094F 9C               SBB    H
0950 67               MOV    H,A
0951 D25709           JNC    GOOD
0954 210000           LXI    H,0000H
0957 3A5610  GOOD     LDA    OFFSET
095A 4F               MOV    C,A
095B 3A5710           LDA    OFFSET+1
095E 47               MOV    B,A
095F 09               DAD    B
0960 C1               POP    B
0961 F1               POP    PSW
0962 C9               RET
```

```
*---------------- ANALOG TO DIGITAL CONVERSION -------------------------------
*          THIS SUBROUTINE READS THE ATOD CONVERTER 8 TIMES FOR 60 HZ AND 10
*          TIMES FOR 50 HZ OPERATION. THE OPERATING FREQUENCY AND HINCE THE
*          NUMBER OF ATOD READS IS COMPUTED AND STORED IN THE 'INITAL FREQUENCY
*          SETUP' SUBROUTINE (CONVNUM). THE INTIAL VALUE STORED IN 'CONVNUM' I
*          EITHER 4 OR 5 WITH D7 CONTAINING THE DC BRAKE STATUS (D7 IS SET TO 1
*          IN THE 'BRAKING (AC/DC)' ROUTINE). THE ATOD CONVERTER HAS A WORST
*          CASE CONVERSION TIME (10% TOL ON R,C) OF 26.2 MICROSECONDS. THERE
*          ARE 52 STATES BETWEEN 1ST AND 2ND ATOD READ, AND 62 STATES BETWEEN
*          EACH SUCCESSIVE ATOD READ. IF A 10 MEGAHZ CRYSTAL IS USED ADDITIONA
*          DELAY (RST 4) MUST BE ADDED.
*
*          REGISTERS DESTROYED:          HL= VALUE PASSWED TO CALLING ROUTINE
*                                           'DETERMINE NEXT PHASE ANGLE'.
*          REGISTER USAGE:               B= NUMBER OF ATOD READS (LOOP COUNT)
*                                        C= DC BRAKING CLAMP
*                                        HL= ATOD SUMMATION
*          MEMORY USAGE:                 CONVNUM= NUMBER OF (ATOD READS)/2 AND
*                                                 DC BRAKING STATUS.
*          INPUT/OUTPUT:                 ATODCONV= ATOD CONVERTER
*
0963 C5        ATOD      PUSH   B
0964 F5                  PUSH   PSW
0965 3A0030              LDA    ATODCONV
0968 0EFF                MVI    C,0FFH
096A 210000              LXI    H,0000H
096D 3A7010              LDA    CONVNUM
0970 07                  RLC
0971 47                  MOV    B,A
0972 D27709              JNC    LOOP
0975 0E38                MVI    C,38H
0977 E7        LOOP      RST    4
0978 3A0030              LDA    ATODCONV
097B B9                  CMP    C
097C DA8009              JC     NOCLAMP
097F 79                  MOV    A,C
0980 85        NOCLAMP   ADD    L
0981 D28509              JNC    NOCY
0984 24                  INR    H
0985 6F        NOCY      MOV    L,A
0986 05                  DCR    B
0987 C27709              JNZ    LOOP
098A F1                  POP    PSW
098B C1                  POP    B
098C C9                  RET
*---------------- PHASE FIRE ---------------------------------------------
098D E5        PHSFIRE   PUSH   H
098E F5                  PUSH   PSW
098F CF                  RST    1
0990 3A0220              LDA    TCOMMAND
0993 1F                  RAR
0994 1F                  RAR
0995 1F                  RAR
0996 D2D409              JNC    TEST3
0999 3EE2                MVI    A,0E2H
099B 320220              STA    TCOMMAND
099E 3A6A10              LDA    PCSWORD
09A1 E640                ANI    40H
09A3 67                  MOV    H,A
09A4 3A6D10              LDA    DATAONT3
09A7 B4                  ORA    H
09A8 326A10              STA    PCSWORD
09AB 320050              STA    PCLATCH
09AE 3A6F10              LDA    TEFLAG
09B1 FE22                CPI    22H
09B3 C2B909              JNZ    NOEN2
09B6 320220              STA    TCOMMAND
09B9 3E42      NOEN2     MVI    A,42H
```

```
09BB F5                 PUSH   PSW
09BC 3E0A               MVI    A,0AH
09BE CD4209   NOEN2A    CALL   DETNX
09C1 320220             STA    TCOMMAND
09C4 7D                 MOV    A,L
09C5 320020             STA    TDATA
09C8 7C                 MOV    A,H
09C9 320020             STA    TDATA
09CC F1                 POP    PSW
09CD 320220             STA    TCOMMAND
09D0 F1       ERRRET    POP    PSW
09D1 E1                 POP    H
09D2 FB                 EI
09D3 C9                 RET
09D4 1F       TEST3     RAR
09D5 D2000A             JNC    TEST4
09D8 3EE3               MVI    A,0E3H
09DA 320220             STA    TCOMMAND
09DD 3A6A10             LDA    PCSWORD
09E0 E640               ANI    40H
09E2 67                 MOV    H,A
09E3 3A6E10             LDA    DATAONT4
09E6 B4                 ORA    H
09E7 326A10             STA    PCSWORD
09EA 320050             STA    PCLATCH
09ED 3A6F10             LDA    TEFLAG
09F0 FE24               CPI    24H
09F2 C2F809             JNZ    NOEN3
09F5 320220             STA    TCOMMAND
09F8 3E44     NOEN3     MVI    A,44H
09FA F5                 PUSH   PSW
09FB 3E0B               MVI    A,0BH

09FD C3BE09             JMP    NOEN2A
0A00 1F       TEST4     RAR
0A01 D2D009             JNC    ERRRET
0A04 3EE4               MVI    A,0E4H
0A06 320220             STA    TCOMMAND
0A09 3A6A10             LDA    PCSWORD
0A0C E640               ANI    40H
0A0E 67                 MOV    H,A
0A0F 3A6C10             LDA    DATAONT2
0A12 B4                 ORA    H
0A13 326A10             STA    PCSWORD
0A16 320050             STA    PCLATCH
0A19 3A6F10             LDA    TEFLAG
0A1C FE28               CPI    28H
0A1E C2240A             JNZ    NOEN4
0A21 320220             STA    TCOMMAND
0A24 3E48     NOEN4     MVI    A,48H
0A26 F5                 PUSH   PSW
0A27 3E0C               MVI    A,0CH
0A29 C3BE09             JMP    NOEN2A
              *------------------------ ALLOFF SHOUTDOWN ROUTINE ----------------------
0A2C 3E00     ALLOFF    MVI    A,00H
0A2E D7                 RST    2
0A2F CF                 RST    1
0A30 2A7E10             LHLD   LASTADRS
0A33 2B                 DCX    H
0A34 2B                 DCX    H
0A35 7E                 MOV    A,M
0A36 0F                 RRC    A
0A37 0F                 RRC    A
0A38 47                 MOV    B,A
0A39 E6C0               ANI    0C0H
0A3B 320040             STA    INVLATCH
0A3E 78                 MOV    A,B
```

```
0A3F E60F              ANI    0FH
0A41 F680              ORI    80H
0A43 320140            STA    INVLATCH+1
0A46 3EC0              MVI    A,0C0H
0A48 30                SIM
0A49 3E40              MVI    A,40H
0A4B 30                SIM
;- - - - - - - - ALLOFF FAULT CHECK FOR RFI=1 AND PS=1 - - - - - - - - - - -
0A4C 3A4510            LDA    LINELOW
0A4F E640              ANI    40H
0A51 CA750A            JZ     LINEGD
0A54 3A4010            LDA    AFPODATA
0A57 E640              ANI    40H
0A59 CA750A            JZ     LINEGD
;- - - - - - - - - - - - - - - - - - - - - - - - - - - - - - - - - - - - -
0A5C 3A5110            LDA    CONTROLR
0A5F E608              ANI    08H
0A61 F610              ORI    10H
0A63 320060            STA    CONTROLL
0A66 3E46              MVI    A,46H
0A68 3D       RESET    DCR    A
0A69 E7                RST    4
0A6A C2680A            JNZ    RESET
0A6D 3A5110            LDA    CONTROLR
0A70 E608              ANI    08H
0A72 320060            STA    CONTROLL
0A75 3A5110  LINEGD    LDA    CONTROLR
0A78 E6FE             ANI    0FEH
0A7A DF               RST    3
0A7B 3A0070           LDA    SYSTEMBF
0A7E 1F               RAR
0A7F 1F               RAR
0A80 1F               RAR
0A81 1F               RAR
0A82 E603             ANI    03H
0A84 C601             ADI    01H
0A86 210000  WAIT2    LXI    H,0000H
0A89 010500  WAIT1    LXI    B,0005H
0A8C 09               DAD    B
0A8D CF               RST    1
0A8E D2890A           JNC    WAIT1
0A91 3D               DCR    A
0A92 C2860A           JNZ    WAIT2
0A95 3200E0           STA    AFRESET
0A98 C3B704           JMP    SOFTLOOP

;------------------- INPUT LINE FREQ ERROR SUBROUTINE -------------------
0A9B F5      FREQERR  PUSH   PSW
0A9C 3A5710           LDA    OFFSET+1
0A9F FE01             CPI    01H
0AA1 C2BB0A           JNZ    ERFLAG
0AA4 3A5610           LDA    OFFSET
0AA7 FE48             CPI    48H
0AA9 DABB0A           JC     ERFLAG
0AAC FE6E             CPI    6EH
0AAE DAC00A           JC     FREQRET
0AB1 FE89             CPI    89H
0AB3 DABB0A           JC     ERFLAG
0AB6 FEBB             CPI    0BBH
0AB8 DAC00A           JC     FREQRET
0ABB 3EAA    ERFLAG   MVI    A,0AAH
0ABD 324110           STA    FREQFLAG
0AC0 F1      FREQRET  POP    PSW
0AC1 C9               RET
0AC2 CF      UPDATE   RST    1
0AC3 3A4310           LDA    ZCOFLAG
0AC6 FEAA             CPI    0AAH
0AC8 C0               RNZ
```

```
0AC9 2A5610                LHLD    OFFSET
0ACC 3A4410                LDA     SYSMEM
0ACF E680                  ANI     80H
0AD1 CAD80A                JZ      FAST
0AD4 23                    INX     H
0AD5 C3D90A                JMP     CHECKIT
0AD8 2B        FAST        DCX     H
0AD9 225610    CHECKIT     SHLD    OFFSET
0ADC CD9B0A                CALL    FREQERR
0ADF 29                    DAD     H
0AE0 3E0D                  MVI     A,0DH
0AE2 320220                STA     TCOMMAND
0AE5 7D                    MOV     A,L
0AE6 320020                STA     TDATA
0AE9 7C                    MOV     A,H
0AEA 320020                STA     TDATA
0AED 29                    DAD     H
0AEE 225410                SHLD    REFLECT
0AF1 3E00                  MVI     A,00H
0AF3 324310                STA     ZCOFLAG
0AF6 C9                    RET
               *--------------- TIMER DATA LIST -----------------------------------------
0AF7 17        TABLE1      DC      X'17',X'C0',X'81'
0AF8 C0
0AF9 81
0AFA 01                    DC      X'01',X'01',X'8B'
0AFB 01
0AFC 8B
0AFD 02                    DC      X'02',X'02',X'C2'
0AFE 02
0AFF C2
0B00 03                    DC      X'03',X'02',X'C3'
0B01 02
0B02 C3
0B03 04                    DC      X'04',X'02',X'C4'
0B04 02
0B05 C4
0B06 05                    DC      X'05',X'A2',X'C5'
0B07 A2
0B08 C5
0B09 09                    DC      X'09',X'7D',X'00'
0B0A 7D
0B0B 00
0B0C 0A                    DC      X'0A',X'C7',X'06'
0B0D C7
0B0E 06
0B0F 0B                    DC      X'0B',X'C7',X'06'
0B10 C7
0B11 06
0B12 0C                    DC      X'0C',X'C7',X'06'
0B13 C7
0B14 06
0B15 0D                    DC      X'0D',X'B6',X'02'
0B16 B6
0B17 02
               *------------------------- LOST CPU ERROR ROUTINE --------------------------
0B18 313F10    CPULOST     LXI     SP,103FH
0B1B CF                    RST     1
0B1C 1EA0                  MVI     E,0A0H
0B1E CDEC06                CALL    SAVELST
0B21 C3A104                JMP     SOFTFIRE
0B24 3A7F10    FIRST       LDA     LASTADRS+1
0B27 FE00                  CPI     00H
0B29 C0                    RNZ
0B2A 3EAA                  MVI     A,0AAH
0B2C 327F10                STA     LASTADRS+1
0B2F C9                    RET
0B30                       END
```

The present invention has been set forth in the form of one preferred embodiment. It is nevertheless intended that modifications to the motor control system disclosed herein may be made by those skilled in the art without departing from the scope and spirit of the present invention. Moreover, such modifications are considered to be within the purview of the appended claims.

What is claimed is:

1. Apparatus for controlling the speed of an AC motor which is powered by a multi-phase AC input, said apparatus comprising:

a plurality of bridge rectifier SCR means respectively arranged to receive the input phases of the AC input and to supply a DC output in response thereto;

a plurality of inverter SCR means arranged in auxiliary commutated inverter configuration for converting said DC output into an AC output having a frequency proportional to said DC output, said inverter SCR means including a connecting means for supplying said AC output to the AC motor; and control means for generating bridge rectifier SCR conduction and sequencing data, said control means including a timing means for generating zero-crossover signals which track the line-to-neutral zero-crossover points of each phase in the AC input, a first computing means connected to said timing means for generating bridge rectifier SCR sequencing data which serves to identify the particular bridge rectifier SCR means in said plurality of bridge rectifier SCR means associated with each half cycle of each AC input phase in advance of gating said particular one of said bridge rectifier SRC means into conduction and a second computing means connected to said timing means for generating bridge rectifier SCR conduction data for each half cycle of each AC input phase in advance of the first line-to-line zero-crossover point for that half cycle, said bridge rectifier SCR conduction data serving to specify the conduction point in each half cycle of each AC input phase at which particular bridge rectifier SCR means associated with that half cycle is gate into conduction, said control means also including a bridge rectifier gating means connected to said timing means for gating the bridge rectifier SCR means on and off in accordance with said bridge rectifier SCR conduction and sequencing data.

2. An apparatus as set forth in claim 1, wherein said timing means includes a detection means for detecting one of the two line-of-neutral zero-crossover points of a selected phase in the AC input and for generating a zero-crossover pulse in response thereto, said timing means also including a pseudo signal generator means connected to said detection means for generating a series of pseudo zero-crossover pluses which represent the line-to-neutral zero-crossover points for all of the phases in the AC input.

3. An apparatus as set forth in claim 2, wherein said timing means includes a synchronization means connected to receive said zero-crossover pulse and said series of pseudo zero-crossover pulses for periodically synchronizing said series of pseudo zero-crossover pulses with said zero-crossover pulse.

4. An apparatus as set forth in claim 2, wherein the AC input is a three phase input and said detection means of said timing means includes a transformer means connected across two of the three phases of the AC input, said transformer means having a circuit means for outputting a transformer signal in phase with the line-to-line waveform of said two phases across which said transformer means is connected.

5. Apparatus as set forth in claim 4, wherein said transformer means includes a lag filter means connected to said circuit means for introducing a lag into phase of said transformer signal.

6. Apparatus as set forth in claim 2, wherein the AC input is a three phase input and said timing means includes a clock means for generating clock signals at first intervals, said pseudo signal generator means of said timing means having a counting means connected to receive said clock signals and said zero-crossover pulse for dividing the period between successive zero-crossover pulses into second intervals equal in duration to one of said first intervals multiplied by six and for maintaining a count of the number of said second intervals occurring during the period between sucessive ones of said zero-crossover pulses.

7. Apparatus as set forth in claim 6, wherein said pseudo signal generator means includes a pseudo signal timer which is loaded with said count obtained from said counting means and driven by said clock signals from said clock means to generate said series of pseudo zero-crossover pulses.

8. Apparatus as set forth in claim 2, wherein said timing means includes a plurality of SCR firing timers which receive said bridge rectifier SCR conduction data from said second computing means, said zero-crossover pulses from said detection means and said series of pseudo zero-crossover pulses from said pseudo signal generator means to initiate a count operation for an interval of time defined by said bridge rectifier SCR conduction data, after which said SCR firing timers respectively cause the gating of the bridge rectifier SCR means associated therewith into conduction.

9. Apparatus as set forth in claim 2, wherein said control means includes a means for establishing a speed signal indicative of the desired speed of the AC motor, a sensor means for determining the magnitude of the DC output from said bridge rectifier SCR means, and a summing means connected to receive said speed signal and said sensor signal for generating a control signal as a function of the difference in the magnitude between said speed signal and said sensor signal, said second computing means of said control means including a sampling means connected to receive said control signal for digitizing and sampling said control signal to derive a cumulative value for use in generating said bridge rectifier SCR conduction data.

10. Apparatus as set forth in claim 1, wherein said control means also generates inverter SCR conduction and sequencing data in advance of each polarity shift in the AC output from said inverter SCR means, said control means further including an inverter gating means for gating the inverter SCR means on and off in accordance with said inverter SCR conduction and sequencing data to provide a constant volts/Hertz ratio between the voltage level of said AC output from said inverter SCR means and said frequency of said AC output from said inverter SCR means.

* * * * *

UNITED STATES PATENT AND TRADEMARK OFFICE
CERTIFICATE OF CORRECTION

PATENT NO. : 4,618,810

DATED : October 21, 1986

INVENTOR(S) : James E. Hagerman, William D. Mathewes, Fenton L. Rees, Albert J. Flack It is certified that error appears in the above—identified patent and that said Letters Patent is hereby corrected as shown below:

Claim 1, line 25, after "particular" delete "one of said".

Claim 1, line 33, after "at which" insert -- said -- .

Claim 2, line 3, delete "line-of-neutral" and insert -- line-to-neutral -- .

Claim 5, line 3, before "phase" insert -- the -- .

Signed and Sealed this

Twenty-first Day of June, 1988

*Attest:*

DONALD J. QUIGG

*Attesting Officer* *Commissioner of Patents and Trademarks*